United States Patent
Leber

(10) Patent No.: US 8,028,935 B2
(45) Date of Patent: Oct. 4, 2011

(54) LOW FLOW SHOWERHEAD AND METHOD OF MAKING SAME

(75) Inventor: Leland C. Leber, Fort Collins, CO (US)

(73) Assignee: Water Pik, Inc., Fort Collins, CO (US)

( * ) Notice: Subject to any disclaimer, the term of this patent is extended or adjusted under 35 U.S.C. 154(b) by 334 days.

(21) Appl. No.: 12/114,304

(22) Filed: May 2, 2008

(65) Prior Publication Data

US 2008/0272203 A1    Nov. 6, 2008

Related U.S. Application Data

(60) Provisional application No. 60/916,092, filed on May 4, 2007, provisional application No. 60/916,146, filed on May 4, 2007, provisional application No. 60/916,219, filed on May 4, 2007.

(51) Int. Cl.
   *A62C 31/00* (2006.01)

(52) U.S. Cl. ........ 239/436; 239/282; 239/443; 239/447; 239/558; 239/581.1; 137/345

(58) Field of Classification Search ............... 239/442, 239/443, 447, 548, 556, 558, 581.1, 282, 239/283, 436; 251/343–345
   See application file for complete search history.

(56) References Cited

U.S. PATENT DOCUMENTS

| | | |
|---|---|---|
| 203,094 A | 4/1878 | Wakeman |
| 204,333 A | 5/1878 | Josias |
| 309,349 A | 12/1884 | Hart |
| 428,023 A | 5/1890 | Schoff |
| 432,712 A | 7/1890 | Taylor |
| 445,250 A | 1/1891 | Lawless |
| 453,109 A * | 5/1891 | Dreisorner ............... 251/344 |
| 486,986 A | 11/1892 | Schinke |
| 566,384 A | 8/1896 | Engelhart |
| 566,410 A | 8/1896 | Schinke |
| 570,405 A | 10/1896 | Jerguson et al. |
| 694,888 A | 3/1902 | Pfluger |
| 800,802 A | 10/1905 | Franquist |

(Continued)

FOREIGN PATENT DOCUMENTS

CA    659510    3/1963

(Continued)

OTHER PUBLICATIONS

Color Copy, Labeled 1A, Gemlo, available at least as early as Dec. 2, 1998. Color Copy, Labeled 1B, Gemlo, available at least as early as Dec. 2, 1998.

*Primary Examiner* — Jason J Boeckmann

(74) *Attorney, Agent, or Firm* — Dorsey & Whitney LLP

(57) ABSTRACT

A showerhead for a low flow rate may employ one or more of a showerhead housing, a showerhead engine, a flow restrictor and a flow regulation device. The showerhead engine may be moveably connected to the showerhead housing. The showerhead engine may include a back member, an intermediate member, and a front member defining various fluid chambers and apertures that allow for one or more spray modes. The showerhead may include a flow control device to selectively reduce flow to the showerhead engine. The flow control device may also be selectively pause fluid flow for more than one spray mode. The showerhead may include a flow restrictor. The flow restrictor may limit a maximum fluid flow rate of a fluid delivered from the showerhead engine to approximately 1.5 gallons per minute.

13 Claims, 27 Drawing Sheets

U.S. PATENT DOCUMENTS

| | | | |
|---|---|---|---|
| 832,523 A | 10/1906 | Andersson | |
| 835,678 A | 11/1906 | Hammond | |
| 845,540 A * | 2/1907 | Ferguson | 251/164 |
| 854,094 A | 5/1907 | Klein | |
| 926,929 A | 7/1909 | Dusseau | |
| 1,001,842 A | 8/1911 | Greenfield | |
| 1,003,037 A | 9/1911 | Crowe | |
| 1,018,143 A | 2/1912 | Vissering | |
| 1,046,573 A | 12/1912 | Ellis | |
| 1,130,520 A | 3/1915 | Kenney | |
| 1,203,466 A | 10/1916 | Benson | |
| 1,217,254 A | 2/1917 | Winslow | |
| 1,218,895 A | 3/1917 | Porter | |
| 1,255,577 A | 2/1918 | Berry | |
| 1,260,181 A | 3/1918 | Garnero | |
| 1,276,117 A | 8/1918 | Riebe | |
| 1,284,099 A | 11/1918 | Harris | |
| 1,327,428 A | 1/1920 | Gregory | |
| 1,451,800 A | 4/1923 | Agner | |
| 1,459,582 A | 6/1923 | Dubee | |
| 1,469,528 A | 10/1923 | Owens | |
| 1,500,921 A | 7/1924 | Bramson et al. | |
| 1,560,789 A | 11/1925 | Johnson et al. | |
| 1,597,477 A | 8/1926 | Panhorst | |
| 1,633,531 A | 6/1927 | Keller | |
| 1,692,394 A | 11/1928 | Sundh | |
| 1,695,263 A | 12/1928 | Jacques | |
| 1,724,147 A | 8/1929 | Russell | |
| 1,724,161 A | 8/1929 | Wuesthoff | |
| 1,736,160 A | 11/1929 | Jonsson | |
| 1,754,127 A | 4/1930 | Srulowitz | |
| 1,758,115 A | 5/1930 | Kelly | |
| 1,778,658 A | 10/1930 | Baker | |
| 1,821,274 A | 9/1931 | Plummer | |
| 1,849,517 A | 3/1932 | Fraser | |
| 1,890,156 A | 12/1932 | Konig | |
| 1,906,575 A | 5/1933 | Goeriz | |
| 1,934,553 A | 11/1933 | Mueller et al. | |
| 1,946,207 A | 2/1934 | Haire | |
| 2,011,446 A | 8/1935 | Judell | |
| 2,024,930 A | 12/1935 | Judell | |
| 2,033,467 A | 3/1936 | Groeniger | |
| 2,044,445 A | 6/1936 | Price et al. | |
| 2,085,854 A | 7/1937 | Hathaway et al. | |
| 2,096,912 A | 10/1937 | Morris | |
| 2,117,152 A | 5/1938 | Crosti | |
| D113,439 S | 2/1939 | Reinecke | |
| 2,196,783 A | 4/1940 | Shook | |
| 2,197,667 A | 4/1940 | Shook | |
| 2,216,149 A | 10/1940 | Weiss | |
| D126,433 S | 4/1941 | Enthof | |
| 2,251,192 A | 7/1941 | Krumsiek et al. | |
| 2,268,263 A | 12/1941 | Newell et al. | |
| 2,285,831 A | 6/1942 | Pennypacker | |
| 2,342,757 A | 2/1944 | Roser | |
| 2,402,741 A | 6/1946 | Draviner | |
| D147,258 S | 8/1947 | Becker | |
| D152,584 S | 2/1949 | Becker | |
| 2,467,954 A | 4/1949 | Becker | |
| 2,546,348 A | 3/1951 | Schuman | |
| 2,567,642 A | 9/1951 | Penshaw | |
| 2,581,129 A | 1/1952 | Muldoon | |
| D166,073 S | 3/1952 | Dunkelberger | |
| 2,648,762 A | 8/1953 | Dunkelberger | |
| 2,664,271 A | 12/1953 | Arutunoff | |
| 2,671,693 A | 3/1954 | Hyser et al. | |
| 2,676,806 A | 4/1954 | Bachman | |
| 2,679,575 A | 5/1954 | Haberstump | |
| 2,680,358 A | 6/1954 | Zublin | |
| 2,726,120 A | 12/1955 | Bletcher et al. | |
| 2,759,765 A | 8/1956 | Pawley | |
| 2,776,168 A | 1/1957 | Schweda | |
| 2,792,847 A | 5/1957 | Spencer | |
| 2,873,999 A | 2/1959 | Webb | |
| 2,930,505 A | 3/1960 | Meyer | |
| 2,931,672 A | 4/1960 | Merritt et al. | |
| 2,935,265 A | 5/1960 | Richter | |
| 2,949,242 A | 8/1960 | Blumberg et al. | |
| 2,957,587 A | 10/1960 | Tobin | |
| 2,966,311 A | 12/1960 | Davis | |
| D190,295 S | 5/1961 | Becker | |
| 2,992,437 A | 7/1961 | Nelson et al. | |
| 3,007,648 A | 11/1961 | Fraser | |
| D192,935 S | 5/1962 | Becker | |
| 3,032,357 A | 5/1962 | Shames et al. | |
| 3,034,809 A | 5/1962 | Greenberg | |
| 3,037,799 A | 6/1962 | Mulac | |
| 3,081,339 A | 3/1963 | Green et al. | |
| 3,092,333 A | 6/1963 | Gaiotto | |
| 3,098,508 A | 7/1963 | Gerdes | |
| 3,103,723 A | 9/1963 | Becker | |
| 3,104,815 A | 9/1963 | Schultz | |
| 3,104,827 A | 9/1963 | Aghnides | |
| 3,111,277 A | 11/1963 | Grimsley | |
| 3,112,073 A | 11/1963 | Larson et al. | |
| 3,143,857 A | 8/1964 | Eaton | |
| 3,196,463 A | 7/1965 | Farneth | |
| 3,231,200 A | 1/1966 | Heald | |
| 3,236,545 A | 2/1966 | Parkes et al. | |
| 3,239,152 A | 3/1966 | Bachli et al. | |
| 3,266,059 A | 8/1966 | Stelle | |
| 3,272,437 A | 9/1966 | Coson | |
| 3,273,359 A | 9/1966 | Fregeolle | |
| 3,306,634 A | 2/1967 | Groves et al. | |
| 3,323,148 A | 6/1967 | Burnon | |
| 3,329,967 A | 7/1967 | Martinez et al. | |
| 3,341,132 A | 9/1967 | Parkison | |
| 3,342,419 A | 9/1967 | Weese | |
| 3,344,994 A | 10/1967 | Fife | |
| 3,363,842 A | 1/1968 | Burns | |
| 3,383,051 A | 5/1968 | Fiorentino | |
| 3,389,925 A | 6/1968 | Gottschald | |
| 3,393,311 A | 7/1968 | Dahl | |
| 3,393,312 A | 7/1968 | Dahl | |
| 3,404,410 A | 10/1968 | Sumida | |
| 3,492,029 A | 1/1970 | French et al. | |
| 3,516,611 A | 6/1970 | Piggott | |
| 3,546,961 A | 12/1970 | Marton | |
| 3,550,863 A | 12/1970 | McDermott | |
| 3,552,436 A | 1/1971 | Stewart | |
| 3,565,116 A | 2/1971 | Gabin | |
| 3,566,917 A | 3/1971 | White | |
| 3,580,513 A | 5/1971 | Martin | |
| 3,584,822 A | 6/1971 | Oram | |
| 3,596,835 A | 8/1971 | Smith et al. | |
| 3,612,577 A | 10/1971 | Pope | |
| 3,637,143 A | 1/1972 | Shames et al. | |
| 3,641,333 A | 2/1972 | Gendron | |
| 3,647,144 A | 3/1972 | Parkison et al. | |
| 3,663,044 A | 5/1972 | Contreras et al. | |
| 3,669,470 A | 6/1972 | Deurloo | |
| 3,672,648 A | 6/1972 | Price | |
| 3,682,392 A | 8/1972 | Kint | |
| 3,685,745 A | 8/1972 | Peschcke-koedt | |
| D224,834 S | 9/1972 | Laudell | |
| 3,711,029 A | 1/1973 | Bartlett | |
| 3,722,798 A | 3/1973 | Bletcher et al. | |
| 3,722,799 A | 3/1973 | Rauh | |
| 3,731,084 A | 5/1973 | Trevorrow | |
| 3,754,779 A | 8/1973 | Peress | |
| D228,622 S | 10/1973 | Juhlin | |
| 3,762,648 A | 10/1973 | Deines et al. | |
| 3,768,735 A | 10/1973 | Ward | |
| 3,786,995 A | 1/1974 | Manoogian et al. | |
| 3,801,019 A | 4/1974 | Trenary et al. | |
| 3,810,580 A | 5/1974 | Rauh | |
| 3,826,454 A | 7/1974 | Zieger | |
| 3,840,734 A | 10/1974 | Oram | |
| 3,845,291 A | 10/1974 | Portyrata | |
| 3,860,271 A | 1/1975 | Rodgers | |
| 3,861,719 A | 1/1975 | Hand | |
| 3,865,310 A | 2/1975 | Elkins et al. | |
| 3,869,151 A | 3/1975 | Fletcher et al. | |
| 3,896,845 A | 7/1975 | Parker | |
| 3,902,671 A | 9/1975 | Symmons | |
| 3,910,277 A | 10/1975 | Zimmer | |
| D237,708 S | 11/1975 | Grohe | |

| | | |
|---|---|---|
| 3,929,164 A | 12/1975 | Richter |
| 3,958,756 A | 5/1976 | Trenary et al. |
| D240,322 S | 6/1976 | Staub |
| 3,967,783 A | 7/1976 | Halsted et al. |
| 3,979,096 A | 9/1976 | Zieger |
| 3,997,116 A | 12/1976 | Moen |
| 3,998,390 A | 12/1976 | Peterson et al. |
| 3,999,714 A | 12/1976 | Lang |
| 4,005,880 A | 2/1977 | Anderson et al. |
| 4,006,920 A | 2/1977 | Sadler et al. |
| 4,023,782 A | 5/1977 | Eifer |
| 4,042,984 A | 8/1977 | Butler |
| 4,045,054 A | 8/1977 | Arnold |
| D245,858 S | 9/1977 | Grube |
| D245,860 S | 9/1977 | Grube |
| 4,068,801 A | 1/1978 | Leutheuser |
| 4,081,135 A | 3/1978 | Tomaro |
| 4,084,271 A | 4/1978 | Ginsberg |
| 4,091,998 A | 5/1978 | Peterson |
| D249,356 S | 9/1978 | Nagy |
| 4,117,979 A | 10/1978 | Lagarelli et al. |
| 4,129,257 A | 12/1978 | Eggert |
| 4,130,120 A | 12/1978 | Kohler, Jr. |
| 4,131,233 A | 12/1978 | Koenig |
| 4,133,486 A | 1/1979 | Fanella |
| 4,135,549 A | 1/1979 | Baker |
| D251,045 S | 2/1979 | Grube |
| 4,141,502 A | 2/1979 | Grohe |
| 4,151,955 A | 5/1979 | Stouffer |
| 4,151,957 A | 5/1979 | Gecewicz et al. |
| 4,162,801 A | 7/1979 | Kresky et al. |
| 4,165,837 A | 8/1979 | Rundzaitis |
| 4,167,196 A | 9/1979 | Morris |
| 4,174,822 A | 11/1979 | Larsson |
| 4,185,781 A | 1/1980 | O'Brien |
| 4,190,207 A | 2/1980 | Fienhold et al. |
| 4,191,332 A | 3/1980 | De Langis et al. |
| 4,203,550 A | 5/1980 | On |
| 4,209,132 A | 6/1980 | Kwan |
| D255,626 S | 7/1980 | Grube |
| 4,219,160 A | 8/1980 | Allred, Jr. |
| 4,221,338 A | 9/1980 | Shames et al. |
| 4,243,253 A | 1/1981 | Rogers, Jr. |
| 4,244,526 A | 1/1981 | Arth |
| D258,677 S | 3/1981 | Larsson |
| 4,254,914 A | 3/1981 | Shames et al. |
| 4,258,414 A | 3/1981 | Sokol |
| 4,272,022 A | 6/1981 | Evans |
| 4,274,400 A | 6/1981 | Baus |
| 4,282,612 A | 8/1981 | King |
| D261,300 S | 10/1981 | Klose |
| D261,417 S | 10/1981 | Klose |
| 4,303,201 A | 12/1981 | Elkins et al. |
| 4,319,608 A | 3/1982 | Raikov et al. |
| 4,330,089 A | 5/1982 | Finkbeiner |
| D266,212 S | 9/1982 | Haug et al. |
| 4,350,298 A | 9/1982 | Tada |
| 4,353,508 A | 10/1982 | Butterfield et al. |
| 4,358,056 A | 11/1982 | Greenhut et al. |
| D267,582 S | 1/1983 | Mackay et al. |
| D268,359 S | 3/1983 | Klose |
| D268,442 S | 3/1983 | Darmon |
| D268,611 S | 4/1983 | Klose |
| 4,383,554 A | 5/1983 | Merriman |
| 4,396,797 A | 8/1983 | Sakuragi et al. |
| 4,398,669 A | 8/1983 | Fienhold |
| 4,425,965 A | 1/1984 | Bayh, III et al. |
| 4,432,392 A | 2/1984 | Paley |
| D274,457 S | 6/1984 | Haug |
| 4,461,052 A | 7/1984 | Mostul |
| 4,465,308 A | 8/1984 | Martini |
| 4,467,964 A | 8/1984 | Kaeser |
| 4,495,550 A | 1/1985 | Visciano |
| 4,527,745 A | 7/1985 | Butterfield et al. |
| 4,540,202 A | 9/1985 | Amphoux et al. |
| 4,545,081 A | 10/1985 | Nestor et al. |
| 4,553,775 A | 11/1985 | Halling |
| D281,820 S | 12/1985 | Oba et al. |
| 4,561,593 A | 12/1985 | Cammack et al. |
| 4,564,889 A | 1/1986 | Bolson |
| 4,571,003 A | 2/1986 | Roling et al. |
| 4,572,232 A | 2/1986 | Gruber |
| D283,645 S | 4/1986 | Tanaka |
| 4,587,991 A | 5/1986 | Chorkey |
| 4,588,130 A | 5/1986 | Trenary et al. |
| 4,598,866 A | 7/1986 | Cammack et al. |
| 4,614,303 A | 9/1986 | Moseley, Jr. et al. |
| 4,616,298 A | 10/1986 | Bolson |
| 4,618,100 A | 10/1986 | White et al. |
| 4,629,124 A | 12/1986 | Gruber |
| 4,629,125 A | 12/1986 | Liu |
| 4,643,463 A | 2/1987 | Halling et al. |
| 4,645,244 A | 2/1987 | Curtis |
| RE32,386 E | 3/1987 | Hunter |
| 4,650,120 A | 3/1987 | Kress |
| 4,650,470 A | 3/1987 | Epstein |
| 4,652,025 A | 3/1987 | Conroy, Sr. |
| 4,654,900 A | 4/1987 | McGhee |
| 4,657,185 A | 4/1987 | Rundzaitis |
| 4,669,666 A | 6/1987 | Finkbeiner |
| 4,669,757 A | 6/1987 | Bartholomew |
| 4,674,687 A | 6/1987 | Smith et al. |
| 4,683,917 A | 8/1987 | Bartholomew |
| 4,703,893 A | 11/1987 | Gruber |
| 4,717,180 A | 1/1988 | Roman |
| 4,719,654 A | 1/1988 | Blessing |
| 4,733,337 A | 3/1988 | Bieberstein |
| D295,437 S | 4/1988 | Fabian |
| 4,739,801 A | 4/1988 | Kimura et al. |
| 4,749,126 A | 6/1988 | Kessener et al. |
| D296,582 S | 7/1988 | Haug et al. |
| 4,754,928 A | 7/1988 | Rogers et al. |
| D297,160 S | 8/1988 | Robbins |
| 4,764,047 A | 8/1988 | Johnston et al. |
| 4,778,104 A | 10/1988 | Fisher |
| 4,787,591 A | 11/1988 | Villacorta |
| 4,790,294 A | 12/1988 | Allred, III et al. |
| 4,801,091 A | 1/1989 | Sandvik |
| 4,809,369 A | 3/1989 | Bowden |
| 4,839,599 A | 6/1989 | Fischer |
| 4,842,059 A | 6/1989 | Tomek |
| D302,325 S | 7/1989 | Charet et al. |
| 4,850,616 A | 7/1989 | Pava |
| 4,854,499 A | 8/1989 | Neuman |
| 4,856,822 A | 8/1989 | Parker |
| 4,865,362 A | 9/1989 | Holden |
| D303,830 S | 10/1989 | Ramsey et al. |
| 4,871,196 A | 10/1989 | Kingsford |
| 4,896,658 A | 1/1990 | Yonekubo et al. |
| D306,351 S | 2/1990 | Charet et al. |
| 4,901,927 A | 2/1990 | Valdivia |
| 4,903,178 A | 2/1990 | Englot et al. |
| 4,903,897 A | 2/1990 | Hayes |
| 4,903,922 A | 2/1990 | Harris, III |
| 4,907,137 A | 3/1990 | Schladitz et al. |
| 4,907,744 A | 3/1990 | Jousson |
| 4,909,435 A | 3/1990 | Kidouchi et al. |
| 4,914,759 A | 4/1990 | Goff |
| 4,946,202 A | 8/1990 | Perricone |
| 4,951,329 A | 8/1990 | Shaw |
| 4,953,585 A | 9/1990 | Rollini et al. |
| 4,964,573 A | 10/1990 | Lipski |
| 4,972,048 A | 11/1990 | Martin |
| D313,267 S | 12/1990 | Lenci et al. |
| 4,976,460 A | 12/1990 | Newcombe et al. |
| D314,246 S | 1/1991 | Bache |
| D315,191 S | 3/1991 | Mikol |
| 4,998,673 A | 3/1991 | Pilolla |
| 5,004,158 A | 4/1991 | Halem et al. |
| D317,348 S | 6/1991 | Geneve et al. |
| 5,020,570 A | 6/1991 | Cotter |
| 5,022,103 A | 6/1991 | Faist |
| 5,032,015 A | 7/1991 | Christianson |
| 5,033,528 A | 7/1991 | Volcani |
| 5,033,897 A | 7/1991 | Chen |
| D319,294 S | 8/1991 | Kohler, Jr. et al. |
| D320,064 S | 9/1991 | Presman |
| 5,046,764 A | 9/1991 | Kimura et al. |

| | | |
|---|---|---|
| D321,062 S | 10/1991 | Bonbright |
| 5,058,804 A | 10/1991 | Yonekubo et al. |
| D322,119 S | 12/1991 | Haug et al. |
| D322,681 S | 12/1991 | Yuen |
| 5,070,552 A | 12/1991 | Gentry et al. |
| D323,545 S | 1/1992 | Ward |
| 5,082,019 A | 1/1992 | Tetrault |
| 5,086,878 A | 2/1992 | Swift |
| 5,090,624 A | 2/1992 | Rogers |
| 5,100,055 A | 3/1992 | Rokitenetz et al. |
| D325,769 S | 4/1992 | Haug et al. |
| D325,770 S | 4/1992 | Haug et al. |
| 5,103,384 A | 4/1992 | Drohan |
| D326,311 S | 5/1992 | Lenci et al. |
| D327,115 S | 6/1992 | Rogers |
| 5,121,511 A | 6/1992 | Sakamoto et al. |
| D327,729 S | 7/1992 | Rogers |
| 5,127,580 A | 7/1992 | Fu-I |
| 5,134,251 A | 7/1992 | Martin |
| D328,944 S | 8/1992 | Robbins |
| 5,141,016 A | 8/1992 | Nowicki |
| D329,504 S | 9/1992 | Yuen |
| 5,143,300 A | 9/1992 | Cutler |
| 5,145,114 A | 9/1992 | Monch |
| 5,148,556 A | 9/1992 | Bottoms et al. |
| D330,068 S | 10/1992 | Haug et al. |
| D330,408 S | 10/1992 | Thacker |
| D330,409 S | 10/1992 | Raffo |
| 5,153,976 A | 10/1992 | Benchaar et al. |
| 5,154,355 A | 10/1992 | Gonzalez |
| 5,154,483 A | 10/1992 | Zeller |
| 5,161,567 A | 11/1992 | Humpert |
| 5,163,752 A | 11/1992 | Copeland et al. |
| 5,171,429 A | 12/1992 | Yasuo |
| 5,172,860 A | 12/1992 | Yuch |
| 5,172,862 A | 12/1992 | Heimann et al. |
| 5,172,866 A | 12/1992 | Ward |
| D332,303 S | 1/1993 | Klose |
| D332,994 S | 2/1993 | Huen |
| D333,339 S | 2/1993 | Klose |
| 5,197,767 A | 3/1993 | Kimura et al. |
| D334,794 S | 4/1993 | Klose |
| D335,171 S | 4/1993 | Lenci et al. |
| 5,201,468 A | 4/1993 | Freier et al. |
| 5,206,963 A | 5/1993 | Wiens |
| 5,207,499 A | 5/1993 | Vajda et al. |
| 5,213,267 A | 5/1993 | Heimann et al. |
| 5,220,697 A | 6/1993 | Birchfield |
| D337,839 S | 7/1993 | Zeller |
| 5,228,625 A | 7/1993 | Grassberger |
| 5,230,106 A | 7/1993 | Henkin et al. |
| D338,542 S | 8/1993 | Yuen |
| 5,232,162 A | 8/1993 | Chih |
| D339,492 S | 9/1993 | Klose |
| D339,627 S | 9/1993 | Klose |
| D339,848 S | 9/1993 | Gottwald |
| 5,246,169 A | 9/1993 | Heimann et al. |
| 5,246,301 A | 9/1993 | Hirasawa |
| D340,376 S | 10/1993 | Klose |
| 5,253,670 A | 10/1993 | Perrott |
| 5,253,807 A | 10/1993 | Newbegin |
| 5,254,809 A | 10/1993 | Martin |
| D341,007 S | 11/1993 | Haug et al. |
| D341,191 S | 11/1993 | Klose |
| D341,220 S | 11/1993 | Eagan |
| 5,263,646 A | 11/1993 | McCauley |
| 5,265,833 A | 11/1993 | Heimann et al. |
| 5,268,826 A | 12/1993 | Greene |
| 5,276,596 A | 1/1994 | Krenzel |
| 5,277,391 A | 1/1994 | Haug et al. |
| 5,286,071 A | 2/1994 | Storage |
| 5,288,110 A | 2/1994 | Allread |
| 5,294,054 A | 3/1994 | Benedict et al. |
| 5,297,735 A | 3/1994 | Heimann et al. |
| 5,297,739 A | 3/1994 | Allen |
| D345,811 S | 4/1994 | Van Deursen et al. |
| D346,426 S | 4/1994 | Warshawsky |
| D346,428 S | 4/1994 | Warshawsky |
| D346,430 S | 4/1994 | Warshawsky |
| D347,262 S | 5/1994 | Black et al. |
| D347,265 S | 5/1994 | Gottwald |
| 5,316,216 A | 5/1994 | Cammack et al. |
| D348,720 S | 7/1994 | Haug et al. |
| 5,329,650 A | 7/1994 | Zaccai et al. |
| D349,947 S | 8/1994 | Hing-Wah |
| 5,333,787 A | 8/1994 | Smith et al. |
| 5,333,789 A | 8/1994 | Garneys |
| 5,340,064 A | 8/1994 | Heimann et al. |
| 5,340,165 A | 8/1994 | Sheppard |
| D350,808 S | 9/1994 | Warshawsky |
| 5,344,080 A | 9/1994 | Matsui |
| 5,349,987 A | 9/1994 | Shieh |
| 5,356,076 A | 10/1994 | Bishop |
| 5,356,077 A | 10/1994 | Shames et al. |
| D352,092 S | 11/1994 | Warshawsky |
| D352,347 S | 11/1994 | Dannenberg |
| D352,766 S | 11/1994 | Hill et al. |
| 5,368,235 A | 11/1994 | Drozdoff et al. |
| 5,369,556 A | 11/1994 | Zeller |
| 5,370,427 A | 12/1994 | Hoelle et al. |
| 5,385,500 A | 1/1995 | Schmidt |
| D355,242 S | 2/1995 | Warshawsky |
| D355,703 S | 2/1995 | Duell |
| D356,626 S | 3/1995 | Wang |
| 5,397,064 A | 3/1995 | Heitzman |
| 5,398,872 A | 3/1995 | Joubran |
| 5,398,977 A | 3/1995 | Berger et al. |
| 5,402,812 A | 4/1995 | Moineau et al. |
| 5,405,089 A | 4/1995 | Heimann et al. |
| 5,414,879 A | 5/1995 | Hiraishi et al. |
| 5,423,348 A | 6/1995 | Jezek et al. |
| 5,433,384 A | 7/1995 | Chan et al. |
| D361,399 S | 8/1995 | Carbone et al. |
| D361,623 S | 8/1995 | Huen |
| 5,441,075 A | 8/1995 | Clare |
| 5,449,206 A | 9/1995 | Lockwood |
| D363,360 S | 10/1995 | Santarsiero |
| 5,454,809 A | 10/1995 | Janssen |
| 5,468,057 A | 11/1995 | Megerle et al. |
| D364,935 S | 12/1995 | deBlois |
| D365,625 S | 12/1995 | Bova |
| D365,646 S | 12/1995 | deBlois |
| 5,476,225 A | 12/1995 | Chan |
| D366,309 S | 1/1996 | Huang |
| D366,707 S | 1/1996 | Kaiser |
| D366,708 S | 1/1996 | Santarsiero |
| 366,709 | 1/1996 | Szymanski |
| D366,710 S | 1/1996 | Szymanski |
| 5,481,765 A | 1/1996 | Wang |
| D366,948 S | 2/1996 | Carbone |
| D367,315 S | 2/1996 | Andrus |
| D367,333 S | 2/1996 | Swyst |
| D367,696 S | 3/1996 | Andrus |
| D367,934 S | 3/1996 | Carbone |
| D368,146 S | 3/1996 | Carbone |
| D368,317 S | 3/1996 | Swyst |
| 5,499,767 A | 3/1996 | Morand |
| D368,539 S | 4/1996 | Carbone et al. |
| D368,540 S | 4/1996 | Santarsiero |
| D368,541 S | 4/1996 | Kaiser et al. |
| D368,542 S | 4/1996 | deBlois et al. |
| D369,204 S | 4/1996 | Andrus |
| D369,205 S | 4/1996 | Andrus |
| 5,507,436 A | 4/1996 | Ruttenberg |
| D369,873 S | 5/1996 | deBlois et al. |
| D369,874 S | 5/1996 | Santarsiero |
| D369,875 S | 5/1996 | Carbone |
| D370,052 S | 5/1996 | Chan et al. |
| D370,250 S | 5/1996 | Fawcett et al. |
| D370,277 S | 5/1996 | Kaiser |
| D370,278 S | 5/1996 | Nolan |
| D370,279 S | 5/1996 | deBlois |
| D370,280 S | 5/1996 | Kaiser |
| D370,281 S | 5/1996 | Johnstone et al. |
| 5,517,392 A | 5/1996 | Rousso et al. |
| 5,521,803 A | 5/1996 | Eckert et al. |
| D370,542 S | 6/1996 | Santarsiero |
| D370,735 S | 6/1996 | deBlois |

| Patent | Date | Name | Patent | Date | Name |
|---|---|---|---|---|---|
| D370,987 S | 6/1996 | Santarsiero | D395,075 S | 6/1998 | Kolada et al. |
| D370,988 S | 6/1996 | Santarsiero | D395,142 S | 6/1998 | Neibrook |
| D371,448 S | 7/1996 | Santarsiero | 5,764,760 A * | 6/1998 | Grandbert et al. ....... 379/433.13 |
| D371,618 S | 7/1996 | Nolan | 5,765,760 A | 6/1998 | Kuo |
| D371,619 S | 7/1996 | Szymanski | 5,769,802 A | 6/1998 | Wang |
| D371,856 S | 7/1996 | Carbone | 5,772,120 A | 6/1998 | Huber |
| D372,318 S | 7/1996 | Szymanski | 5,778,939 A | 7/1998 | Hok-Yin |
| D372,319 S | 7/1996 | Carbone | 5,788,157 A | 8/1998 | Kress |
| 5,531,625 A | 7/1996 | Zhong | D398,370 S | 9/1998 | Purdy |
| 5,539,624 A | 7/1996 | Dougherty | 5,806,771 A | 9/1998 | Loschelder et al. |
| D372,548 S | 8/1996 | Carbone | 5,819,791 A | 10/1998 | Chronister et al. |
| D372,998 S | 8/1996 | Carbone | 5,820,574 A | 10/1998 | Henkin et al. |
| D373,210 S | 8/1996 | Santarsiero | 5,823,431 A | 10/1998 | Pierce |
| D373,434 S | 9/1996 | Nolan | 5,823,442 A | 10/1998 | Guo |
| D373,435 S | 9/1996 | Nolan | 5,826,803 A | 10/1998 | Cooper |
| D373,645 S | 9/1996 | Johnstone et al. | 5,833,138 A | 11/1998 | Crane et al. |
| D373,646 S | 9/1996 | Szymanski et al. | 5,839,666 A | 11/1998 | Heimann et al. |
| D373,647 S | 9/1996 | Kaiser | D402,350 S | 12/1998 | Andrus |
| D373,648 S | 9/1996 | Kaiser | D403,754 S | 1/1999 | Gottwald |
| D373,649 S | 9/1996 | Carbone | D404,116 S | 1/1999 | Bosio |
| D373,651 S | 9/1996 | Szymanski | 5,855,348 A | 1/1999 | Fornara |
| D373,652 S | 9/1996 | Kaiser | 5,860,599 A | 1/1999 | Lin |
| 5,551,637 A | 9/1996 | Lo | 5,862,543 A | 1/1999 | Reynoso et al. |
| 5,552,973 A | 9/1996 | Hsu | 5,862,985 A | 1/1999 | Neibrook et al. |
| 5,558,278 A | 9/1996 | Gallorini | D405,502 S | 2/1999 | Tse |
| D374,271 S | 10/1996 | Fleischmann | 5,865,375 A | 2/1999 | Hsu |
| D374,297 S | 10/1996 | Kaiser | 5,865,378 A | 2/1999 | Hollinshead et al. |
| D374,298 S | 10/1996 | Swyst | 5,873,647 A | 2/1999 | Kurtz et al. |
| D374,299 S | 10/1996 | Carbone | D408,893 S | 4/1999 | Tse |
| D374,493 S | 10/1996 | Szymanski | D409,276 S | 5/1999 | Ratzlaff |
| D374,494 S | 10/1996 | Santarsiero | D410,276 S | 5/1999 | Ben-Tsur |
| D374,732 S | 10/1996 | Kaiser | 5,918,809 A | 7/1999 | Simmons |
| D374,733 S | 10/1996 | Santasiero | 5,918,811 A | 7/1999 | Denham et al. |
| 5,560,548 A | 10/1996 | Mueller et al. | D413,157 S | 8/1999 | Ratzlaff |
| 5,567,115 A | 10/1996 | Carbone | 5,937,905 A | 8/1999 | Santos |
| D375,541 S | 11/1996 | Michaluk | 5,938,123 A | 8/1999 | Heitzman |
| 5,577,664 A | 11/1996 | Heitzman | 5,941,462 A | 8/1999 | Sandor |
| D376,217 S | 12/1996 | Kaiser | 5,947,388 A | 9/1999 | Woodruff |
| D376,860 S | 12/1996 | Santarsiero | D415,247 S | 10/1999 | Haverstraw et al. |
| D376,861 S | 12/1996 | Johnstone et al. | 5,961,046 A | 10/1999 | Joubran |
| D376,862 S | 12/1996 | Carbone | 5,979,776 A | 11/1999 | Williams |
| 5,605,173 A | 2/1997 | Arnaud | 5,992,762 A | 11/1999 | Wang |
| D378,401 S | 3/1997 | Neufeld et al. | D418,200 S | 12/1999 | Ben-Tsur |
| 5,613,638 A | 3/1997 | Blessing | 5,997,047 A | 12/1999 | Pimentel et al. |
| 5,613,639 A | 3/1997 | Storm et al. | 6,003,165 A | 12/1999 | Loyd |
| 5,615,837 A | 4/1997 | Roman | D418,902 S | 1/2000 | Haverstraw et al. |
| 5,624,074 A | 4/1997 | Parisi | D418,903 S | 1/2000 | Haverstraw et al. |
| 5,624,498 A | 4/1997 | Lee et al. | D418,904 S | 1/2000 | Milrud |
| D379,212 S | 5/1997 | Chan | D421,099 S | 2/2000 | Mullenmeister |
| D379,404 S | 5/1997 | Spelts | 6,021,960 A | 2/2000 | Kehat |
| 5,632,049 A | 5/1997 | Chen | D422,053 S | 3/2000 | Brenner et al. |
| D381,405 S | 7/1997 | Waidele et al. | 6,042,027 A | 3/2000 | Sandvik |
| D381,737 S | 7/1997 | Chan | 6,042,155 A | 3/2000 | Lockwood |
| D382,936 S | 8/1997 | Shfaram | D422,336 S | 4/2000 | Haverstraw et al. |
| 5,653,260 A | 8/1997 | Huber | D422,337 S | 4/2000 | Chan |
| 5,667,146 A | 9/1997 | Pimentel et al. | D423,083 S | 4/2000 | Haug et al. |
| D385,332 S | 10/1997 | Andrus | D423,110 S | 4/2000 | Cipkowski |
| D385,333 S | 10/1997 | Caroen et al. | D424,160 S | 5/2000 | Haug et al. |
| D385,334 S | 10/1997 | Caroen et al. | D424,161 S | 5/2000 | Haug et al. |
| D385,616 S | 10/1997 | Dow et al. | D424,162 S | 5/2000 | Haug et al. |
| D385,947 S | 11/1997 | Dow et al. | D424,163 S | 5/2000 | Haug et al. |
| D387,230 S | 12/1997 | von Buelow et al. | D426,290 S | 6/2000 | Haug et al. |
| 5,699,964 A | 12/1997 | Bergmann et al. | D427,661 S | 7/2000 | Haverstraw et al. |
| 5,702,057 A | 12/1997 | Huber | D428,110 S | 7/2000 | Haug et al. |
| D389,558 S | 1/1998 | Andrus | D428,125 S | 7/2000 | Chan |
| 5,704,080 A | 1/1998 | Kuhne | 6,085,780 A | 7/2000 | Morris |
| 5,707,011 A | 1/1998 | Bosio | D430,267 S | 8/2000 | Milrud et al. |
| 5,718,380 A | 2/1998 | Schorn et al. | 6,095,801 A | 8/2000 | Spiewak |
| D392,369 S | 3/1998 | Chan | D430,643 S | 9/2000 | Tse |
| 5,730,361 A | 3/1998 | Thonnes | 6,113,002 A | 9/2000 | Finkbeiner |
| 5,730,362 A | 3/1998 | Cordes | 6,123,272 A | 9/2000 | Havican et al. |
| 5,730,363 A | 3/1998 | Kress | 6,123,308 A | 9/2000 | Faisst |
| 5,742,961 A | 4/1998 | Casperson et al. | D432,624 S | 10/2000 | Chan |
| D394,490 S | 5/1998 | Andrus et al. | D432,625 S | 10/2000 | Chan |
| 5,746,375 A | 5/1998 | Guo | D433,096 S | 10/2000 | Tse |
| 5,749,552 A | 5/1998 | Fan | D433,097 S | 10/2000 | Tse |
| 5,749,602 A | 5/1998 | Delaney et al. | 6,126,091 A | 10/2000 | Heitzman |
| D394,899 S | 6/1998 | Caroen et al. | 6,126,290 A | 10/2000 | Veigel |
| D395,074 S | 6/1998 | Neibrook et al. | D434,109 S | 11/2000 | Ko |

| | | |
|---|---|---|
| 6,164,569 A | 12/2000 | Hollinshead et al. |
| 6,164,570 A | 12/2000 | Smeltzer |
| D435,889 S | 1/2001 | Ben-Tsur et al. |
| D439,305 S | 3/2001 | Slothower |
| 6,199,580 B1 | 3/2001 | Morris |
| 6,202,679 B1 | 3/2001 | Titus |
| D440,276 S | 4/2001 | Slothower |
| D440,277 S | 4/2001 | Slothower |
| D440,278 S | 4/2001 | Slothower |
| D441,059 S | 4/2001 | Fleischmann |
| 6,209,799 B1 | 4/2001 | Finkbeiner |
| D443,025 S | 5/2001 | Kollmann et al. |
| D443,026 S | 5/2001 | Kollmann et al. |
| D443,027 S | 5/2001 | Kollmann et al. |
| D443,029 S | 5/2001 | Kollmann et al. |
| 6,223,998 B1 | 5/2001 | Heitzman |
| 6,230,984 B1 | 5/2001 | Jager |
| 6,230,988 B1 | 5/2001 | Chao et al. |
| 6,230,989 B1 | 5/2001 | Haverstraw et al. |
| D443,335 S | 6/2001 | Andrus |
| D443,336 S | 6/2001 | Kollmann et al. |
| D443,347 S | 6/2001 | Gottwald |
| 6,241,166 B1 | 6/2001 | Overington et al. |
| 6,250,572 B1 | 6/2001 | Chen |
| D444,865 S | 7/2001 | Gottwald |
| D445,871 S | 7/2001 | Fan |
| 6,254,014 B1 | 7/2001 | Clearman et al. |
| 6,270,278 B1 | 8/2001 | Mauro |
| 6,276,004 B1 | 8/2001 | Bertrand et al. |
| 6,283,447 B1 | 9/2001 | Fleet |
| 6,286,764 B1 | 9/2001 | Garvey et al. |
| D449,673 S | 10/2001 | Kollmann et al. |
| D450,370 S | 11/2001 | Wales et al. |
| D450,805 S | 11/2001 | Lindholm et al. |
| D450,806 S | 11/2001 | Lindholm et al. |
| D450,807 S | 11/2001 | Lindholm et al. |
| D451,169 S | 11/2001 | Lindholm et al. |
| D451,170 S | 11/2001 | Lindholm et al. |
| D451,171 S | 11/2001 | Lindholm et al. |
| D451,172 S | 11/2001 | Lindholm et al. |
| 6,321,777 B1 | 11/2001 | Wu |
| 6,322,006 B1 | 11/2001 | Guo |
| D451,583 S | 12/2001 | Lindholm et al. |
| D451,980 S | 12/2001 | Lindholm et al. |
| D452,553 S | 12/2001 | Lindholm et al. |
| D452,725 S | 1/2002 | Lindholm et al. |
| D452,897 S | 1/2002 | Gillette et al. |
| 6,336,764 B1 | 1/2002 | Liu |
| D453,369 S | 2/2002 | Lobermeier |
| D453,370 S | 2/2002 | Lindholm et al. |
| D453,551 S | 2/2002 | Lindholm et al. |
| 6,349,735 B2 | 2/2002 | Gul |
| D454,617 S | 3/2002 | Curbbun et al. |
| D454,938 S | 3/2002 | Lord |
| 6,375,342 B1 | 4/2002 | Koren et al. |
| D457,937 S | 5/2002 | Lindholm et al. |
| 6,382,531 B1 | 5/2002 | Tracy |
| D458,348 S | 6/2002 | Mullenmeister |
| 6,412,711 B1 | 7/2002 | Fan |
| D461,224 S | 8/2002 | Lobermeier |
| D461,878 S | 8/2002 | Green et al. |
| 6,450,425 B1 | 9/2002 | Chen |
| 6,454,186 B2 | 9/2002 | Haverstraw et al. |
| 6,463,658 B1 | 10/2002 | Larsson |
| 6,464,265 B1 | 10/2002 | Mikol |
| D465,552 S | 11/2002 | Tse |
| D465,553 S | 11/2002 | Singtoroj |
| 6,484,952 B2 | 11/2002 | Koren |
| D468,800 S | 1/2003 | Tse |
| D469,165 S | 1/2003 | Lim |
| 6,502,796 B1 | 1/2003 | Wales |
| 6,508,415 B2 | 1/2003 | Wang |
| 6,511,001 B1 | 1/2003 | Huang |
| D470,219 S | 2/2003 | Schweitzer |
| 6,515,070 B2 | 2/2003 | Kobylanska et al. |
| D471,253 S | 3/2003 | Tse |
| D471,953 S | 3/2003 | Colligan et al. |
| 6,533,194 B2 | 3/2003 | Marsh et al. |
| 6,537,455 B2 | 3/2003 | Farley |
| D472,958 S | 4/2003 | Ouyoung |
| 6,550,697 B2 | 4/2003 | Lai |
| 6,585,174 B1 * | 7/2003 | Huang ................ 239/581.1 |
| 6,595,439 B1 | 7/2003 | Chen |
| 6,607,148 B1 | 8/2003 | Marsh et al. |
| 6,611,971 B1 | 9/2003 | Antoniello et al. |
| 6,637,676 B2 | 10/2003 | Zieger et al. |
| 6,641,057 B2 | 11/2003 | Thomas et al. |
| D483,837 S | 12/2003 | Fan |
| 6,659,117 B2 | 12/2003 | Gilmore |
| 6,659,372 B2 | 12/2003 | Marsh et al. |
| D485,887 S | 1/2004 | Luettgen et al. |
| D486,888 S | 2/2004 | Lobermeier |
| 6,691,338 B2 | 2/2004 | Zieger |
| 6,691,933 B1 | 2/2004 | Bosio |
| D487,301 S | 3/2004 | Haug et al. |
| D487,498 S | 3/2004 | Blomstrom |
| 6,701,953 B2 | 3/2004 | Agosta |
| 6,715,699 B1 | 4/2004 | Greenberg et al. |
| 6,719,218 B2 | 4/2004 | Cool et al. |
| D489,798 S | 5/2004 | Hunt |
| D490,498 S | 5/2004 | Golichowski |
| 6,736,336 B2 | 5/2004 | Wong |
| 6,739,523 B2 | 5/2004 | Haverstraw et al. |
| 6,739,527 B1 | 5/2004 | Chung |
| D492,004 S | 6/2004 | Haug et al. |
| D492,007 S | 6/2004 | Kollmann et al. |
| 6,742,725 B1 | 6/2004 | Fan |
| D493,208 S | 7/2004 | Lin |
| D493,864 S | 8/2004 | Haug et al. |
| D494,655 S | 8/2004 | Lin |
| D494,661 S | 8/2004 | Zieger et al. |
| D495,027 S | 8/2004 | Mazzola |
| 6,776,357 B2 | 8/2004 | Naito |
| 6,789,751 B1 | 9/2004 | Fan |
| D496,987 S | 10/2004 | Glunk |
| D497,974 S | 11/2004 | Haug et al. |
| D498,514 S | 11/2004 | Haug et al. |
| D500,121 S | 12/2004 | Blomstrom |
| D500,549 S | 1/2005 | Blomstrom |
| D501,242 S | 1/2005 | Blomstrom |
| D502,760 S | 3/2005 | Zieger et al. |
| D502,761 S | 3/2005 | Zieger et al. |
| D503,211 S | 3/2005 | Lin |
| 6,863,227 B2 | 3/2005 | Wollenberg et al. |
| 6,869,030 B2 | 3/2005 | Blessing et al. |
| D503,774 S | 4/2005 | Zieger |
| D503,775 S | 4/2005 | Zieger |
| D503,966 S | 4/2005 | Zieger |
| 6,899,292 B2 | 5/2005 | Titinet |
| D506,243 S | 6/2005 | Wu |
| D507,037 S | 7/2005 | Wu |
| 6,935,581 B2 | 8/2005 | Titinet |
| D509,280 S | 9/2005 | Bailey et al. |
| D509,563 S | 9/2005 | Bailey et al. |
| D510,123 S | 9/2005 | Tsai |
| D511,809 S | 11/2005 | Haug et al. |
| D512,119 S | 11/2005 | Haug et al. |
| 6,981,661 B1 | 1/2006 | Chen |
| D516,169 S | 2/2006 | Wu |
| 7,000,854 B2 | 2/2006 | Malek et al. |
| 7,004,409 B2 | 2/2006 | Okubo |
| 7,004,410 B2 | 2/2006 | Li |
| D520,109 S | 5/2006 | Wu |
| 7,040,554 B2 | 5/2006 | Drennow |
| 7,048,210 B2 | 5/2006 | Clark |
| 7,055,767 B2 | 6/2006 | Ko |
| 7,070,125 B2 | 7/2006 | Williams et al. |
| 7,077,342 B2 | 7/2006 | Lee |
| D527,440 S | 8/2006 | Macan |
| 7,093,780 B1 | 8/2006 | Chung |
| 7,097,122 B2 | 8/2006 | Farley |
| D528,631 S | 9/2006 | Gillette et al. |
| 7,100,845 B1 | 9/2006 | Hsieh |
| 7,111,795 B2 | 9/2006 | Thong |
| 7,111,798 B2 | 9/2006 | Thomas et al. |
| D530,389 S | 10/2006 | Glenslak et al. |
| D530,392 S | 10/2006 | Tse |
| D531,259 S | 10/2006 | Hsieh |

| | | | | | | |
|---|---|---|---|---|---|---|
| 7,114,666 | B2 | 10/2006 | Luettgen et al. | 2008/0272591 A1 | 11/2008 | Leber |
| D533,253 | S | 12/2006 | Luettgen et al. | 2009/0200404 A1 | 8/2009 | Cristina |
| D534,239 | S | 12/2006 | Dingler et al. | 2009/0218420 A1 | 9/2009 | Mazzola |
| D535,354 | S | 1/2007 | Wu | 2009/0307836 A1 | 12/2009 | Blattner et al. |
| D536,060 | S | 1/2007 | Sadler | 2010/0320290 A1 | 12/2010 | Luettgen et al. |
| 7,156,325 | B1 | 1/2007 | Chen | 2011/0000982 A1 | 1/2011 | Luettgen et al. |
| D538,391 | S | 3/2007 | Mazzola | 2011/0000983 A1 | 1/2011 | Chang |
| D540,424 | S | 4/2007 | Kirar | 2011/0011953 A1 | 1/2011 | Macan et al. |
| D540,425 | S | 4/2007 | Endo et al. | | | |

FOREIGN PATENT DOCUMENTS

| | | |
|---|---|---|
| D540,426 S 4/2007 Cropelli | CH | 234284 | 3/1963 |
| D540,427 S 4/2007 Bouroullec et al. | DE | 352813 | 5/1922 |
| D542,391 S 5/2007 Gilbert | DE | 848627 | 9/1952 |
| D542,393 S 5/2007 Haug et al. | DE | 854100 | 10/1952 |
| 7,229,031 B2 6/2007 Schmidt | DE | 2360534 | 6/1974 |
| 7,243,863 B2 7/2007 Glunk | DE | 2806093 | 8/1979 |
| 7,246,760 B2 7/2007 Marty et al. | DE | 3107808 | 9/1982 |
| D552,713 S 10/2007 Rexach | DE | 3246327 | 6/1984 |
| 7,278,591 B2 10/2007 Clearman et al. | DE | 3440901 | 7/1985 |
| D556,295 S 11/2007 Genord et al. | DE | 3706320 | 3/1988 |
| 7,299,510 B2 11/2007 Tsai | DE | 8804236 | 6/1988 |
| D557,763 S 12/2007 Schonherr et al. | DE | 4034695 | 5/1991 |
| D557,764 S 12/2007 Schonherr et al. | DE | 19608085 | 9/1996 |
| D557,765 S 12/2007 Schonherr et al. | DE | 102006032017 | 1/2008 |
| D558,301 S 12/2007 Hoernig | EP | 0167063 | 6/1985 |
| 7,303,151 B2 12/2007 Wu | EP | 0478999 | 4/1992 |
| D559,357 S 1/2008 Wang et al. | EP | 0514753 | 11/1992 |
| D559,945 S 1/2008 Patterson et al. | EP | 0435030 | 7/1993 |
| D560,269 S 1/2008 Tse | EP | 0617644 | 10/1994 |
| D562,937 S 2/2008 Schonherr et al. | EP | 0683354 | 11/1995 |
| D562,938 S 2/2008 Blessing | EP | 0687851 | 12/1995 |
| D562,941 S 2/2008 Pan | EP | 0695907 | 2/1996 |
| 7,331,536 B1 2/2008 Zhen et al. | EP | 0700729 | 3/1996 |
| 7,347,388 B2 3/2008 Chung | EP | 0719588 | 7/1996 |
| D565,699 S 4/2008 Berberet | EP | 0721082 | 7/1996 |
| D565,703 S 4/2008 Lammel et al. | EP | 0733747 | 9/1996 |
| D566,228 S 4/2008 Neagoe | EP | 0808661 | 11/1997 |
| D566,229 S 4/2008 Rexach | EP | 0726811 | 1/1998 |
| D567,328 S 4/2008 Spangler et al. | EP | 2164642 | 10/2010 |
| 7,360,723 B2 4/2008 Lev | EP | 2260945 | 12/2010 |
| 7,364,097 B2 4/2008 Okuma | FR | 538538 | 6/1922 |
| 7,374,112 B1 5/2008 Bulan et al. | FR | 873808 | 7/1942 |
| 7,384,007 B2 6/2008 Ho | FR | 1039750 | 10/1953 |
| D577,099 S 9/2008 Leber | FR | 1098836 | 8/1955 |
| D577,793 S 9/2008 Leber | FR | 2596492 | 10/1987 |
| D580,012 S 11/2008 Quinn et al. | FR | 2695452 | 3/1994 |
| D580,513 S 11/2008 Quinn et al. | GB | 10086 | 4/1894 |
| D581,014 S 11/2008 Quinn et al. | GB | 3314 | 12/1914 |
| 7,503,345 B2 * 3/2009 Paterson et al. .......... 137/625.47 | GB | 129812 | 7/1919 |
| 7,520,448 B2 4/2009 Luettgen et al. | GB | 204600 | 10/1923 |
| 7,537,175 B2 5/2009 Miura et al. | GB | 634483 | 3/1950 |
| 7,832,662 B2 11/2010 Gallo | GB | 971866 | 10/1964 |
| 2003/0062426 A1 4/2003 Gregory et al. | GB | 1111126 | 4/1968 |
| 2004/0118949 A1 6/2004 Marks | GB | 2066074 | 1/1980 |
| 2004/0244105 A1 12/2004 Tsai | GB | 2066704 | 7/1981 |
| 2005/0001072 A1 1/2005 Bolus et al. | GB | 2068778 | 8/1981 |
| 2005/0082824 A1 4/2005 Luettgen et al. | GB | 2121319 | 12/1983 |
| 2005/0284967 A1 12/2005 Korb | GB | 2155984 | 10/1985 |
| 2006/0016908 A1 1/2006 Chung | GB | 2156932 A | 10/1985 |
| 2006/0016913 A1 1/2006 Lo | GB | 2199771 | 7/1988 |
| 2006/0043214 A1 3/2006 Macan et al. | GB | 2298595 | 11/1996 |
| 2006/0060678 A1 3/2006 Mazzola | GB | 2337471 | 11/1999 |
| 2006/0102747 A1 5/2006 Ho | IT | 327400 | 7/1935 |
| 2006/0157590 A1 7/2006 Clearman et al. | IT | 350359 | 7/1937 |
| 2006/0163391 A1 7/2006 Schorn | IT | 563459 | 5/1957 |
| 2006/0219822 A1 10/2006 Miller et al. | JP | S63-181459 | 11/1988 |
| 2006/0283986 A1 12/2006 Chung | JP | H2-78660 | 6/1990 |
| 2007/0040054 A1 2/2007 Farzan | JP | 4062238 | 2/1992 |
| 2007/0200013 A1 8/2007 Hsiao | JP | 4146708 | 5/1992 |
| 2007/0246577 A1 10/2007 Leber | NL | 8902957 | 6/1991 |
| 2007/0252021 A1 11/2007 Cristina | WO | WO93/12894 | 7/1993 |
| 2007/0272770 A1 11/2007 Leber et al. | WO | WO93/25839 | 12/1993 |
| 2008/0073449 A1 3/2008 Haynes et al. | WO | WO96/00617 | 1/1996 |
| 2008/0083844 A1 4/2008 Leber et al. | WO | WO98/30336 | 7/1998 |
| 2008/0111004 A1 5/2008 Huffman | WO | WO99/59726 | 11/1999 |
| 2008/0121293 A1 5/2008 Leber | WO | WO00/10720 | 3/2000 |
| 2008/0156897 A1 7/2008 Leber | WO | WO2010/004593 | 1/2010 |
| 2008/0156902 A1 7/2008 Luettgen et al. | | | |
| 2008/0156903 A1 7/2008 Leber | * cited by examiner | | |
| 2008/0223957 A1 9/2008 Schorn | | | |

LOW FLOW SHOWERHEAD AND METHOD OF MAKING SAME

CROSS-REFERENCE TO RELATED APPLICATIONS

This application claims under 35 U.S.C. §119(e) the benefit of U.S. provisional application No. 60/916,146, entitled "Low Flow Showerhead and Method of Making Same" and filed on May 4, 2007; U.S. provisional application No. 60/916,219, entitled "Hidden Pivot Attachment for Showers and Method of Making Same" and filed May 4, 2007; and U.S. provisional application No. 60/916,092, entitled "Molded Arm for Showerheads and Method of Making Same" and filed May 4, 2007, the disclosures of which are hereby incorporated herein by reference in their entireties.

INCORPORATION BY REFERENCE

The following patent applications are hereby incorporated by reference herein in their entireties: U.S. patent application Ser. No. 11/964,670, filed Dec. 26, 2007 and entitled "Low Speed Pulsating Showerhead"; U.S. patent application Ser. No. 12/112,697, filed Apr. 30, 2008 and entitled "Molded Arm for Showerheads And Method Of Making Same"; and U.S. patent application Ser. No. 12/112,751, filed Apr. 30, 2008 and entitled "Hidden Pivot Attachment for Showers and Method Of Making Same".

FIELD OF INVENTION

The present invention relates generally to showerheads, and more particularly to low flow showerheads.

BACKGROUND

Showerheads by regulatory mandate are not permitted to flow greater than 2.5 gallons per minute ("GPM") at a specified line pressure. As a result of these regulations, showerheads often include a flow regulator to limit the flow from the showerhead to a maximum of 2.5 GPM of water. In connection therewith, showerheads and their water passageways are designed and optimized for a flow rate of 2.5 GPM. Unfortunately, a flow rate of 2.5 GPM still results in a large volume of water usage. Showerheads may include a user selectable adjustment mechanism, for the adjustment of water pressure and/or spray pattern flowing from the showerhead, but such systems are dependent upon a user's selection and often positioned in a location of the hydraulic path leading to an unwanted pressure drop. In addition, many such devices fail to maintain sufficient pressure throughout the showerhead, and in particular, often include flow patterns within the showerhead causing a large pressure drop in the showerhead before the water reaches the exit nozzles. As a result, the showerhead does not work correctly, and discharges water at a low pressure, or with a weak spray, leading to an unsatisfactory shower experience. This weak spray, on occasion, further causes users to remove the flow regulator to increase water flow and pressure, thereby eliminating any conservation advantages gained by the use of the flow regulator.

Accordingly, what is needed in the art is an improved low flow rate showerhead and assembly that reduces the flow of water through the showerhead, yet maintains a desirable feeling shower.

SUMMARY OF THE INVENTION

One embodiment of the present invention may take the form of a showerhead. The showerhead may include a showerhead housing and a showerhead engine. The showerhead housing may include a fluid passage. The showerhead engine may be moveably associated with the showerhead housing. The showerhead engine may include a back member, an intermediate member, and a front member. The back member may include a first back member fluid aperture in selective fluid communication with the fluid passage and a second back member fluid aperture in selective fluid communication with the fluid passage. The intermediate member may include a first intermediate fluid aperture and a second intermediate member fluid aperture.

The back member and the intermediate member may define a first fluid chamber and a second fluid chamber. The first fluid chamber may be in fluid communication with the first back and intermediate member fluid apertures. The second fluid chamber may be in fluid communication with the second back and intermediate member fluid apertures. The intermediate member and the front member may define a third fluid chamber and a fourth fluid chamber. The third fluid chamber may be in fluid communication with the first intermediate fluid aperture and a first fluid outlet. The fourth fluid chamber may be in fluid communication with the second intermediate fluid aperture and a second fluid outlet. The first fluid chamber may be upstream of the third fluid chamber. The second fluid chamber may be upstream of the fourth fluid chamber. Selective movement of the showerhead engine relative to the showerhead housing selectively enables and ends fluid communication between the fluid passage and at least one of the first and second back member fluid apertures.

Another embodiment of the present invention may take the form of a showerhead. The showerhead may include a showerhead engine and a flow control device. The showerhead engine may include at least two spray modes. The flow control device may be operatively associated with the showerhead engine. The flow control device may be selectively operable to pause fluid flow for any of the at least two spray modes. In some embodiments, the showerhead may further include a flow restrictor with a maximum flow rating of approximately 1.5 gallons per minute or less. The flow restrictor may be operatively associated with the showerhead engine and may limit a maximum fluid flow rate of a fluid delivered from the showerhead engine to approximately 1.5 gallons per minute.

DESCRIPTION OF THE INVENTION

Described herein are various embodiments of showerheads and showerhead assemblies employing flow rates less than 2.5 gallons per minute ("GPM"). These showerheads and showerhead assemblies use flow regulators to supply flow rates less than the 2.5 GPM flow rate used in conventional showerhead. To accommodate these lower flow rates, the fluid passages within the showerhead and the fluid outlets that deliver fluid from the showerhead are configured and/or sized to increase fluid exit velocity compared to a conventional 2.5 GPM showerhead by minimizing fluid pressure drop or energy loss through the showerhead and/or by enhancing the pressure drop at the fluid outlet. The showerheads may further include large water passages to allow unrestricted flow to the exit nozzles, thus allowing the maximum available pressure drop at the fluid outlets to provide appropriate fluid exit velocities for the lower flow rate. Some embodiments of the showerhead may include a user operated flow device for further adjusting the flow of liquid from the showerhead.

The showerheads and showerhead assemblies of the embodiments shown the figures may be used with a handheld showerhead, a wall mounted showerhead or any other appropriate showerhead. The handheld and wall mounted showerheads may be fluidly joined to a water supply line. The water supply line may be controlled with a water control valve or knob.

Figure 1:
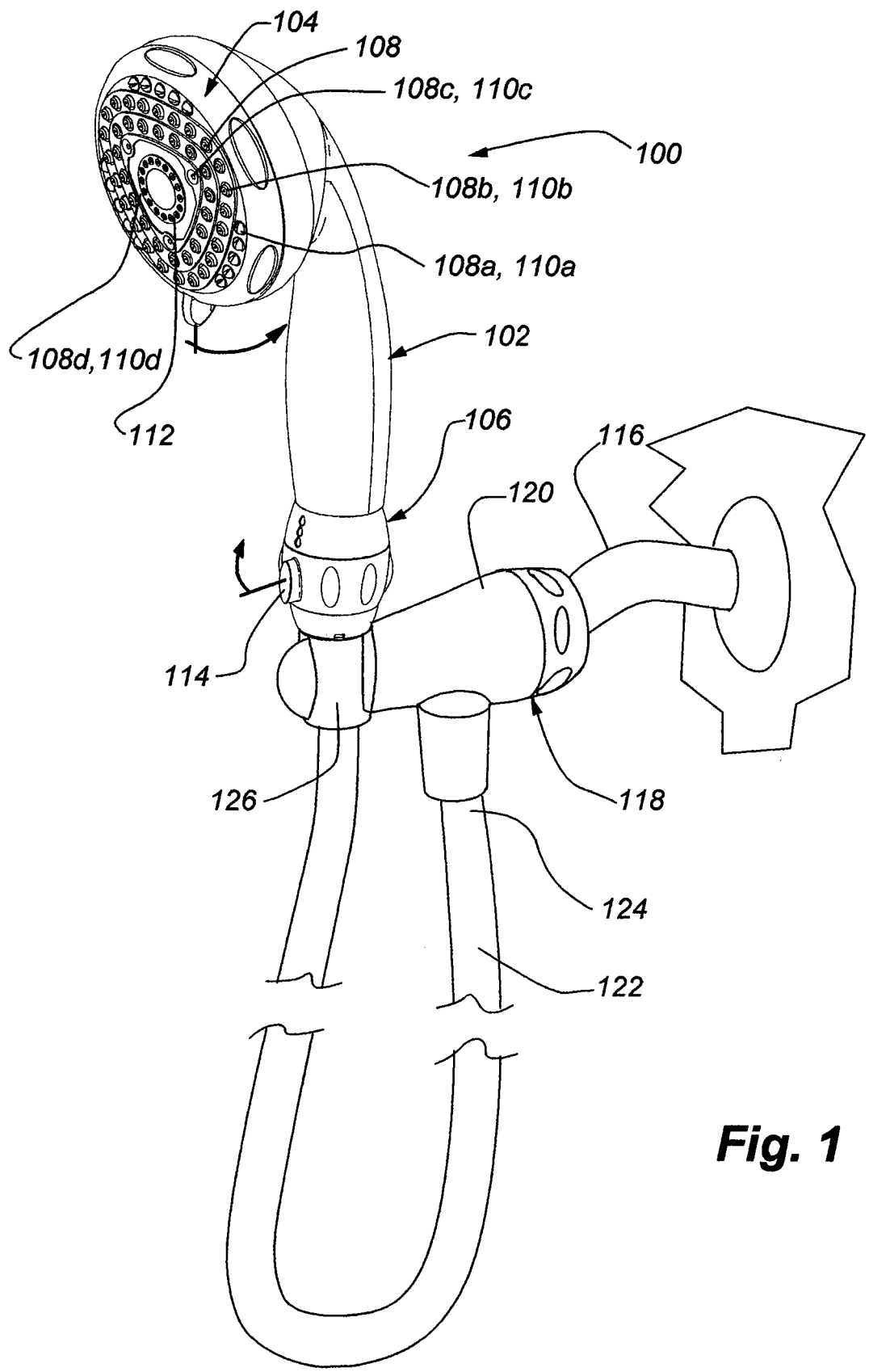
FIG. 1 is a perspective view of a handheld showerhead joined to a fluid supply pipe via a bracket and a handheld showerhead fluid conduit.
Figure 2:
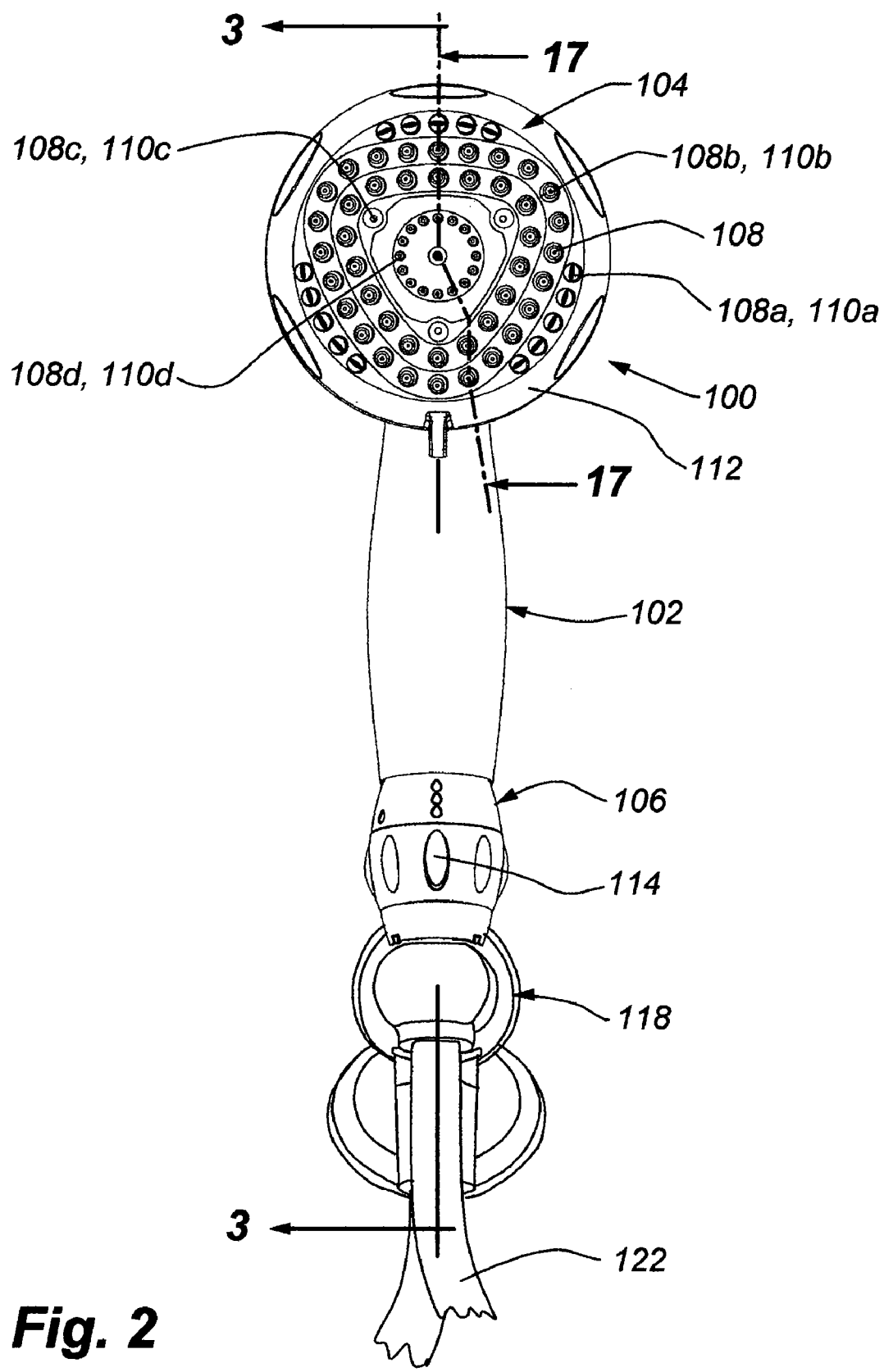
FIG. 2 is a front elevation view of the handheld showerhead of FIG. 1.

FIGS. 1-27 depict an embodiment of a low flow handheld showerhead 100. FIG. 1 shows a perspective view of the handheld showerhead 100, and FIG. 2 shows a front view of the handheld showerhead 100 shown in FIG. 1. The handheld showerhead 100 may include a handheld showerhead housing 102, a showerhead engine 104, and a flow control device 106. The showerhead engine 104 may be joined to an upper end portion of the handheld showerhead housing 102. The showerhead engine 104 may include one or more fluid outlets 108 that deliver a fluid, such as water, from the handheld showerhead 100. The fluid outlets 108 may take the form of nozzles, openings or holes, or any other suitable structure for delivering fluid from the handheld showerhead 100.

The fluid outlets 108 may be configured into one or more groups 110a-d. Each such group 110a-d may be associated with one or more operation modes for the handheld showerhead 100. When a fluid outlet group 110a-d is associated with a particular mode during operation of the handheld showerhead 100, fluid is delivered from one or more of the fluid outlets 108a-d in the group when the associated mode is selected, and fluid is not delivered from these fluid outlets 108a-d when the associated mode is not selected. At least a portion of the showerhead engine 104 may be selectively moveable relative to the handheld showerhead housing 102 to change an operation mode of the handheld showerhead 100.

The fluid outlets 108 may be configured into four groups 110a-d. If desired, the fluid outlets 108 may be configured into more or less than four groups. Each of the four fluid outlet groups 110a-d may be associated with a distinct spray or operation mode. The first fluid outlet group 110a may include an outer row of three generally arcuate lines of five fluid outlets 108b (e.g., nozzles), which may be associated with a fan spray mode. The second fluid outlet group 110b may include two rows of fluid outlets 108b (e.g., nozzles) adjacent to but radially inward from the outer row of fluid outlets 110a. The second fluid outlet group 110b may be associated with a full body spray mode. The third fluid outlet group 110c may include three fluid outlets 108c (e.g. nozzles) positioned adjacent to but radially inward from the second group of fluid outlets 108c. This third group of fluid outlets 108c may be associated with a mist spray mode. The fourth fluid outlet group 110d may include the generally circular row of fluid outlets 110d (e.g. nozzles) positioned within the central area of the showerhead face member 112. The fourth group of fluid outlets 110d may be associated with a pulsating spray mode. Although the modes are described with a certain particularity, any fluid outlet group may be associated with any type of showerhead mode or spray, including but not limited to a drenching spray, a champagne spray, a fun spray, a mist spray, a message spray and so on.

The flow control device 106 may be joined to a lower end portion of the handheld showerhead housing 102. At least a portion of the flow control device 106 may be selectively moved relative to the handheld showerhead housing 102 to selectively change the flow rate of fluid delivered to the handheld showerhead 100. The flow control device 106 may include a knob 114 or other user engagement feature that a user may grasp to move the at least a portion of the flow control device 106 relative to the handheld showerhead housing 102.

The handheld showerhead 100 may be mechanically and fluidly joined to a fluid supply line or source by a bracket 118 or other suitable fitting. The bracket 118 may be a bracket similar to the one described in the U.S. Patent Application No. 60/916,219 (the '219 Application), entitled "Hidden Pivot Attachment for Showers and Method of Making Same" and filed May 4, 2007, or any other commercially available or otherwise known handheld showerhead attachment device or bracket. The bracket described in the '219 Application will be briefly described below. A more detailed description of the bracket may be found in the '219 Application.

The bracket 118 may include a bracket housing 120 including a receptor for joining the handheld showerhead 100 to the bracket 118 and for retaining the handheld showerhead 100 in a rest position. The bracket 118 may be joined to the fluid pipe 116 that supplies fluid to the handheld showerhead 100. The bracket 118 may further be attached to a handheld showerhead conduit 122, such as a flexible hose, at a first end, or upstream, portion 124, of the showerhead conduit 122. A second end, or downstream, portion 126 of the handheld showerhead conduit 122 may be joined to the handheld showerhead 100, thus providing fluid communication between the bracket 118 and the handheld showerhead 100. The handheld showerhead conduit 122 may extend a length suitable for use by the user as a hand operated showerhead and may be made of commercially available material, such as a plastic, a composite or the like.

Figure 3:
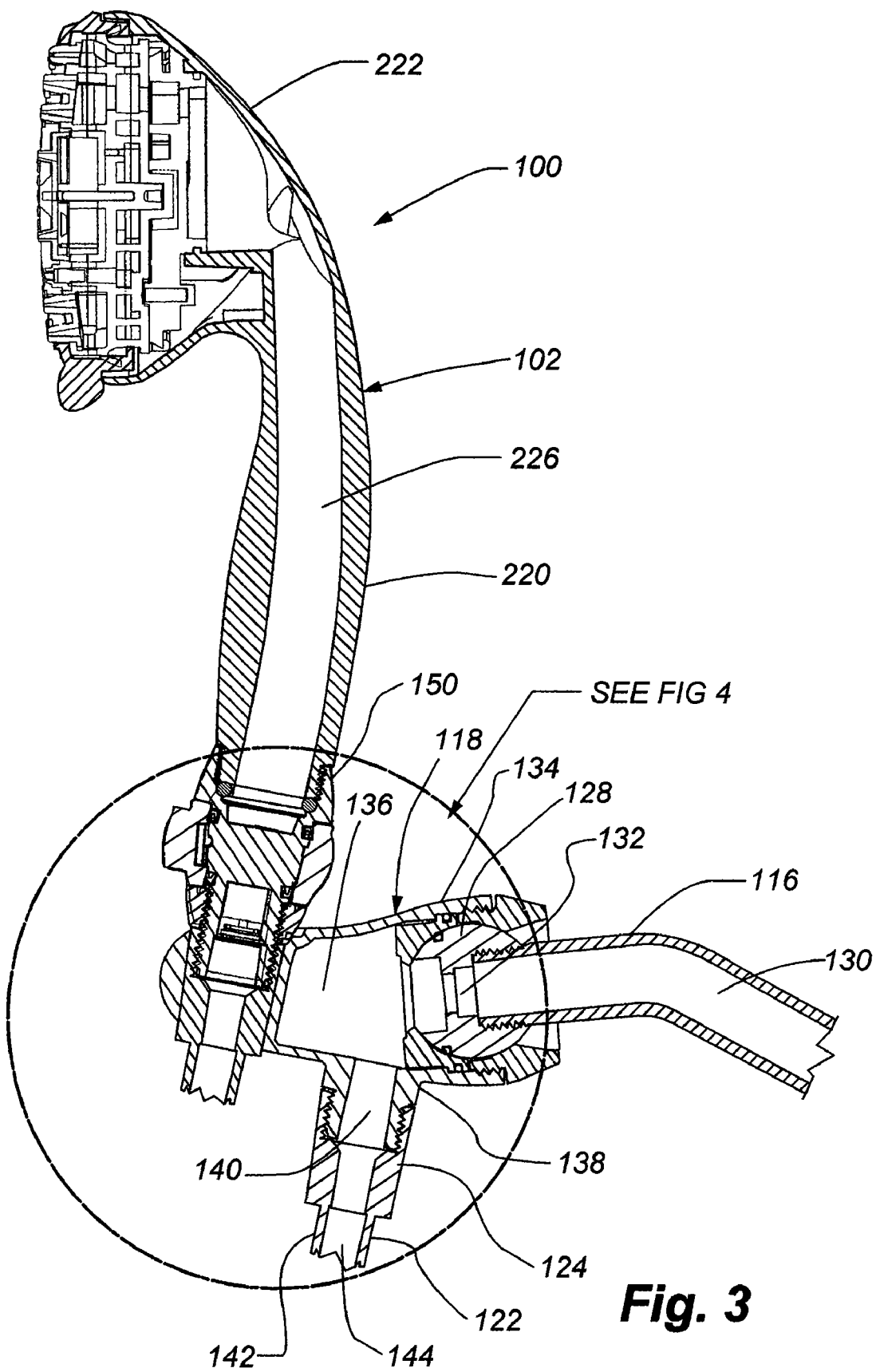
FIG. 3 is a cross-section view of the handheld showerhead of FIG. 1, viewed along line 3-3 in FIG. 2, where the showerhead engine is in a first position relative to the handheld showerhead housing.
Figure 4:
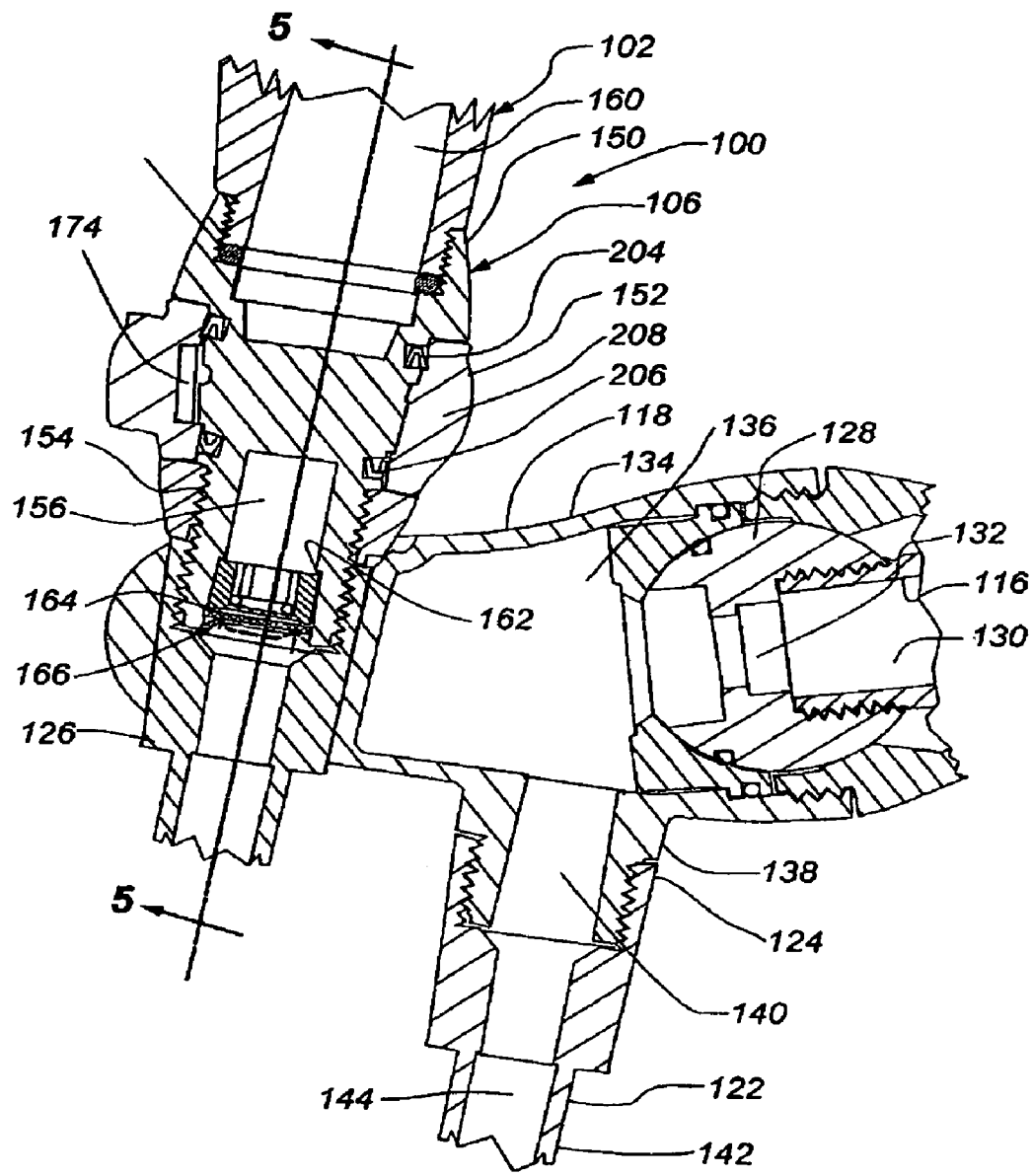
FIG. 4 is an enlarged cross-section view of FIG. 3, showing a portion of the handheld showerhead of FIG. 1.
Figure 5:
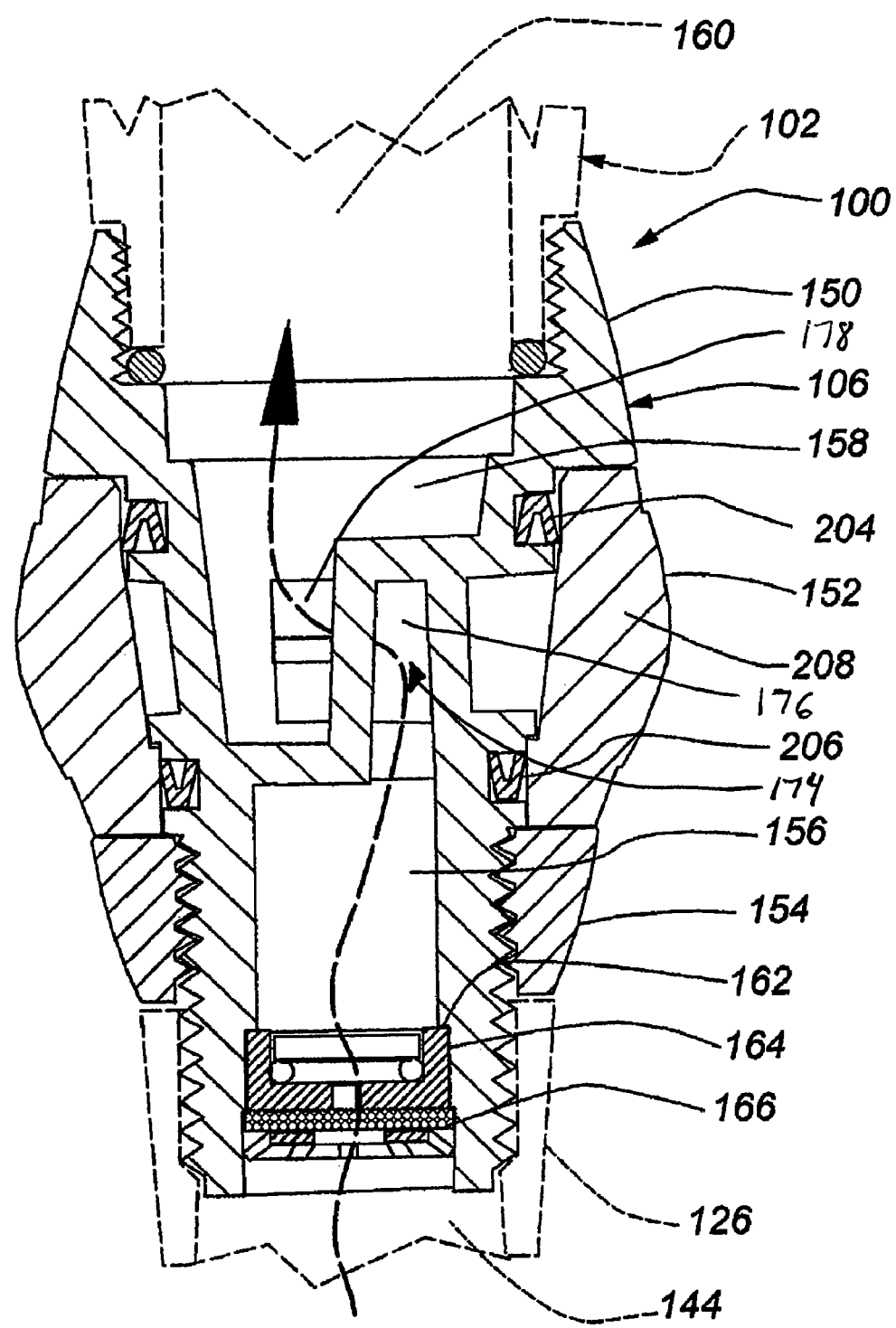
FIG. 5 is a cross-section view of a portion of the handheld showerhead of FIG. 1, viewed along line 5-5 in FIG. 4.
Figure 6:
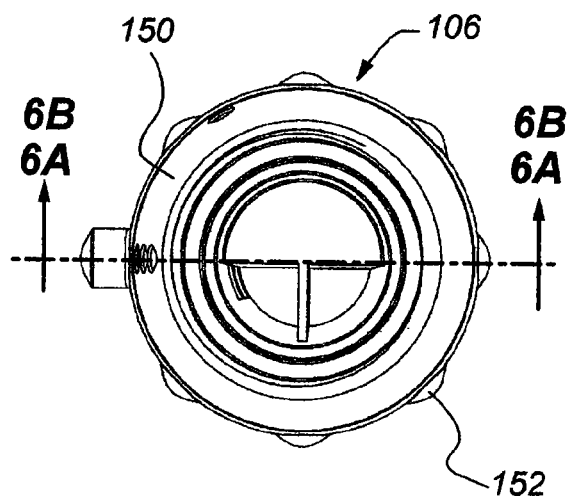
FIG. 6 is a top view of a flow control device for the handheld showerhead of FIG. 1.
Figure 7:
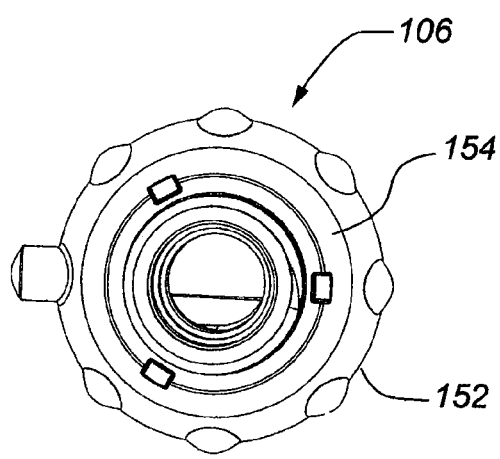
FIG. 7 is a bottom plan view of the flow control device of FIG. 6, with a flow restrictor, a filter screen, and a flow restrictor fastener not shown for clarity.
Figure 8:
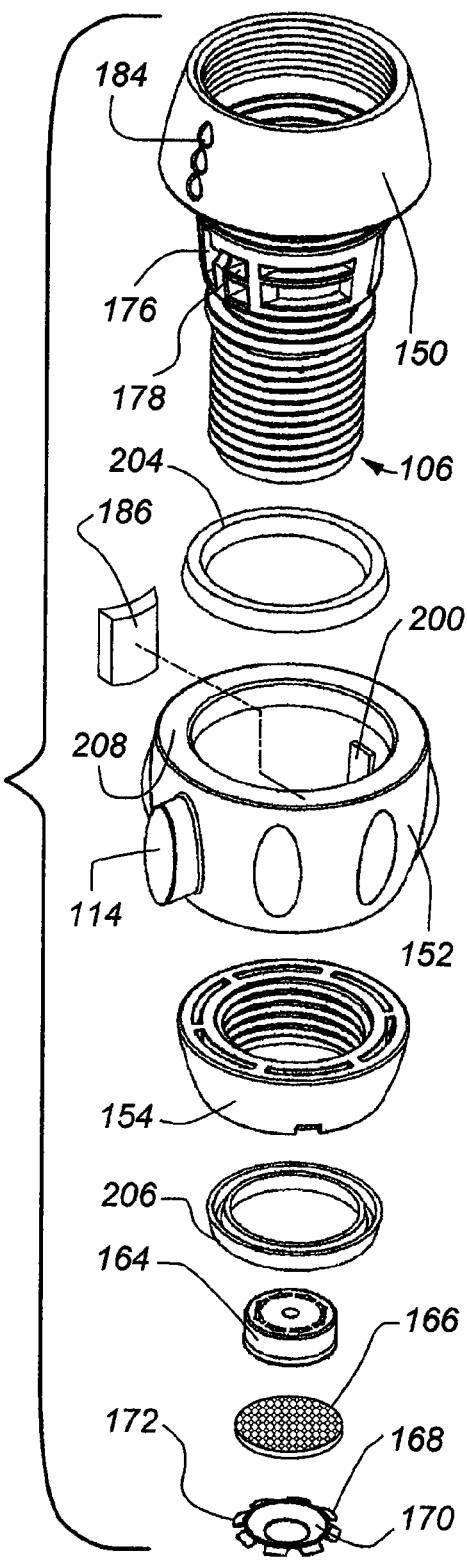
FIG. 8 is an exploded perspective view of the flow control device of FIG. 6.
Figure 9:
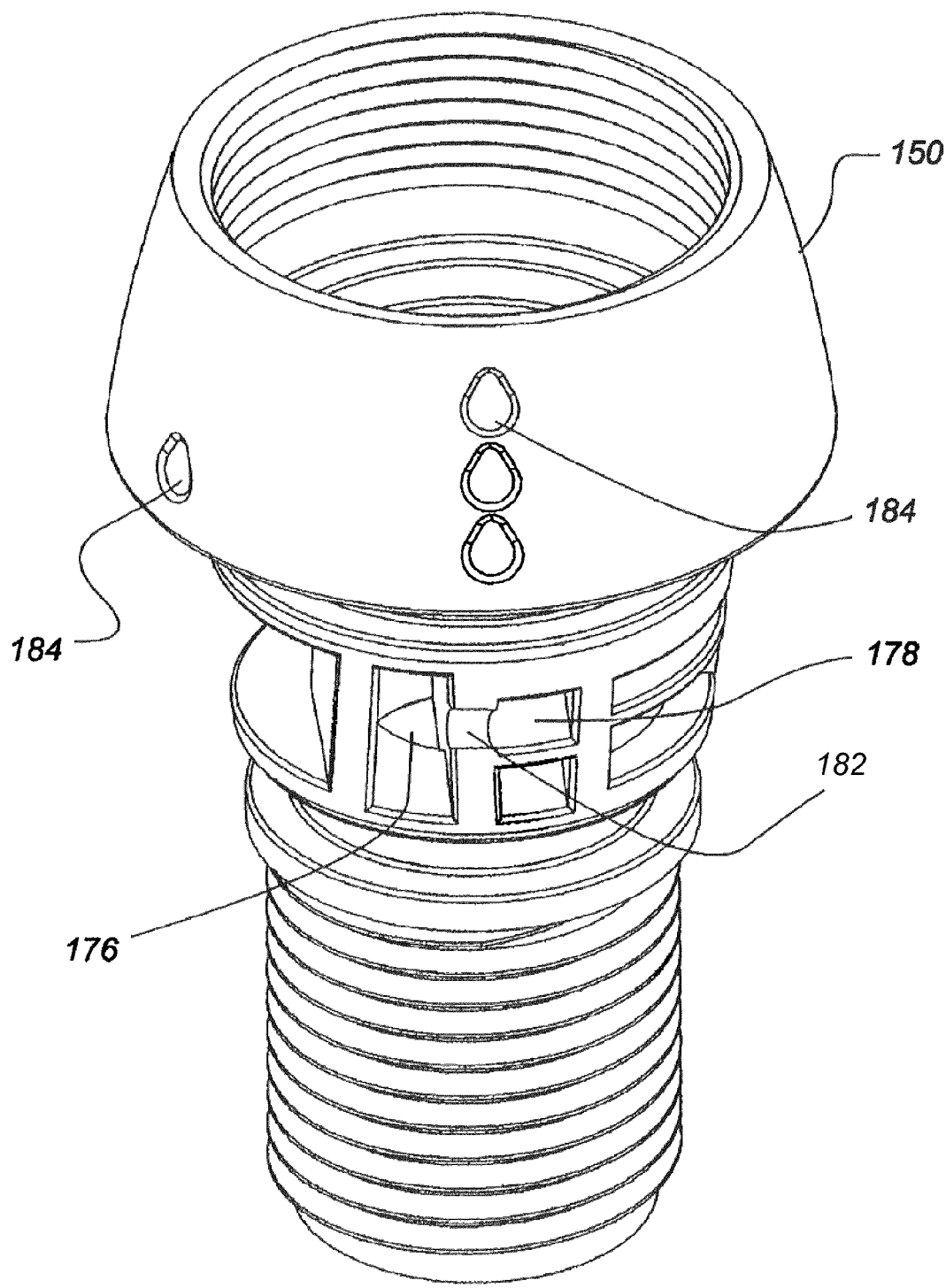
FIG. 9 is a perspective view of a flow control housing for the flow control device of FIG. 6.
Figure 10:
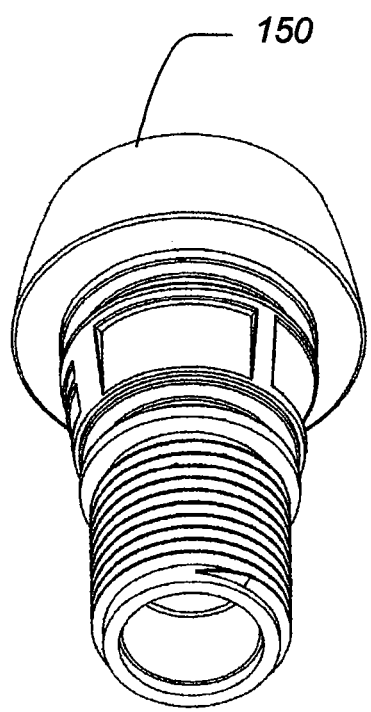
FIG. 10 is another perspective view of the flow control housing of FIG. 9.
Figure 11:
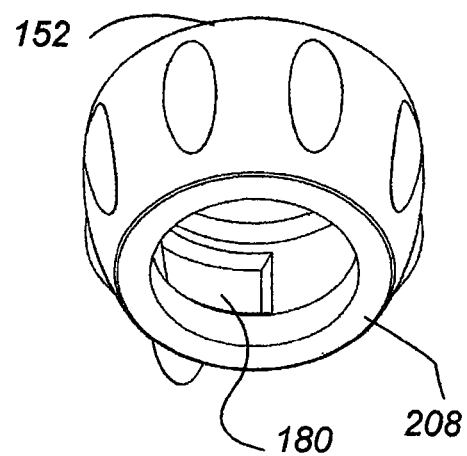
FIG. 11 is a perspective view of a flow control ring for the flow control device of FIG. 6.
Figure 12:
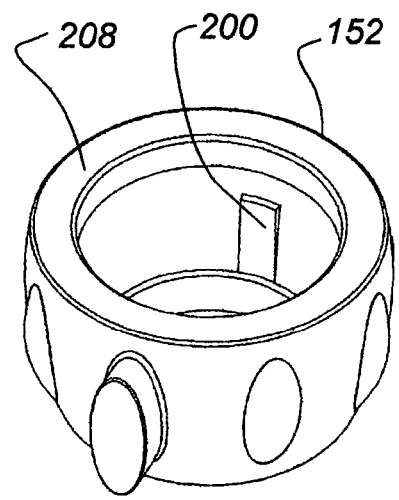
FIG. 12 is another perspective view of the flow control ring of FIG. 11.

FIG. 3 depicts a cross-section view of the handheld showerhead 100 shown in FIGS. 1 and 2. FIG. 4 depicts an enlarged cross-section view of a portion of the handheld showerhead 100. FIG. 5 depicts another cross-section view of a portion of the handheld showerhead 100, view along line 5-5 in FIG. 4. FIG. 6 depicts a top view of the flow control device 106, and FIG. 7 depicts a bottom plan view of the flow control device 106 with a flow restrictor, filter screen, and flow control fastener not shown. FIG. 8 depicts an exploded perspective view of the flow control device 106. FIG. 9 depicts a perspective view of a flow control housing of the flow control device 106. FIG. 10 depicts another perspective view of the flow control housing shown in FIG. 9. FIG. 11 depicts a perspective view of flow control ring of the flow control device 106. FIG. 12 depicts another perspective view of the flow control ring shown in FIG. 11.

With reference to FIGS. 3 and 4, the water pipe or other fluid supply conduit 116 may include a threaded end for engagement with a pivot ball 128 pivotally joined to the bracket 118. The water pipe 116 and pivot ball 128 may each include generally co-axially aligned fluid passages for delivering water or other fluid from the fluid source to the bracket 118. The bracket 118 may include a bracket body 134 defining a fluid passage or chamber 136 in fluid communication with the pivot ball fluid passage 132. A generally annular or other suitably shaped bracket sidewall 138 may extend from the bracket body 134. The bracket sidewall 138 may define a bracket sidewall fluid passage 140 in fluid communication with the bracket fluid passage 136.

An end portion of the bracket sidewall 138 may be externally threaded to engage with internal threads formed on the first or upstream end portion 124 of the handheld showerhead conduit 122. In other embodiments, the bracket sidewall 138 may be internally threaded and the upstream end portion 124 of the handheld showerhead conduit 122 may be externally threaded. Engagement of the bracket sidewall threads and the upstream handheld showerhead conduit threads joins the handheld showerhead conduit 122 to the bracket 118. Although shown as threadedly joined together, the bracket 118 and handheld showerhead conduit 122 may be joined by any known connection method, including, but not limited to, press-fit, mechanical fasteners, welds, and so on.

The handheld showerhead conduit 122 may include a handheld showerhead conduit body 142 defining a handheld showerhead conduit fluid passage 144. The handheld showerhead conduit fluid passage 144 may generally co-axially align with the bracket sidewall fluid passage 140 when the handheld showerhead conduit 122 is joined to the bracket 118. Thus, fluid may flow from the water pipe fluid passage 130 to the handheld showerhead conduit fluid passage 144 via the pivot ball fluid passage 132, the bracket fluid passage 136, and the bracket sidewall fluid passage 140.

With reference to FIGS. 4-12, the flow control device 106 may include a flow control housing 150, a flow control ring 152, and a flow control fastener 154. A lower end portion of the flow control housing 150 may be externally threaded to engage with internal threads formed on the second or downstream end portion 126 of the handheld showerhead conduit 122. In other embodiments, the lower end portion of the flow control housing 150 may be internally threaded and the downstream end portion 126 of the handheld showerhead conduit 122 may be externally threaded. Engagement of the lower end portion threads of the flow control housing 150 and the downstream handheld showerhead conduit threads joins the flow control device 106 to the handheld showerhead conduit 122. Although shown as threadedly joined together, the flow control device 106 and handheld showerhead conduit 122 may be joined by any known connection method, including, but not limited to, press-fit, mechanical fasteners, welds, and so on.

The upper end portion of the flow control housing 150 may be internally threaded to engage with external threads formed on an end of the handheld showerhead housing 102. In other embodiments, the upper end portion of the flow control housing 150 may be externally threaded and the end portion of the handheld showerhead housing 102 may be internally threaded. Engagement of the upper end portion threads of the flow control housing 150 and the handheld showerhead housing threads joins the flow control device 106 to the handheld showerhead housing 102. Although shown as threadedly joined together, the flow control device 106 and handheld showerhead housing 102 may be joined by any known connection method, including, but not limited to, press-fit, mechanical fasteners, welds, and so on.

The flow control housing 150 defines a lower flow control fluid chamber 156 in fluid communication with the handheld showerhead conduit fluid passage 144 when the flow control housing 150 and the handheld showerhead conduit 122 are joined. The flow control housing 150 also defines an upper flow control fluid chamber 158 in fluid communication with a fluid passage 160 defined by the handheld showerhead housing 102. As described in more detail below, the lower and upper fluid control chambers 156, 158 are in fluid communication, thus allowing fluid to flow from the handheld showerhead conduit fluid passage 144 to the handheld showerhead housing fluid passage 160 via these chambers 156, 158. Further, as described in more detail below, the flow rate between the lower and upper fluid control chambers 156, 158 may be changed by selectively rotating the flow control ring 152 around the flow control housing 150.

As the flow rate between the lower and upper fluid control chambers 156, 158 is changed, the flow rate delivered to the fluid outlets 108 in the handheld showerhead 100 from the water source via the bracket 118 and the handheld showerhead conduit 122 changes. Accordingly, a user may selectively increase or decrease the flow rate of fluid from the fluid outlets 108 in the handheld showerhead 100 by selective rotation of the flow control ring 152 relative to the flow control housing 150. Further, in some embodiments the flow control device 106 may allow a user to pause flow for any of the spray operation modes of the handheld showerhead 100, by selective rotation of the flow control ring 152 relative to the flow control housing 150.

The lower flow control fluid chamber 156 may be inwardly stepped to form a lower flow control fluid chamber ledge 162 for a flow restrictor 164 to engage. Positioning the flow restrictor 164 in the flow control device 106 rather than within the bracket 118 as conventionally done in handheld showerheads reduces the fluid pressure drop from the flow restrictor 164 to the fluid outlets 108 in the handheld showerhead 100 compared to a conventional handheld showerhead with the flow restrictor positioned within or proximate the bracket 118.

The flow restrictor 164 may take the form of a generally cylindrical or other suitably shaped component that includes one or more apertures or other openings to limit the flow of water through the flow restrictor 164. The flow restrictor 164 may limit the flow rate of fluid passing through it to approximately 1.5 Gallons Per Minute ("GPM") or less, thus resulting in a fluid flow rate delivered from the fluid outlets 108 of approximately 1.5 GPM or less. Conventional handheld and other showerheads employ flow restrictors that permit flow rates through their fluid outlets of up to approximately 2.5 GPM. Although a specific flow rating is disclosed herein, the flow restrictor 164 may employ any flow rating below the conventional 2.5 GPM flow rate.

A filter screen 166 may be positioned on the upstream side of the flow restrictor 164. The filter screen 166 may be formed from a wire or other type of mesh that defines one or more apertures to filter particles contained within fluid flowing through the flow restrictor 164. The filter screen apertures may be smaller than the flow restrictor apertures, thus reducing the potential for the apertures in the flow restrictor 164 to become clogged. A flow restrictor fastener 168 may be positioned upstream of the filter screen 166. The flow restrictor fastener 168 may include a generally annular flow restrictor fastener body 170 defining a hole for allowing fluid to flow through the flow restrictor fastener 168. One or more flow restrictor fastener tabs 172 may extend radially outward from the flow restrictor fastener body 170. The flow restrictor fastener tabs 172 may be at least somewhat flexible and may be engaged with the flow control housing 150 to join the flow restrictor fastener 168 to the flow control housing 150. The flow restrictor 164 and the filter screen 166 may be sandwiched between the flow control housing 150 and flow restrictor fastener 168, thus retaining the flow restrictor 164 and the filter screen 166 within the lower flow control fluid chamber 156 of the flow control housing 150.

As discussed above, the flow rate to the fluid outlets 108 in the handheld showerhead 100 may be further controlled using the flow control device 106. More particularly, the flow control ring 152 in combination with the flow control housing 150 may be used to change the flow rate to the fluid outlets 108 of the handheld showerhead 100. To change the flow rate, fluid communication between the lower and upper flow control fluid chambers 156, 158 may be selectively controlled by a flow control fluid chamber 174 defined by an inner surface of the flow control ring 152 and an outer surface of the flow control housing 150. Fluid communication between the flow control fluid chamber 174 and the lower flow control fluid chamber 156 may be provided by a lower fluid chamber outlet 176 defined in the flow control housing 150. Fluid communication between the flow control fluid chamber 174 and the upper flow control fluid chamber 158 may be provided by an upper fluid chamber inlet 178 defined in the flow control housing 150.

As perhaps best shown in FIGS. 8 and 9, the lower fluid chamber outlet 176 and the upper fluid chamber inlet 178 may be positioned proximate to each other on the flow control housing 150. The lower fluid chamber outlet 176 may be defined by a single, generally rectangular or other suitably shaped aperture. The upper fluid chamber inlet 178 may be defined by two generally rectangular or other suitably shaped apertures. More than a single aperture may be used for the lower fluid chamber outlet 176, and more or less than two apertures may be use for the upper fluid chamber inlet 178.

The portion of the flow control fluid chamber 174 in fluid communication with the lower and upper fluid control chambers 156, 158 may be selectively changed by rotating the flow control ring 152 relative to the flow control housing 150. Specifically, a flow control ring recess 180 (see FIGS. 6a and 11) may be defined in the flow control ring 152. The flow control ring recess 180 and the outer surface of the flow control housing 150 define the flow control fluid chamber 174. As the flow control ring 152 is rotated about the flow control housing 150, the position of the flow control ring recess 180, and thus the position of the flow control fluid chamber 174, changes relative to the flow control housing 150. The flow control ring 152 may be joined to the flow control housing 150 such that the flow control recess 180 may be moved from a first position over the lower fluid chamber outlet 176 and the upper fluid chamber inlet 178 (see FIG. 6A) to a second position in which it is not over at least one of the lower fluid chamber outlet 176 and the upper fluid chamber inlet 178 (see FIG. 6B). In some embodiments, as shown, for example, in FIG. 6B, the flow control recess 180 may be over neither the lower fluid chamber outlet 176 nor the upper fluid chamber inlet 178 in the second position.

Figure 6A:
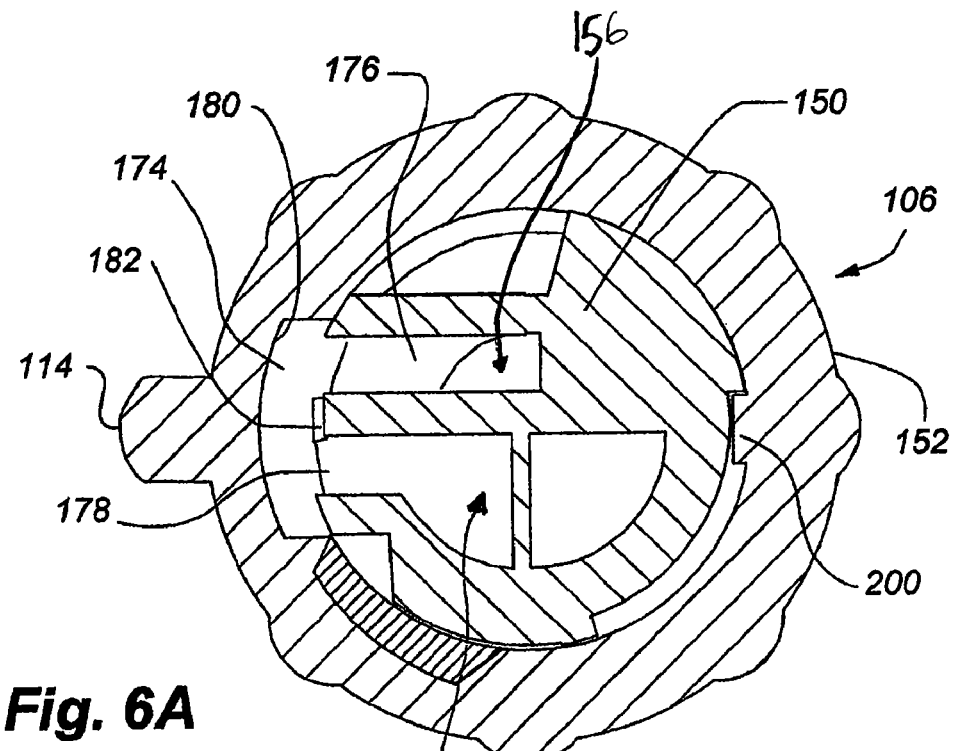
FIG. 6a is a cross-section view of the flow control device of FIG. 6, viewed along line 6A-6A in FIG. 6, showing a flow control ring in a first position relative to a flow control housing.

In the first position, as shown, for example, in FIG. 6A, the flow control recess 180, and thus the flow control fluid chamber 174, is in fluid communication with both the lower fluid chamber outlet 176 and the upper fluid chamber inlet 178. In the second position, as shown, for example, in FIG. 6B, the flow control recess 180, and thus the flow control fluid chamber 174, is not in fluid communication with at least one of the lower fluid chamber outlet 176 or the upper fluid chamber inlet 178. Further, in the first position, the flow rate from the lower flow control fluid chamber 156 to the upper flow control fluid chamber 198 is at a maximum since the portion of the flow control recess 180, and thus the portion of the flow control fluid chamber 174, in fluid communication with both the upper fluid chamber inlet 178 and the lower fluid chamber outlet 176 is at a maximum. As the flow control recess is moved from the first position to the second position, the flow rate from the lower flow control fluid chamber 156 to the upper flow control fluid chamber 158 decreases since the portion of the fluid control recess 180, and thus the portion of the fluid control chamber 174, in fluid communication with either the lower fluid chamber outlet 176 or the upper fluid chamber inlet 178 decreases.

To ensure at least a minimal level of fluid communication between the lower and upper flow control fluid chambers 156, 158 regardless of the position of the flow control recess 180 relative to the lower fluid chamber outlet 176 and upper fluid chamber inlet 178, a flow control notch 182 may be defined in the flow control housing 150. The flow control notch 182 may extend between the lower fluid chamber outlet 176 and the upper fluid chamber inlet 178, thus providing constant fluid communication between this outlet 176 and inlet 178. Such constant fluid communication prevents a deadhead from being formed in the flow control device 106 when the flow control recess 180 is not in fluid communication with either, or both, of the upper fluid chamber inlet 178 and the lower fluid chamber outlet 176.

Figure 6B:
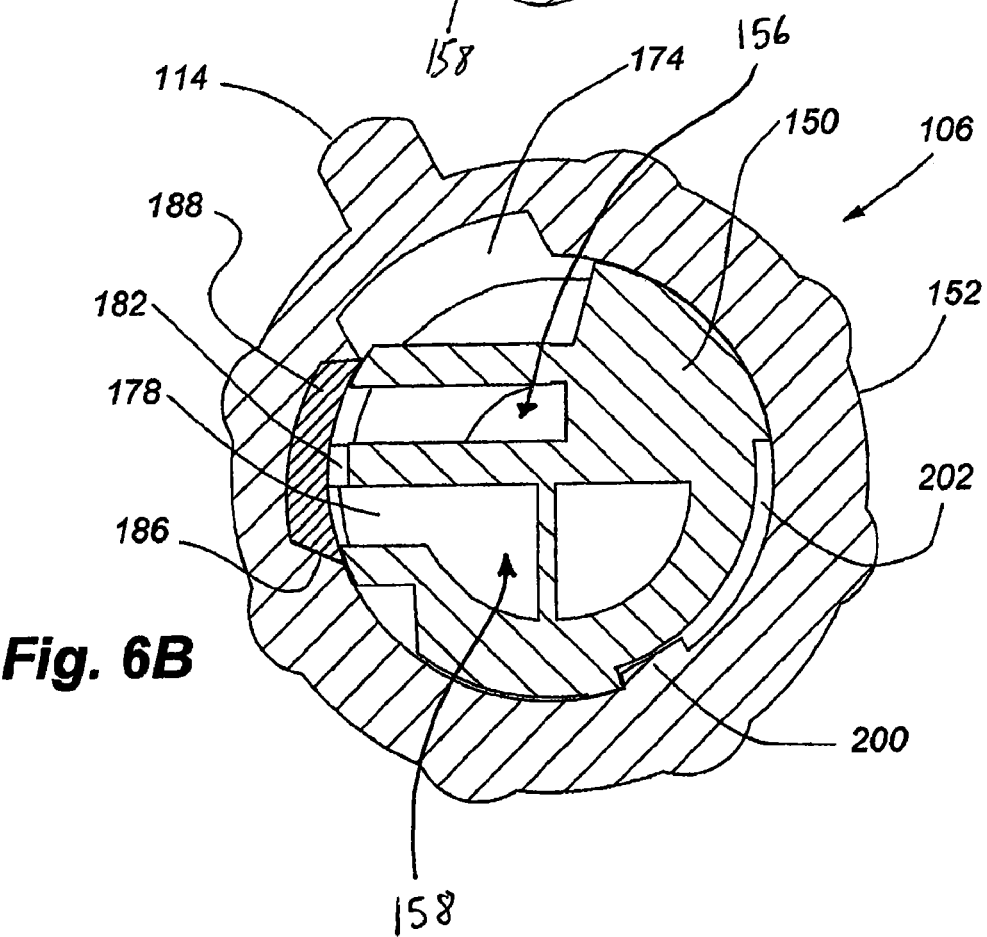
FIG. 6b is a cross-section view of the flow control device of FIG. 6, viewed along line 6B-6B in FIG. 6, showing the flow control ring in a first position relative to the flow control housing.

To limit the fluid flow to the flow control notch 182 when the flow control ring 152 is positioned at the second location relative to the flow control housing 150 as shown in FIG. 6B, the flow control ring 152 may include a flow ring seal recess 186 for receiving a flow ring seal 188. The flow ring seal 188 may extend at least slightly beyond the seal ring recess 186 so that it is at least slight compressed against the flow control housing 150. Such compression biases the flow ring seal 188 against the flow control housing 150, thus preventing fluid leakage between the flow control housing 150 and portions of the flow ring seal 188 in contact with the flow control housing 150.

When the flow control ring 152 is in the second position relative to the flow control housing 150, the flow ring seal 188 covers the lower fluid chamber outlet 176 and the upper fluid chamber inlet 178. Further, the flow ring seal 188 is biased into contact with the portion of the outer surface of the flow control housing 150 that encompasses the lower fluid chamber outlet 176 and the upper fluid chamber inlet 178. This contact prevents fluid movement between the lower fluid chamber outlet 176 and the upper fluid chamber inlet 178 along the engagement surfaces of the flow control housing 150 and the flow ring seal 188. Thus, fluid flow between the lower fluid chamber outlet 176 and the upper fluid chamber inlet 178 is limited to the flow control notch 182.

The flow ring seal 188 may be sized to at least cover the lower fluid chamber outlet 176 and the upper fluid chamber inlet 178 when the flow control 152 is positioned at the second location relative to the flow control housing 150. The flow ring seal 188 may be generally rectangular or any other suitable shape. The flow ring seal 188 may be made from rubber or any other suitable seal material. The flow ring seal recess 186 may be positioned adjacent to the flow control recess 180. The flow ring recess 186 may be sized to receive the flow ring seal 188 with the depth of the flow ring seal recess 186 at least slightly less than the thickness of the flow ring seal 188. In some embodiments, the flow ring recess 186 may be sized to snug tightly receive the flow ring seal 188.

The upper flow control fluid chamber 158 may be in fluid communication with the fluid outlets 108 of the showerhead. Thus, as the flow rate between the lower and upper flow control fluid chambers 156, 158 of the flow control housing 150 is changed by rotating the flow control ring 152 relative to the flow control housing 150, the flow rate of water to the showerhead fluid outlets 108 also changes. In other words, the flow rate to the fluid outlets 108 may be further reduced from the maximum flow rate permitted by the flow restrictor 164 by reducing the portion of the flow control fluid chamber 174 in fluid communication with either, or both, of the upper fluid chamber inlet 178 and lower fluid chamber outlet 176 via rotation of the flow control ring 152 around the flow control housing 150 Further, the showerhead may be placed in a pause mode by rotating the flow control ring 152 to a position relative to the flow control housing 150 where fluid communication between the upper fluid chamber inlet 178 and lower fluid chamber outlet 176 is provided by just the flow control notch 182.

Indicia or other markings may be defined in, or placed on, the flow control device 106 to provide an indication to a user about the selected flow rate using the flow control device 106. For example, water drop shaped recesses 184 may be defined in the flow control housing 150. Continuing with the example, three such recesses 184 may be defined in the flow control housing 150 that align with the flow control knob 114 when the flow control ring 152 is positioned at the first position relative to the flow control housing 150, thus indicating to a user that the maximum flow rate is selected. Still continuing with the example, one such recess 184 may be defined in the flow control housing 150 that aligns with the flow control knob 114 when the flow control ring 152 is positioned at the second position relative to the flow control housing 150, thus indicating to a user that the minimum or pause flow rate is selected. The foregoing example is merely illustrative and is not intended to require or imply any particular indicia or marking for providing an indication to the user of the relative selected flow rate. Further, in some embodiments, the indicia or other markings may be omitted. In yet other embodiments, numbers or other symbols may be used for the indicia.

The flow control device 106 may further include a rotation limiting system to limit the rotation of the flow control ring 152 relative to the flow control housing 150. The rotation limiting system may take the form of a flow control stop 200 received within a flow control stop groove 202. The flow control stop 200 may extend from the inner surface of the flow control ring 152. The flow control stop groove 202 may be defined in the outer surface of the flow control housing 150. Engagement of the flow control stop 200 with an end of the flow control stop groove 202, as shown, for example, in FIGS. 6A and 6B, limits further rotation of the flow control ring 152 relative to the flow control housing 150 in the direction of engagement. The flow control stop groove 202 may be sized to permit rotation of the flow control ring 152 relative to the flow control housing 150 from the first position (i.e., the maximum flow rate position) to the second position (i.e., the minimum flow rate or pause position), and vice versa.

In some embodiments, the flow control stop 200 may extend from the outer surface of the flow control housing 150, and the flow control stop groove 202 may be defined in the inner surface of the flow control ring 152. Further, any other known system for limiting relative rotation of one member about another member may be used to limit the relative rotation of the flow control ring 152 relative to the flow control housing 150. Yet further, in some embodiments, the rotation limiting system may be omitted.

An upper seal element 204 and a lower seal element 206 may be positioned respectively above and below the flow control fluid chamber 174. Each seal element 204, 206 may be positioned within a corresponding circumferential groove defined in the flow control housing 150. The upper and lower seal elements 204, 206 limit fluid leakage from the flow control fluid chamber 174 between the joint formed between the inner surface of the flow control ring 152 and the outer surface of the flow control housing 150. The upper and lower seal elements 204, 206 may take the form of cup seals or any other known seal, including, but not limited to, O-rings or the like. The upper and lower seal elements 204, 206 may be formed from rubber or other elastomeric material, or any other suitable material.

The flow control fastener 154 may include an internally threaded surface for engagement with the external threads formed on the lower end portion of the flow control housing 150. Engagement of the flow control fastener threads with the threads on the lower end portion of the flow control housing 150 joins the flow control fastener to the flow control housing. Although shown as threadedly joined together, the flow control fastener 152 and flow control housing 150 may be joined by any known connection method, including, but not limited to, press-fit, mechanical fasteners, welds, and so on.

The flow control ring 152 may include a generally annular or other suitably shaped flow control ring body 208 that defines a flow control ring aperture for receiving a portion of the flow control housing 150. As discussed above, the flow control ring 152 may be selectively rotated around the flow control housing 150. Such rotation may be facilitated by the flow control knob 114 or other user grasping element. The flow control knob 114 or user grasping element may extend from an outer surface of the flow control ring body 208. The flow control knob 114 may be generally elliptical or any other suitable shape and may be sized to be grasped by a user. The flow control ring 152 may be positioned between the upper end portion of the flow control housing 150 and the flow control fastener 154, thus rotatably joining the flow control ring 152 to the flow control housing 150.

With reference to FIG. 3, the handheld showerhead housing 102 may include a handle portion 220 and a showerhead portion 222. As discussed above, a lower end segment of the handle portion 220 may be threaded for engagement with threads formed on the flow control housing 150. Engagement of the handle portion threads and the flow control housing threads joins the handheld showerhead housing 102 to the flow control device 106. In some embodiments, the flow control device 106 may be omitted, and the handheld showerhead housing 102 may be joined, using a threaded engagement or any other suitable connection method, to the handheld showerhead conduit 122.

A handle seal member 224 may be positioned between an end of the handle portion 220 and the flow control housing 150. The handle seal member 224 may be an O-ring or any other suitable sealing element. The handle seal member 224 may limit or prevent fluid flow between the joined segments of the handle portion 220 and the flow control housing 150. The handle seal member 224 may be made of rubber or any other suitable seal material.

The handle portion 220 may include an outer gripping surface for a user to hold the handheld showerhead 100. An inner surface of the handle portion 220 may define a handle fluid passage 226 or channel. The handle portion 220 may be generally elongated and may be ergonomically designed for ease of gripping and use. The handle fluid passage 226 or channel may extend from a lower end segment of the handle portion 220 to the showerhead portion 222. As a non-limiting example, in conventional 2.5 GPM handheld showerhead devices, the handle fluid passage has a diameter of approximately 0.23 inch. The handle fluid passageway of a handheld showerhead is sized to be larger than the handle fluid passage for a conventional 2.5 GPM handheld showerhead.

In particular, the handle fluid passage 226 of the handheld showerhead 100 may have a diameter that is approximately at least fifty percent larger than the diameter of a conventional 2.5 GPM handle fluid passage. In some embodiments, the handle fluid passage 226 of the handheld showerhead 100 may have a diameter of approximately two hundred to three hundred percent larger than a conventional 2.5 GPM handle fluid passage. Because of this larger diameter for the handle fluid passage 226, fluid (e.g., water) flowing through the handle portion 220 is less restricted than in conventional handheld showerheads.

Figure 26:
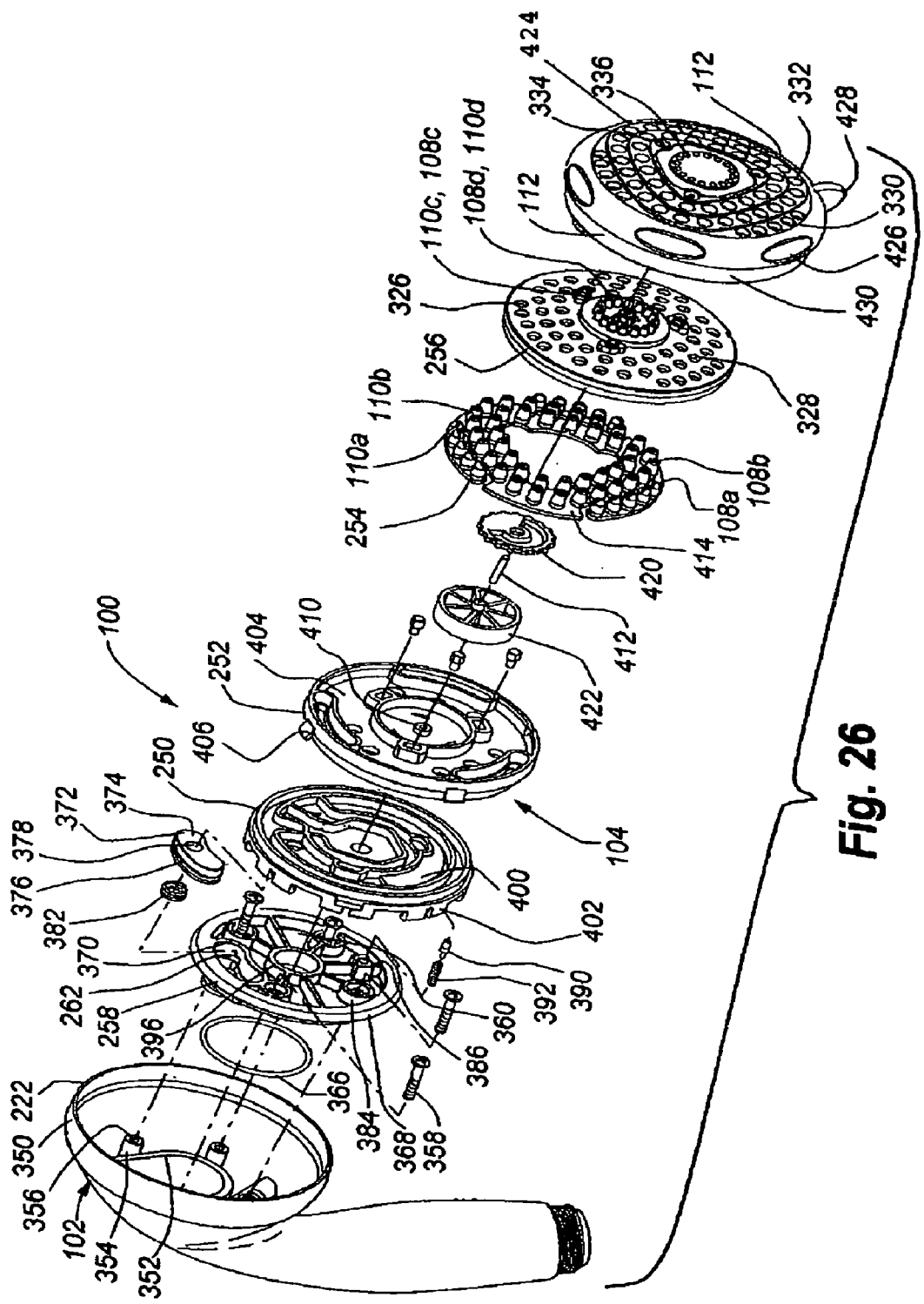
FIG. 26 is an exploded perspective view of the handheld showerhead of FIG. 1.
Figure 27:
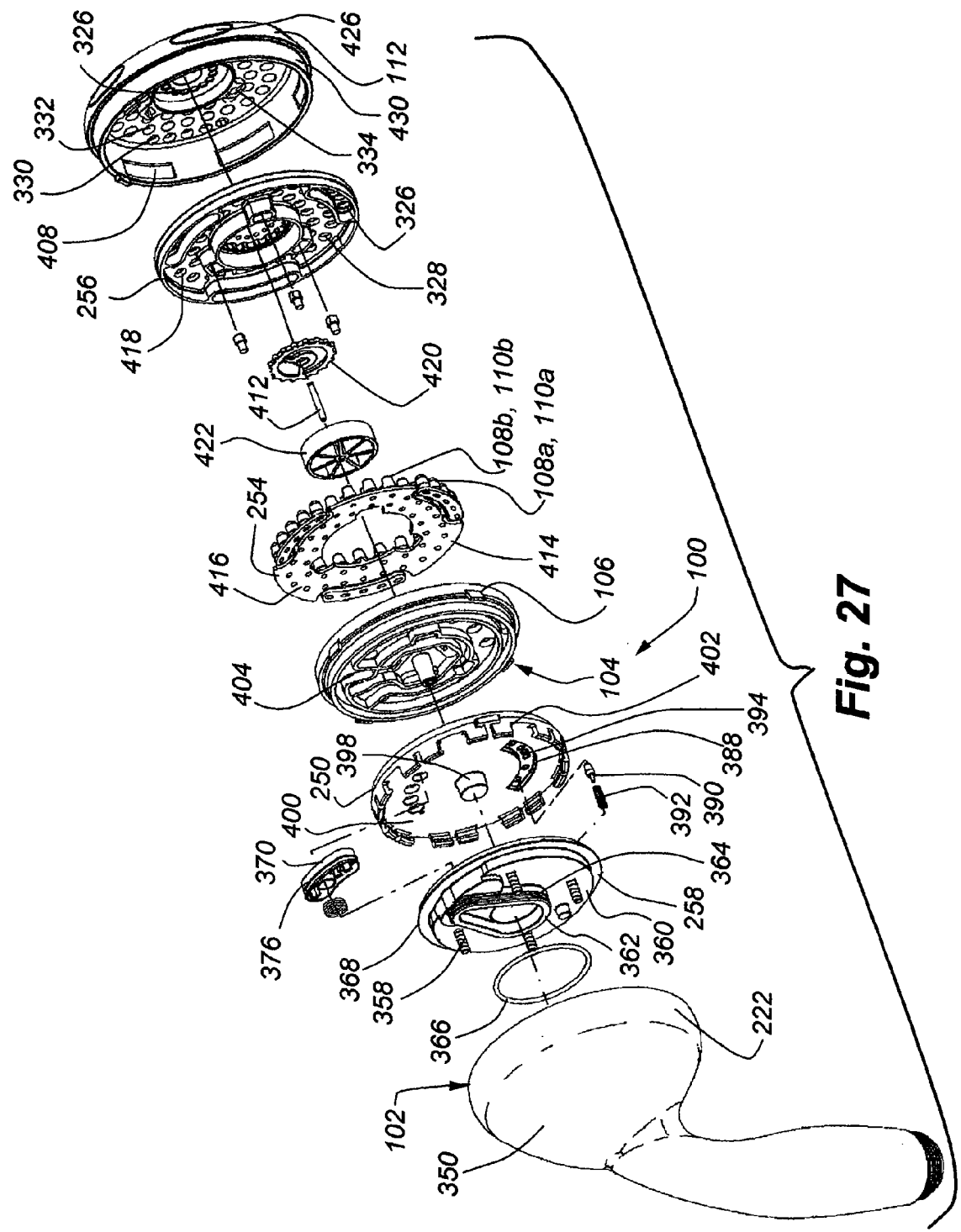
FIG. 27 is another exploded perspective view of the handheld showerhead of FIG. 1.

FIG. 2 shows the showerhead engine 104 in a first position relative to the handheld showerhead housing 102. FIGS. 13-16 show the showerhead engine 104 moved to other positions relative to the handheld showerhead housing 102. FIGS. 17-21 show cross-section views of the showerhead engine 104 for the various positions of the showerhead engine 104 relative to the handheld showerhead housing 102 as shown in FIGS. 2 and 13-16 respectively. FIGS. 26 and 27 show exploded perspective views of the showerhead engine 104.

With reference to FIGS. 17-21, the showerhead engine 104 may include a flow director or back member 250, a flow channel or intermediate member 252, one or more nozzle members 254, a turbine or front member 256, and the face member 112. The handheld showerhead 100 may further include a stationary member 258. The stationary member 258 may define a stationary member fluid chamber 260 in fluid communication with the handle fluid passage 226 and a stationary member fluid outlet 262 in fluid communication with the stationary member fluid chamber 260.

The flow director member 250, the flow channel member 252 and the turbine member 256 may define one or more fluid chamber passages in fluid communication with the various groups of nozzles and other fluid outlets 108 defined in the nozzle member 254 and/or the turbine member 256. Further, the flow director member 250, the flow channel member 252, the nozzle member 254, the turbine member 256, and the face member 112 may be joined or otherwise assembled to rotate in unison relative to the stationary member 258. Such rotation changes which fluid chambers or passages are in fluid communication with a stationary member fluid outlet 262, thus changing which fluid outlet group or groups 110 are in fluid communication with the stationary member fluid outlet 262. Thus, a user may select a spray or operation mode by selectively rotating the showerhead engine 104 relative to the stationary member 258.

Figure 17:
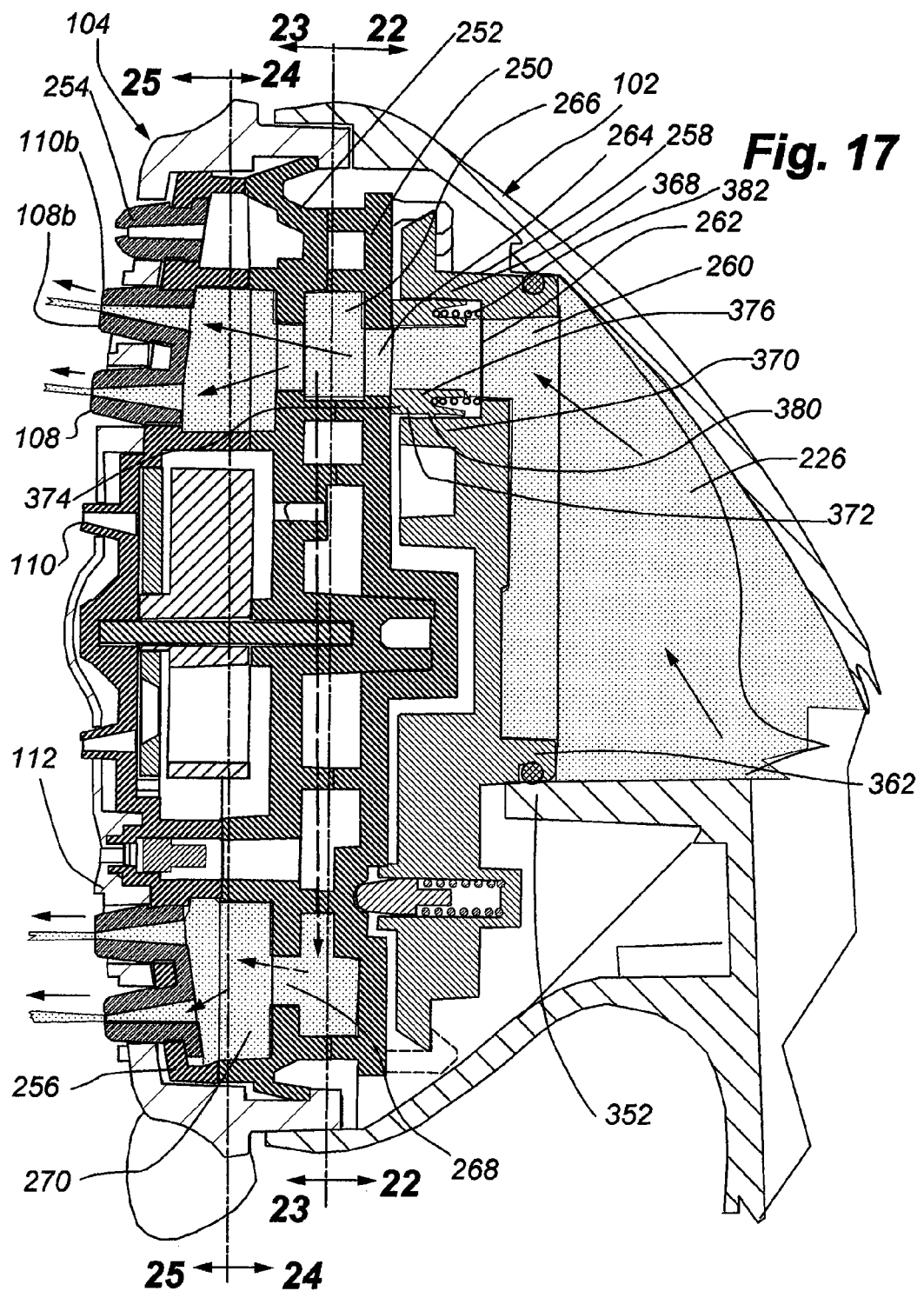
FIG. 17 is a cross-section view of a portion of the handheld showerhead of FIG. 1, viewed along line 17-17 in FIG. 2.

More particularly, FIGS. 2 and 17 show the showerhead engine 104 in a first position relative to the stationary member 258. In this first position, the stationary member fluid outlet 262 is in fluid communication with the group of fluid outlets 110b for the full body spray. Fluid communication between the full body spray fluid outlets 108b and the stationary member fluid outlet 262 is provided via an upper full body fluid aperture 264 defined in the flow director member 250, an upper full body fluid chamber 266 defined by the flow director member 250 and the flow channel member 252, one or more lower full body fluid apertures 268 defined in the flow channel member, and a lower full body fluid chamber 270 defined by the flow channel member 252 and the turbine member 256.

Figure 13:
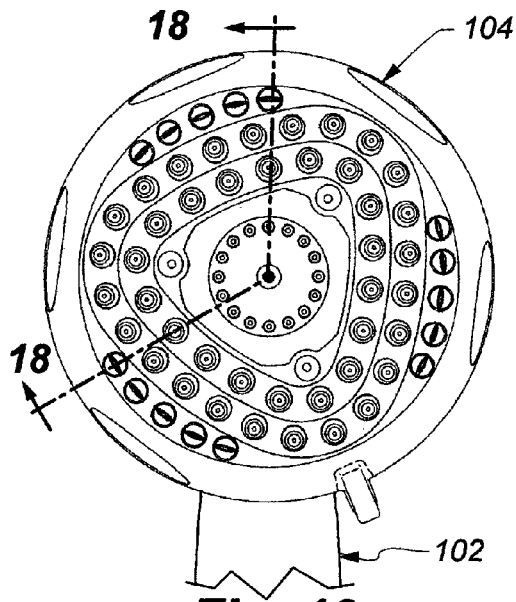
FIG. 13 is a front elevation view of a portion the handheld showerhead of FIG. 1, showing the showerhead engine moved to a second position relative to the handheld showerhead housing.
Figure 18:
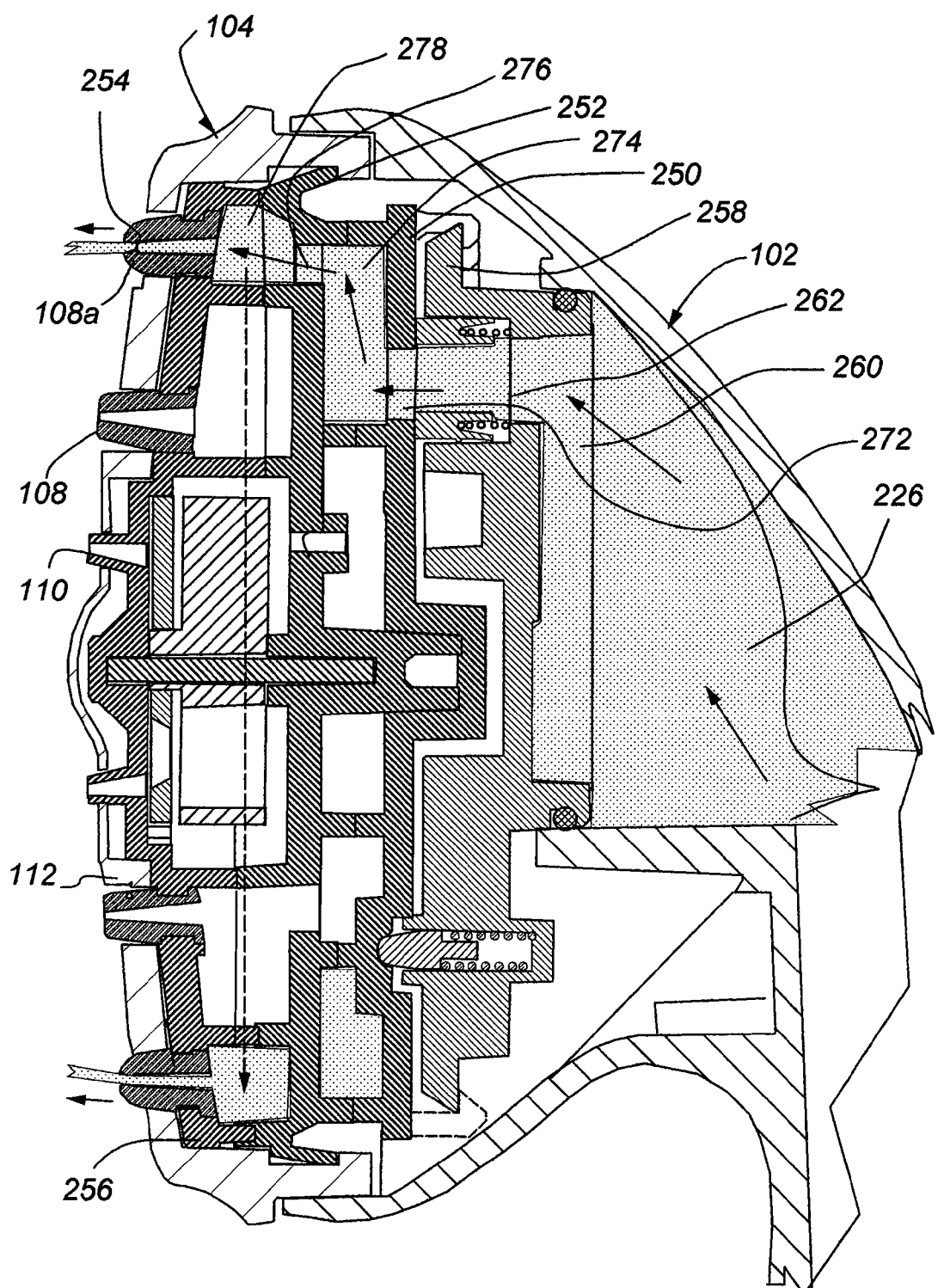
FIG. 18 is a cross-section view of a portion of the handheld showerhead of FIG. 1, viewed along line 18-18 in FIG. 13.

FIGS. 13 and 18 show the showerhead engine 104 in a second position relative to the stationary member 258. In this second position, the stationary member fluid outlet 262 is in fluid communication with the first fluid outlet group 110*a* for the fan spray. Fluid communication between the fan spray fluid outlets 108*a* and the stationary member fluid outlet 262 is provided via an upper fan fluid aperture 272 defined in the flow director member 250, an upper fan fluid chamber 274 defined by the flow director member 250 and the flow channel member 252, one or more lower fan fluid apertures 276 defined in the flow channel member 252, and one or more lower fan fluid chambers 278 defined by the flow channel member 252 and the turbine member 256.

Figure 14:
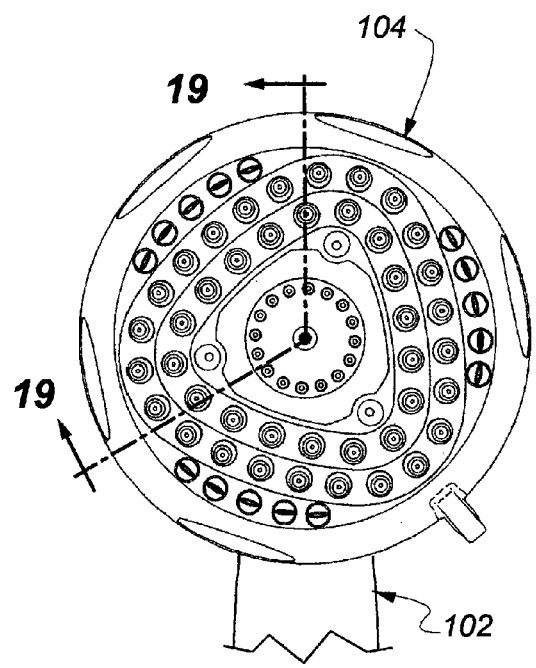
FIG. 14 is a front elevation view of a portion the handheld showerhead of FIG. 1, showing the showerhead engine moved to a third position relative to the handheld showerhead housing.
Figure 19:
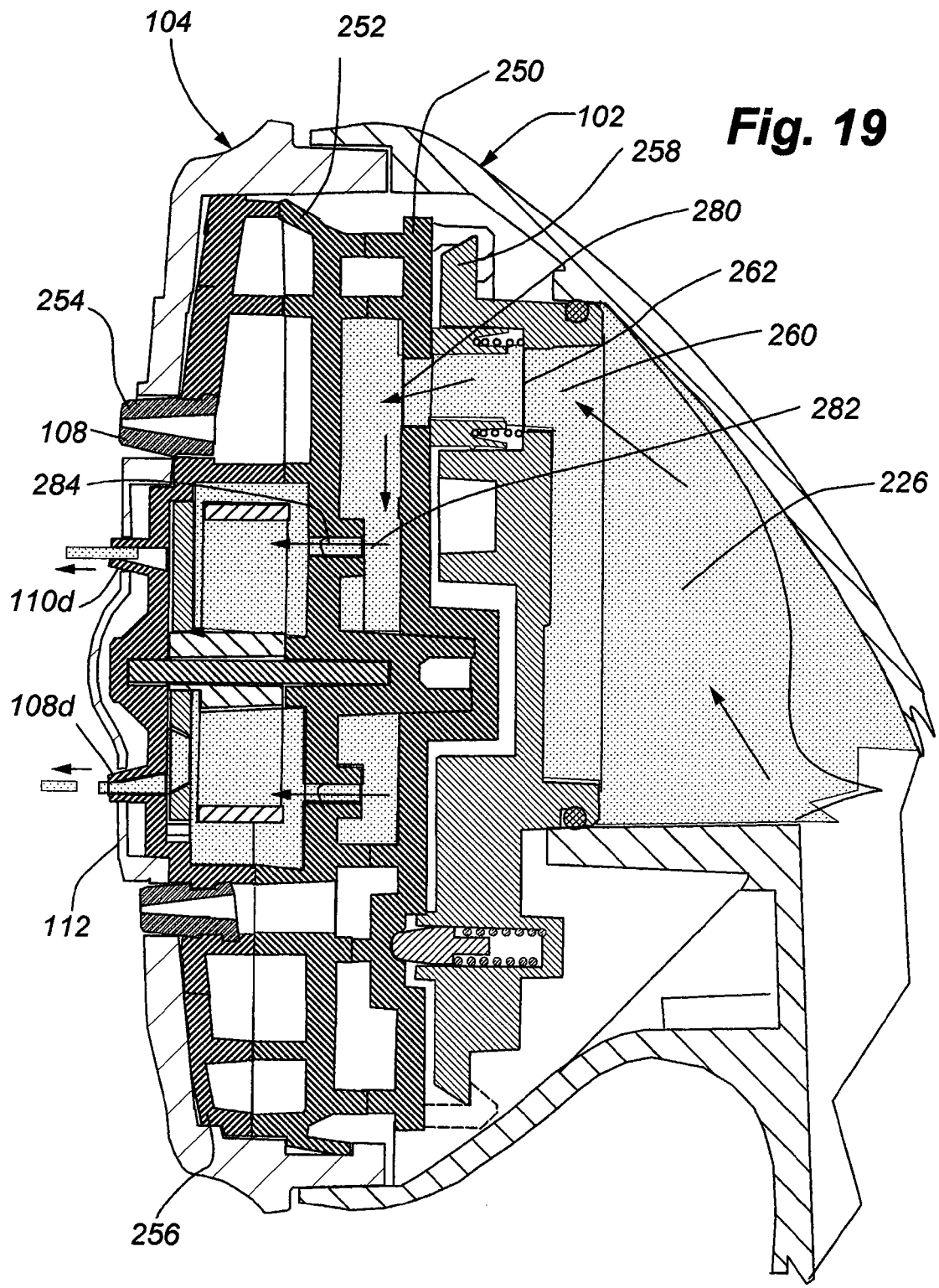
FIG. 19 is a cross-section view of a portion of the handheld showerhead of FIG. 1, viewed along line 19-19 in FIG. 14.

FIGS. 14 and 19 show the showerhead engine 104 in a third position relative to the stationary member 258. In this third position, the stationary member fluid outlet 262 is in fluid communication with the group of fluid outlets 110*d* for the pulsating spray. Fluid communication between the pulsating spray fluid outlets 108*d* and the stationary member fluid outlet 262 is provided via an upper pulsating fluid aperture 280 defined in the flow director member 250, an upper pulsating fluid chamber 282 defined by the flow director member 250 and the flow channel member 252, one or more lower pulsating fluid apertures 284 defined in the flow channel member 252, and a pulsating fluid chamber 286 defined by the flow channel member 252 and the turbine member 256.

Figure 15:
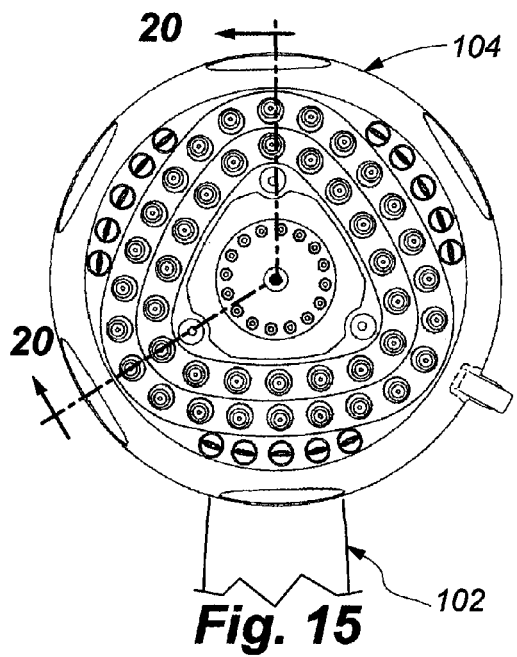
FIG. 15 is a front elevation view of a portion the handheld showerhead of FIG. 1, showing the showerhead engine moved to a fourth position relative to the handheld showerhead housing.
Figure 20:
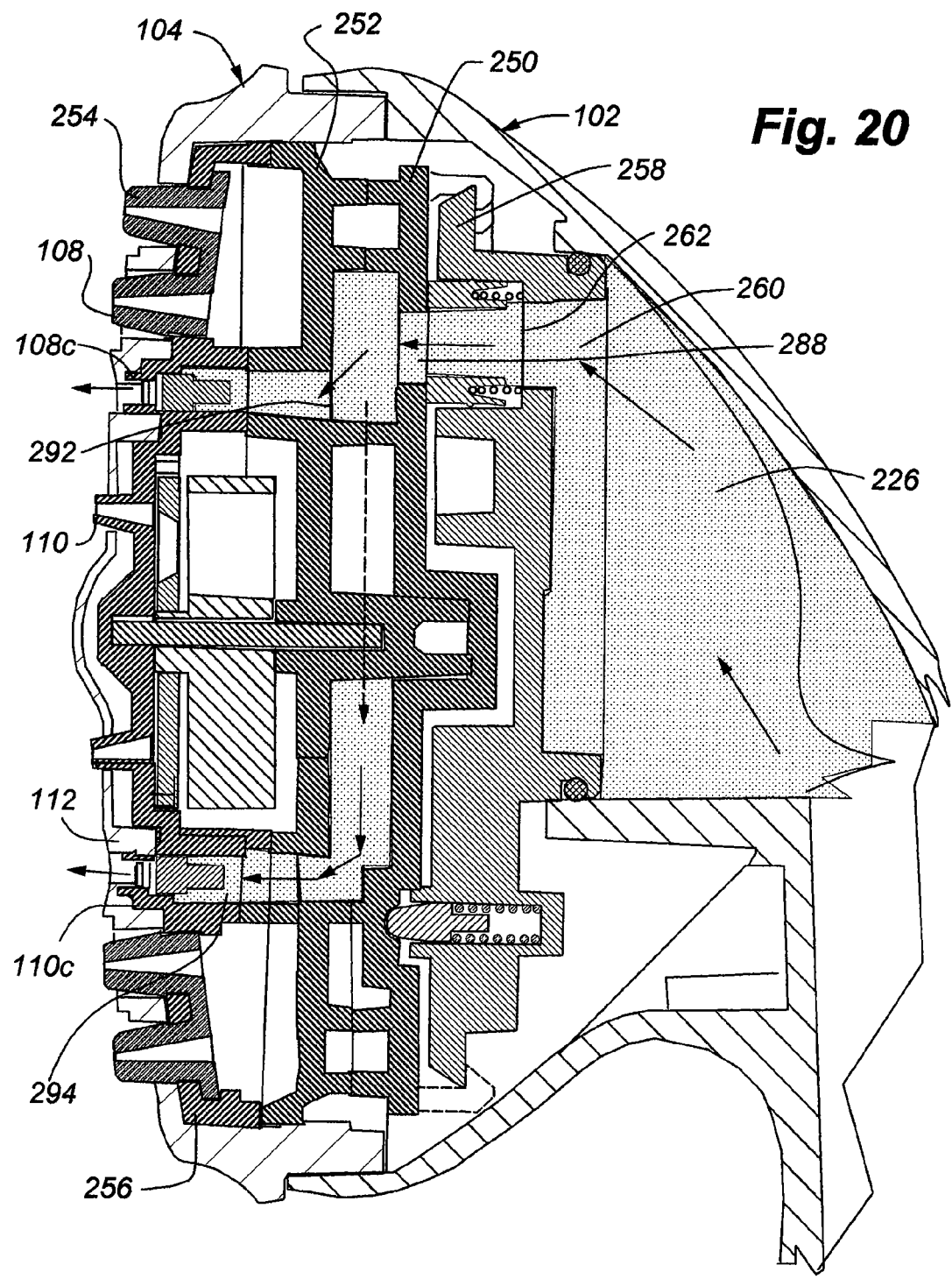
FIG. 20 is a cross-section view of a portion of the handheld showerhead of FIG. 1, viewed along line 20-20 in FIG. 15.

FIGS. 15 and 20 show the showerhead engine 104 in a fourth position relative to the stationary member 258. In this fourth position, the stationary member fluid outlet 262 is in fluid communication with the group of fluid outlets 110*c* for the mist spray. Fluid communication between the mist spray fluid outlets 108*c* and the stationary member fluid outlet 262 is provided via an upper mist fluid aperture 288 defined in the flow director member 250, an upper mist fluid chamber 290 defined by the flow director member 250 and the flow channel member 252, one or more lower mist fluid apertures 292 defined in the flow channel member 252, and one or more low mist fluid chambers 294 defined by the flow channel member 252 and the turbine member 256.

Figure 16:
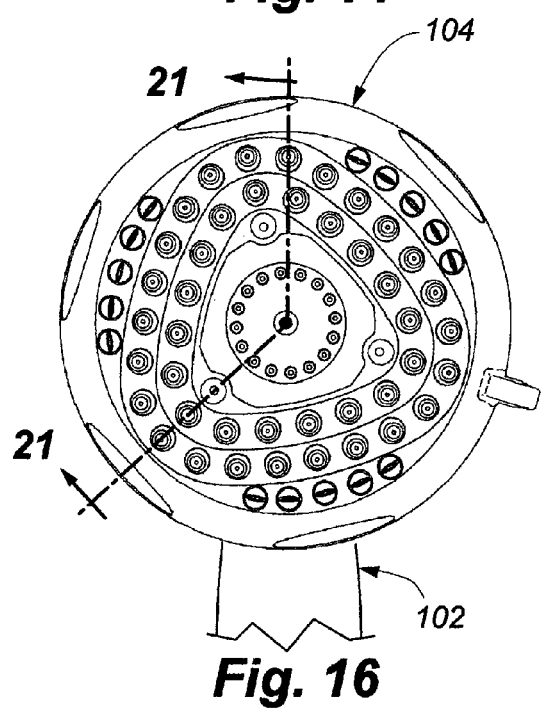
FIG. 16 is a front elevation view of a portion the handheld showerhead of FIG. 1, showing the showerhead engine moved to a fifth position relative to the handheld showerhead housing.
Figure 21:
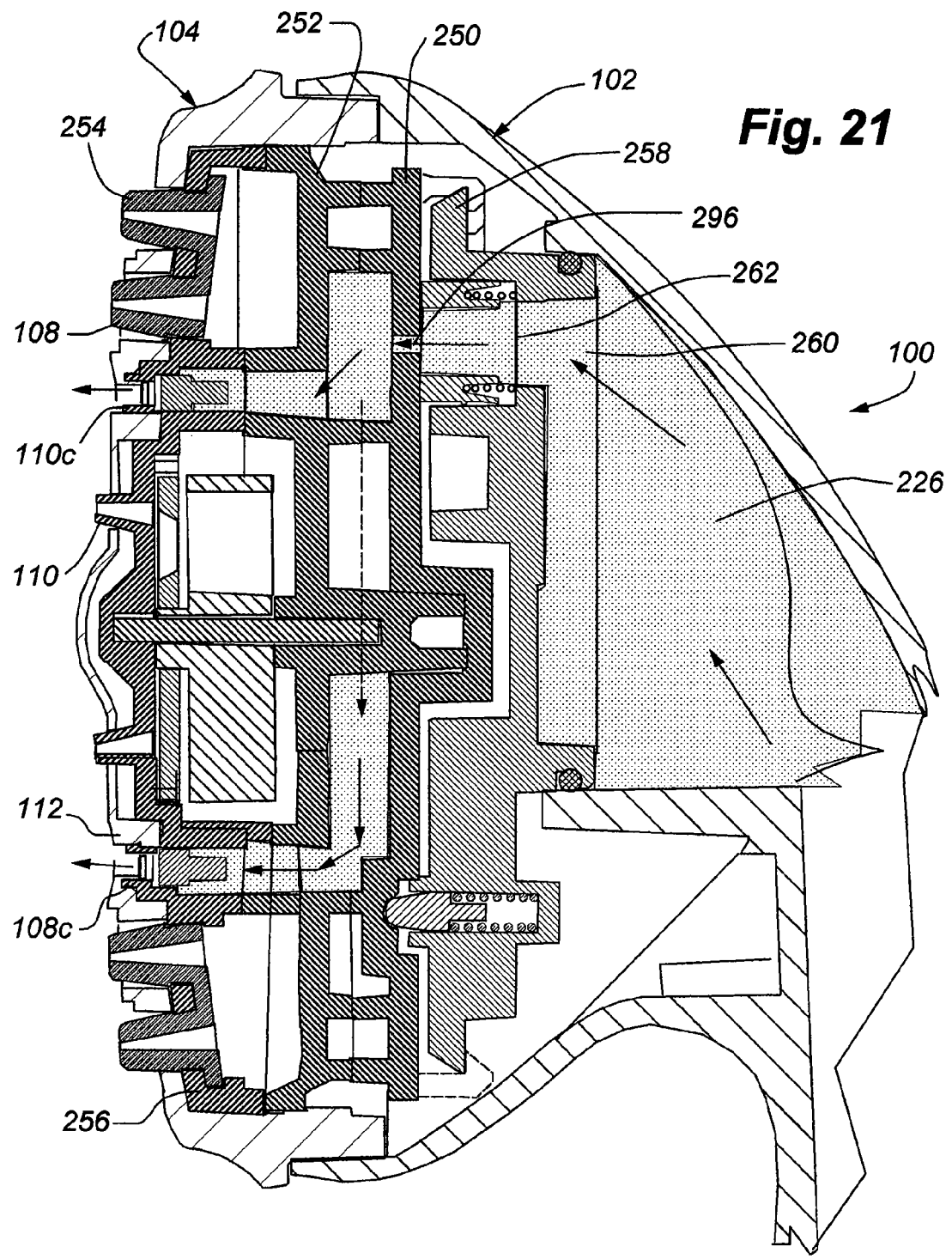
FIG. 21 is a cross-section view of a portion of the handheld showerhead of FIG. 1, viewed along line 21-21 in FIG. 16.

FIGS. 16 and 21 show the showerhead engine 104 in a fifth position relative to the stationary member 258. Like the fourth position, the stationary member fluid outlet 262 is in fluid communication with the group of fluid outlets 110*c* for the mist spray. However, in this fifth position, the handheld showerhead operates in a pause mode because the upper pause fluid aperture 296 in fluid communication with the stationary member fluid outlet 262 is much smaller than the upper mist fluid aperture 288 for the fourth position. Thus, the flow rate delivered from the mist spray fluid outlets 108*c* is very low when the showerhead engine is in this fifth position. Other than the smaller upper fluid aperture 296, fluid communication between the mist fluid outlets 108*c* and the stationary member fluid outlet 262 is the same as for the fourth position of the showerhead engine 104 relative to the stationary member 258.

The feel for a user from showerhead water that contacts the user is a function of the velocity and flow rate of the water that exits the showerhead. Generally, as the flow rate decreases, the exit velocity of the fluid needs to be increased to maintain an aesthetically pleasing shower experience for a user. To increase the exit velocity, the pressure drop of the fluid within a showerhead should occur at the fluid outlets rather than through the showerhead engine. In other words, it is preferable to maintain fluid pressure as high as possible until the fluid exits the handheld showerhead at the fluid outlet so as to create the maximum pressure drop when the fluid exits the handheld showerhead.

The number of turns the fluid makes within the showerhead engine, or distance the fluid must travel to pass through apertures in the various members forming the showerhead engine, before reaching the fluid outlets may be minimized in the showerhead engine because each turn or corner that the fluid encounters, or additional distance the fluid must travel, leads to a pressure drop. To further improve the fluid exit velocity from the showerhead for the lower flow rate, the ratio of the total area for each fluid chamber, passage or aperture within the showerhead engine may be at least five times the total area of the fluid outlet openings associated with the particular fluid chamber, passage or aperture. To yet further improve the fluid exit velocity of the handheld showerhead, the total area of the fluid outlet openings for an outlet group of the handheld showerhead may be configured to be between approximately 0.020 square inches to approximately 0.040 square inches. This is generally less than the total area of the fluid outlets for a conventional 2.5 GPM showerhead, which typically range from 0.050 to 0.070 square inches.

Accordingly, the showerhead engine 104 for the handheld showerhead 100 may be configured to minimize the number of turns encountered by water flowing in the showerhead engine 104, to decrease the pressure drop through the showerhead engine, and/or to increase the pressure drop at the fluid outlets. Additionally, the fluid chambers, passages or apertures throughout the handheld showerhead 100 may be widened and/or shaped to increase or maintain water volume and pressure.

FIGS. 22-25 show various cross-section views of the showerhead engine. These various figures show one possible way to form the various upper and lower fluid chambers and apertures in the showerhead engine 104 for each operation mode to minimize the number of turns and/or distance the fluid must travel, and/or to form fluid chambers and/or fluid apertures with total areas that are at least five times the total area of the fluid outlet openings associated with the particular fluid chamber or aperture.

Figure 22:
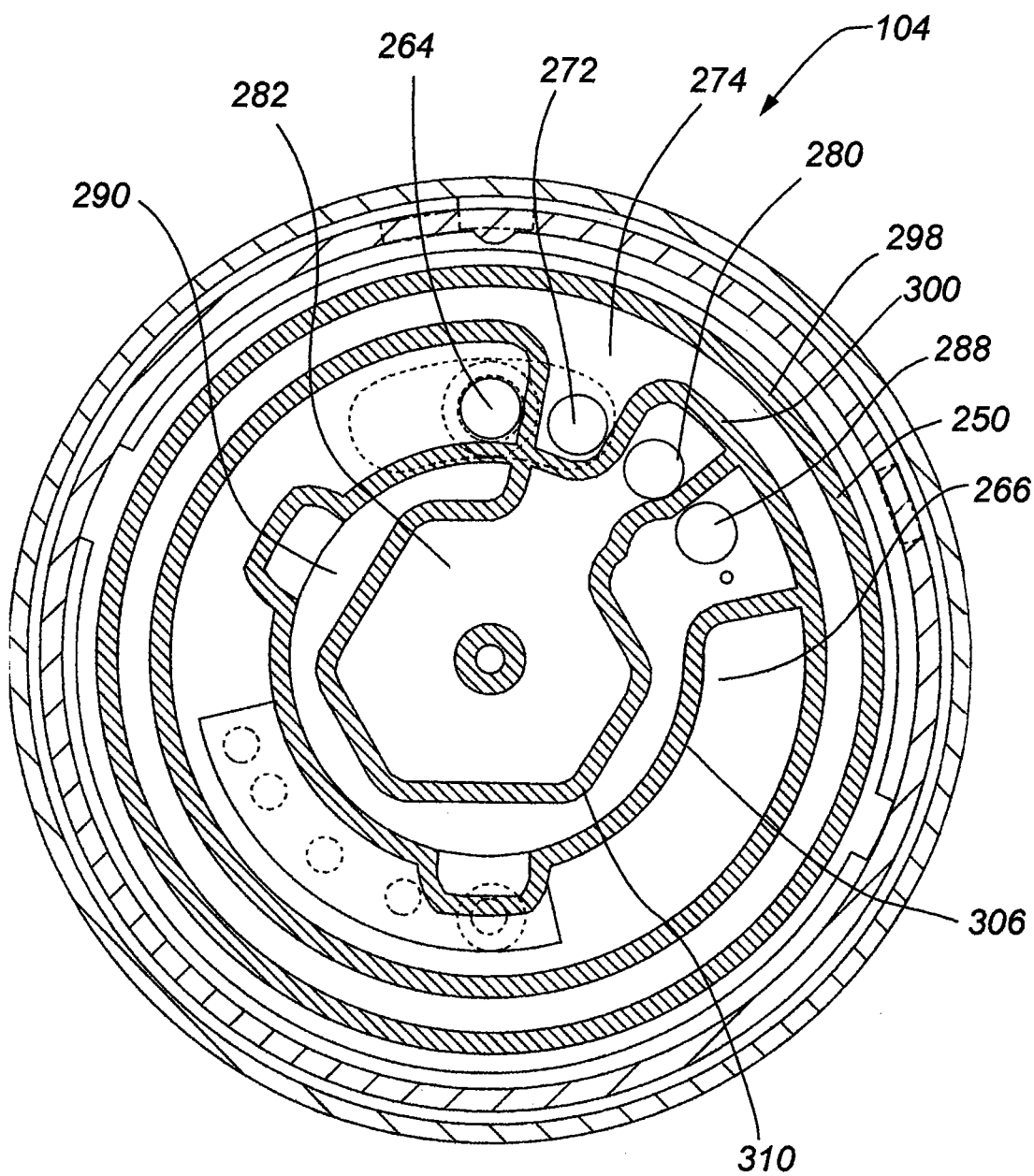
FIG. 22 is a cross-section view of the handheld showerhead of FIG. 1, viewed along line 22-22 in FIG. 17.
Figure 23:
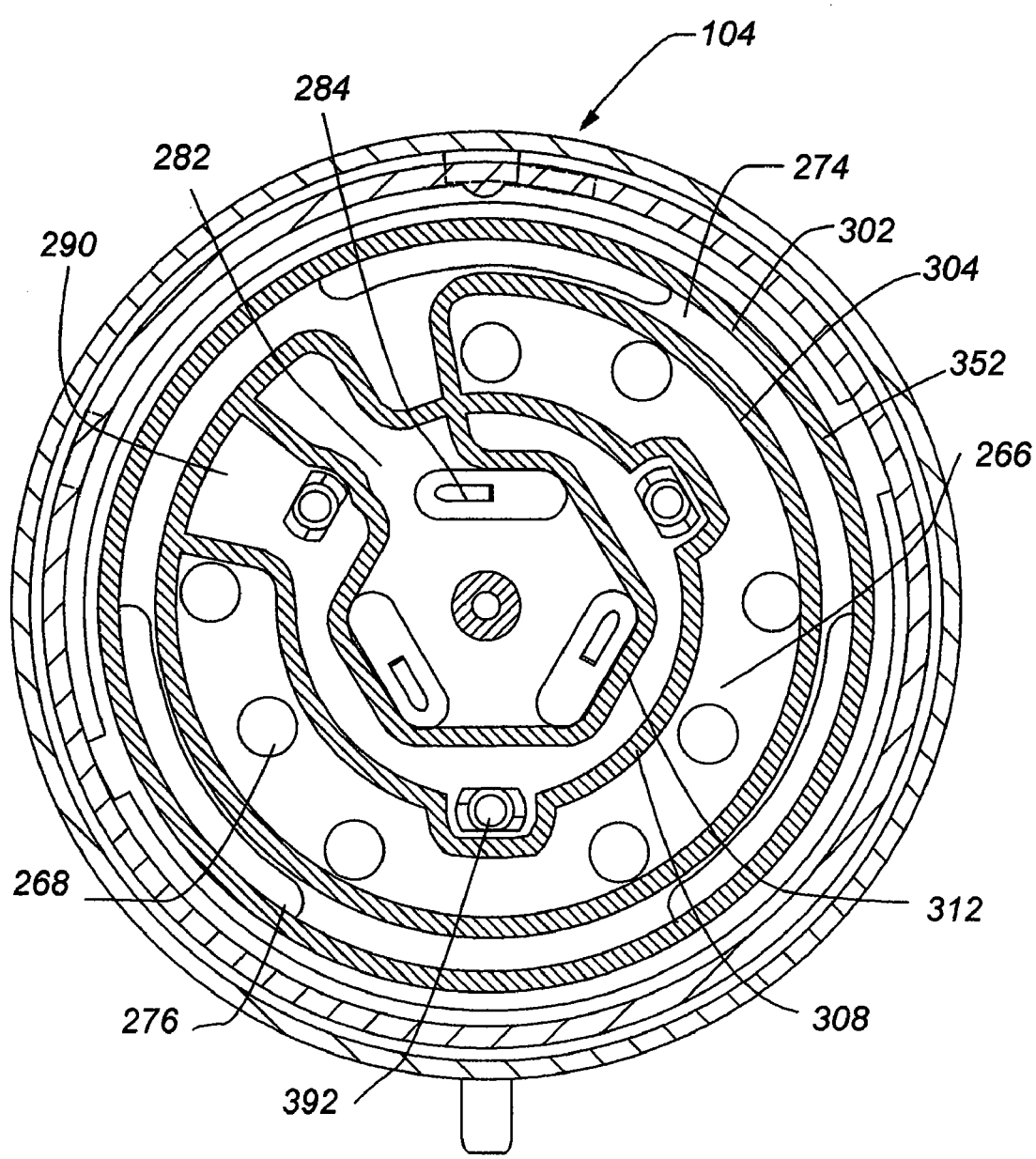
FIG. 23 is a cross-section view of the handheld showerhead of FIG. 1, viewed along line 23-23 in FIG. 17.

With reference to FIGS. 22 and 23, the upper fan fluid chamber 274 may take the form of a substantially annular space in planar cross-section that is defined by first and second aligned downstream flow director and upstream flow channel walls 298, 300, 302, 304 that extend from the downstream side of flow director member 250 and the upstream side of the flow channel member 252. The upper full body fluid chamber 266 may take the form of a substantially C-shaped spaced in planar cross-section, which is adjacent to but radially inward of the upper fan fluid chamber 274. The upper full body fluid chamber 266 may be defined by aligned second and third aligned downstream flow director and upstream flow channel walls 300, 306, 304, 308 that extend from the downstream side of flow director member 250 and the upstream side of the flow channel member 252. The upper mist fluid chamber 290 may also take the form of a substantially C-shaped space in planar cross-section, which is adjacent to but radially inward of the upper full body fluid chamber 266. The upper mist fluid chamber 290 may be defined by aligned third and fourth downstream flow director and upstream flow channel walls 306, 310, 308, 312 that extend from the downstream side of flow director member 250 and the upstream side of the flow channel member 252. The upper pulsating fluid chamber 282 may take the form a generally pentagonal space in planar cross-section, which is adjacent to but radially inward of the upper mist fluid chamber 290. The upper pulsating fluid chamber 282 may be defined by a portion of the aligned second downstream flow director and upstream flow channel walls 300, 304 and by aligned downstream flow director and upstream flow channel fourth walls 310, 312 that extend from the downstream side of flow director member 250 and the upstream side of the flow channel member 252, respectively.

The upper full body fluid aperture 264, the upper fan fluid aperture 272, the upper mist fluid aperture 288, and the upper pulsating fluid aperture 280 may each be generally circular. Three lower fan fluid apertures 276, eight lower full body fluid apertures 268, three lower mist fluid apertures 292, and three lower pulsating fluid apertures 284 may be defined in the flow channel member 252. The lower fan fluid apertures 276 may be generally arcuate and may be spaced apart at approximately radially equal distances. The lower full body fluid apertures 268 may be generally circular. The lower full body fluid apertures 268 may be formed into two groups of three lower full body fluid apertures 268 and one group of two lower full body apertures 268. Within each group, the lower full body fluid apertures 268 may generally be spaced apart at approximately radially equal distance. Further, each group of lower full body apertures 268 may be positioned within generally equally sized sectors on the flow director member 250.

The lower mist fluid apertures 292 may be generally rectangular and may be spaced apart at approximately radially equal distances. The lower pulsating member fluid apertures 284 may be generally elongated slots and may be spaced apart at approximately radially equal distances. The lower pulsating member apertures 284 may be formed through the flow channel member 252 at an angle relative to upper and lower surfaces of the flow channel member 252 to direct an angled fluid stream onto a turbine positioned within the lower pulsating fluid chamber 286. Any of the apertures may be of various dimensions. While specific apertures are described herein for the upper and lower fan, full body, mist and pulsating apertures, any aperture suitable for the intended spray pattern would be acceptable. Further, while specific arrangements, shapes and numbers for these apertures are described herein, various other arrangements, shapes, or numbers may be used.

Figure 24:
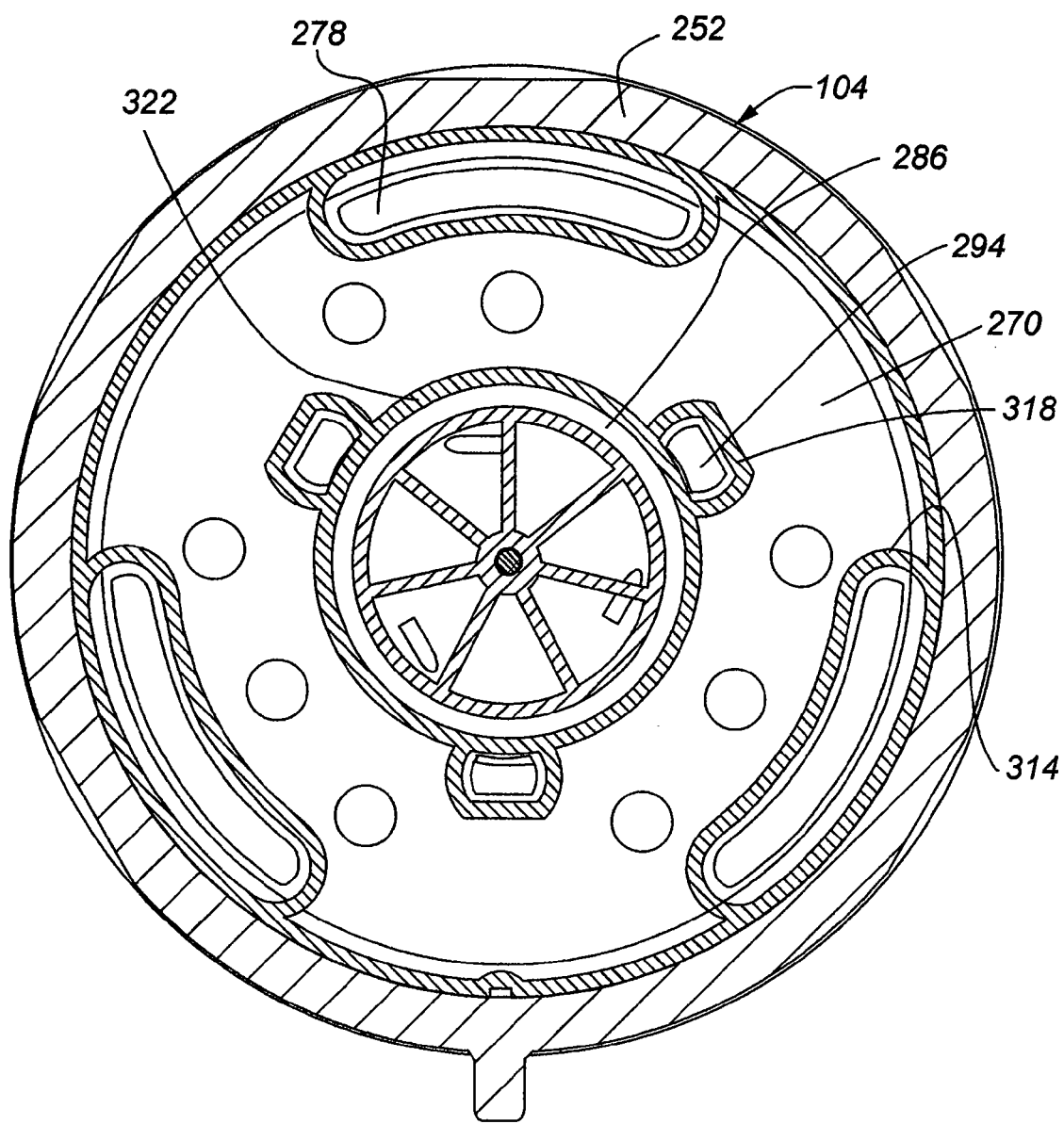
FIG. 24 is a cross-section view of the handheld showerhead of FIG. 1, viewed along line 24-24 in FIG. 17.
Figure 25:
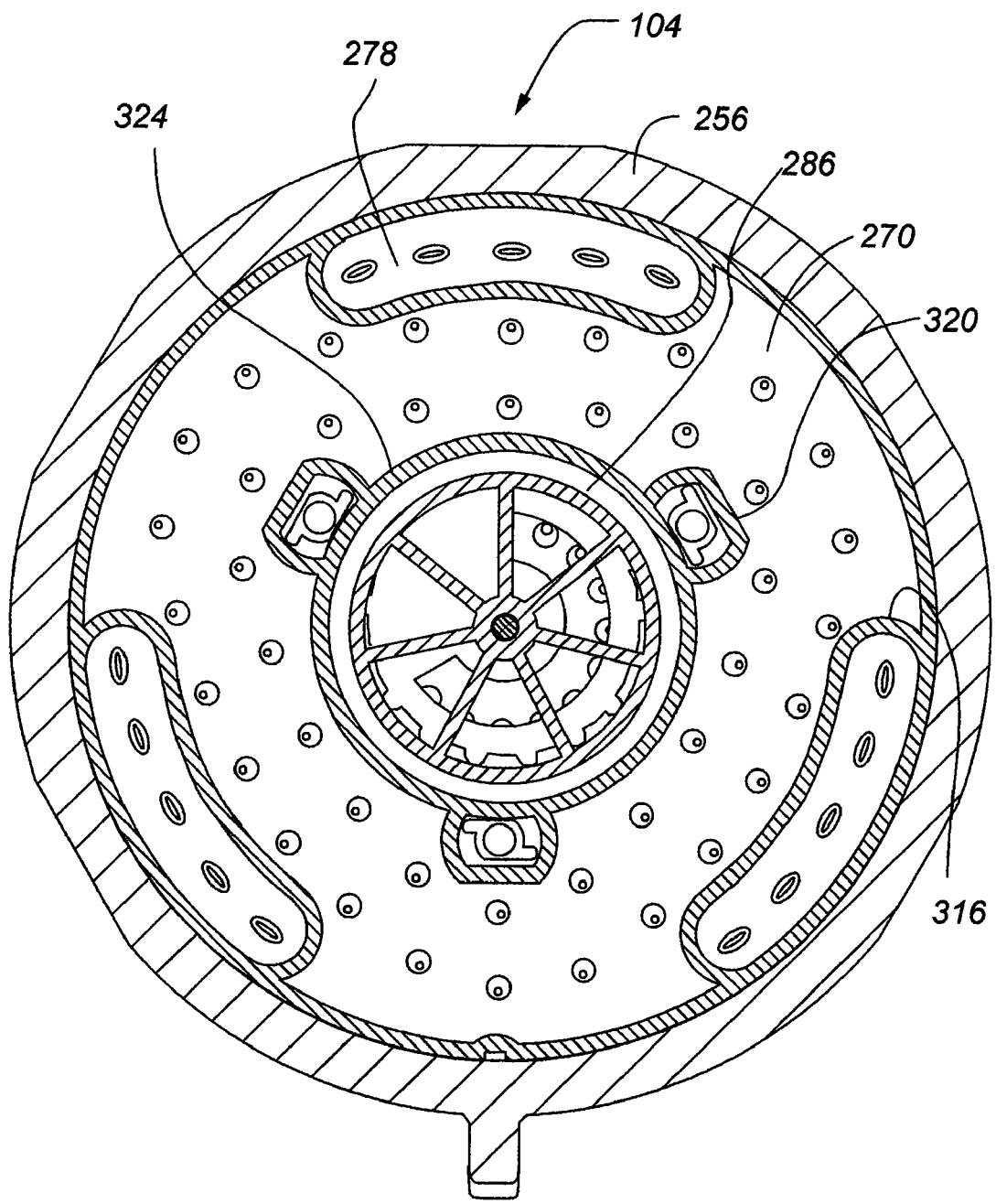
FIG. 25 is a cross-section view of the handheld showerhead of FIG. 1, viewed along line 25-25 in FIG. 17.

With reference to FIGS. 24 and 25, the showerhead engine 104 may include three lower fan fluid chambers 278, three lower mist fluid chambers 294, a lower pulsating fluid chamber 286, and a lower full body fluid chamber 270. Each lower fan fluid chamber 278 may take the form of a substantially arcuate space in planar cross-section, which is defined by aligned downstream flow channel and upstream turbine walls 314, 316 that extend from the downstream side of flow channel member 252 and the upstream side of the turbine member 256. Each lower mist fluid chamber 294 may take the form of a substantially rectangular space in planar cross-section, which is defined by aligned downstream flow channel and upstream turbine walls 318, 320 that extend from the downstream side of flow channel member 252 and the upstream side of the turbine member 256.

The lower pulsating fluid chamber 286 may take the form of a generally circular space in planar cross-section, which is defined by aligned downstream flow channel and upstream turbine walls 322, 324 that extend from the downstream side of flow channel member 252 and the upstream side of the turbine member 256. The lower full body fluid chamber 270 may generally be annular in planar cross-section with partial arcuate segments formed along an outer radial portion of the lower full body fluid chamber 270. The lower full body fluid chamber 270 may generally encircle the lower pulsating fluid chamber 286. The lower mist fluid chambers 294 may be adjacent the lower pulsating fluid chamber 286 but spaced radially outward from it. The lower fan fluid chambers 278 may be positioned proximate the peripheries of the flow channel member 252 and the turbine member 256.

With reference to FIGS. 26 and 27, the fluid outlets for the fan and full body fluid outlet groups 110*a*, *b* may be defined in one or more nozzle members 254, and the fluid outlets for the mist and pulsating groups 110*c*, *d* may be defined in the turbine member 256. Further, the turbine member 256 may include turbine fan and full body openings 326, 328 for receiving at least portions of the fan and full body fluid outlets 108*a*, *b*, respectively, through the turbine member 256. Similarly, the face member 112 may include face fan and full body openings 330, 332 for receiving at least portions of the fan and full body fluid outlets 108*a*, *b*, respectively, through the face member 112. The face member 112 may further include mist and pulsating openings 334, 336 for receiving at least portions of the mist and pulsating body fluid outlets 108*c*, *d*, respectively, through the face member. The turbine fan and full body openings 326, 328 and the face fan, full body, mist and pulsating openings 330, 332, 334, 336 may be generally circular or any other suitable shape for receiving the fluid outlets therethrough.

Each of the fluid outlets 108*a*, *d* for the fan, full body, mist and pulsating fluid outlet groups 110*a-d* may take the form of nozzles. The nozzles for the fan fluid outlets 108*a* may be generally cylindrical or conical columns or shafts including slit openings that allows fluid to exit the handheld showerhead 100 through these nozzles. The nozzles for the full body and pulsating fluid outlets 108*b*, *d* may be generally cylindrical or conical columns or shafts including circular openings that allows fluid to exit the handheld showerhead 100 through these nozzles. The nozzles for the mist fluid outlets 108*c* may be generally oblong shaped columns or shafts that include generally circular openings that allows fluid to exit the handheld showerhead 100 through these nozzles.

Although one fluid opening is shown for each nozzle, any nozzle may include more than one fluid opening. Additionally, although the fluid openings in the nozzles for the full body, pulsating, and mist fluid outlets 108*b-d* are shown as generally circular and the nozzles for the fan fluid outlet 108*a* are shown as slits, these openings may be any desired shape. Similarly, although the nozzles for the fan, full body, and pulsating fluid outlets 108*a*, *b*, *d* are shown as generally cylindrical, and the nozzles for the mist fluid outlets 108*c* are shown as generally oblong, any of these nozzles may be any desired shape.

Returning to FIGS. 22-25, separating the showerhead engine 104 into upper and lower fluid chambers for each operation or mode by adding the flow channel member 252 allows fluid to distribute relatively uniformly within the upper fluid chambers while flowing through minimal curves or turns. Further, multiple lower fluid apertures for each spray mode may be defined in the flow channel member 252. Further these multiple fluid apertures may be distributed relatively uniformly around the flow channel member 252, thus allowing fluid to flow from the upper fluid chamber to the lower fluid chamber or chambers for a particular mode over an area substantially the same as the area covered by the lower fluid chambers.

Because the multiple lower fluid apertures for each mode may be distributed fairly uniformly over the area covered by the lower fluid chamber or chambers for a particular mode, fluid may flow from the lower fluid apertures to the fluid outlets associated with the particular mode with minimal lateral movement within the lower fluid chamber or chambers while maintaining a relatively uniform fluid distribution within the lower fluid chamber or chambers. In other words, the fluid may flow from the upper fluid chambers through the fluid outlets in fluid communication with the upper fluid chambers with minimal lateral movement within the associated lower fluid chamber or chambers to uniformly distribute the fluid through the fluid outlets, thus reducing pressure drops through the showerhead engine 104.

Defining multiple lower fluid apertures in the flow channel member 252 also facilitates maintaining a ratio of approximately no less than 5 to 1 for the total area of apertures that the fluid must pass through prior to reaching the fluid outlets to the total area of the fluid outlet openings. As discussed above, sizing the total area of any fluid chambers or apertures that the fluid flows through at least five times greater than the total area of the fluid outlet openings in fluid communication with the fluid chambers or apertures facilitates delivering the fluid from the fluid outlets at a suitable exit velocity for a showerhead with the lower flow rate than a conventional 2.5 GPM showerhead.

FIGS. 26 and 27 depict exploded perspective views of the showerhead engine and the handheld showerhead housing 102. The showerhead portion 222 of the handheld showerhead housing 102 may include a generally partial spherical showerhead portion body 350 sized for receipt of the stationary member 258 and at least a portion of the showerhead engine 104. Although shown with particularity, the showerhead portion body 350 may be any desired shape so long as it may receive the stationary member 258 and at least a portion of the showerhead engine 104. The showerhead body portion 350 may define a generally circular or other suitably shaped showerhead body fluid inlet in fluid communication with the handle portion fluid passage 226.

A showerhead portion wall 352 may extend from the showerhead portion body 350 proximate the showerhead body fluid inlet. The showerhead portion wall 352 and showerhead portion body 350 may define in combination with the stationary member 258 the stationary member fluid chamber 260 in fluid communication with the showerhead body fluid inlet. The showerhead portion wall 352 may define a generally closed curved oblong area that has a larger curved end proximate the showerhead body fluid inlet and a smaller curved end distal the larger curved end. However, the showerhead portion wall 352 may define any shaped area that increases a fluid's velocity as the fluid flows from the showerhead portion fluid inlet to the stationary member fluid outlet 262 via the stationary member fluid chamber 260.

One or more showerhead fastener columns 354 may extend from the showerhead portion body 350. The showerhead fastener columns 354 may be generally cylindrical or conical, or any other suitable shape. Each stationary showerhead column 354 may define a fastener column hole 356 for receiving at least a portion of a stationary member fastener 358. The stationary member fasteners 358 may be used to join the stationary member 258 to the handheld showerhead housing 102. Each fastener column hole 356 may be threaded for engagement with threads formed on a stationary member fastener 358. Four showerhead fastener columns 354 may extend from the showerhead portion 222. However, in other embodiments the showerhead portion 222 may use more or less than four showerhead member fastener columns 354.

The stationary member 258 may include a generally circular or other suitably shaped stationary member body 360. An upstream stationary member wall 362 may extend from an upstream side of the stationary member body 360. The upstream stationary member wall 362 may define an area complementary to the area defined by the showerhead portion wall 352. The upstream stationary member wall 362 may be sized for receipt within the showerhead portion wall 352. The upstream stationary member wall 362 and portions of the showerhead portion wall 352, showerhead portion body 222, and stationary member body 360 may define the stationary member fluid chamber 260.

An outer surface of the upstream stationary member wall 362 may generally abut an inner surface of the showerhead portion wall 352 as shown, for example, in FIG. 17. The upstream stationary member wall 362 may include a stationary member wall groove 364 that extends around the perimeter of the upstream stationary member wall 362. The stationary member wall groove 364 may receive a stationary member wall O-ring 366 or other suitable seal member. The stationary member wall O-ring 366 may limit fluid passage from the stationary member fluid chamber 260 between the abutting surfaces of the showerhead portion wall 352 and the upstream stationary member wall 362. The stationary member wall O-ring 366 may be formed from rubber or any other material that limits fluid flow between two abutting surfaces.

With continued reference to FIGS. 26 and 27 among other figures, the stationary member fluid outlet 262 may be formed in the stationary member body 360. The stationary member fluid outlet 262 may be circular or any other suitable shape. The stationary member fluid outlet 262 may be positioned proximate the smaller curved end portion of the upstream stationary member wall 362. Such positioning causes fluid to flow in the stationary member fluid chamber 260 from the larger curved end portion to the smaller curved end portion of the stationary member fluid chamber 260. As the fluid flows from the larger curved end portion to the smaller curved end portion, the width of the stationary member fluid chamber 260 decreases while the depth remains relatively constant. Because the overall area of the stationary member fluid chamber 260 decreases as the fluid flows from the larger curved end to the smaller curved end, the velocity of the fluid flowing within the stationary member fluid chamber 260 increases as it approaches the stationary member fluid outlet 262.

A downstream stationary member wall 368 may extend from a downstream side of the stationary member body 360. The downstream stationary wall 368 may generally extend around the perimeter of the stationary member body 360. A stationary seal wall 370 may also extend from the downstream side of the stationary member body 360 proximate the stationary member fluid outlet 262. The stationary seal wall 370 and portions of the stationary member body 360 and downstream stationary member wall 368 may define a mode seal space for receiving a mode seal 372. Further, the stationary member fluid outlet 262 may be positioned within the mode seal space. The mode seal space may be generally elliptical or any other shape that complements the shape of the mode seal 372.

The mode seal 372 may take the form of a cup-seal or any other suitable seal element and may be formed from rubber or any other any other material that limits fluid flow between two abutting surfaces. The mode seal 372 may include a mode seal base 374 and a mode seal wall 376 that extends from the mode seal base 374. The mode seal base 374 may have a generally elliptical shape or any other desired shape. A mode seal aperture 378 may be defined in the mode seal base 374. The mode seal aperture 378 allows for fluid to through the mode seal base 374, thus enabling fluid communication between the stationary member fluid outlet 262 and the upper fluid apertures defined in flow director member 250, as shown, for example, in FIGS. 17-21. Returning to FIGS. 26 and 27, the mode seal aperture 378 may be generally circular or any other shape that complements the shape of the upper fluid apertures.

The mode seal wall 376 may generally extend around the perimeter of the mode seal base 374. An outer surface of the mode seal wall 376 may abut inner surfaces of the downstream stationary member wall 368 and stationary seal wall 370 as shown, for example, in FIG. 17. With continued reference to FIG. 17 among other figures, a mode seal lip 380 may extend around the mode seal wall 376. The mode seal lip 380 may engage the inner surfaces of the downstream stationary member wall 368 and stationary seal wall 370 to limit or otherwise prevent fluid flow between the abutting surfaces of the mode seal 372 and the stationary member 258.

With reference to FIG. 27 among other figures, a mode seal aperture wall may extend from the mode seal base 374 in a direction similar to the direction that the mode seal wall 376 extends from the mode seal base 374. The mode seal aperture wall may generally encompass the mode seal aperture 378. A mode seal biasing member 382 may be slid over the mode seal aperture wall. As shown, for example, in FIG. 17 among other figures, the mode seal biasing member 382 may engage the stationary member 258 and the mode seal 372 to bias the mode seal base 374 against the flow director member 250 to limit or otherwise prevent fluid leakage between the abutting surfaces of the mode seal 372 and the flow director member 250. The mode seal biasing member 382 may take the form of a coil spring or any other suitable biasing member. The mode seal biasing member 382 may be formed from metal or any other material that has elastic material properties.

Turning to FIGS. 26 and 27 among other figures, one or more stationary member fastener shafts 384 may extend from the downstream side of the stationary member body 360. Each stationary member fastener shaft 384 may define a fastener aperture for receiving a stationary member fastener 358. An inner surface of each stationary member fastener shaft 384, which defines the fastener aperture, may be stepped to form an edge for a head of a stationary member fastener 358 to bear against. The edges may be formed a sufficient distance from the free ends of the stationary member fastener shafts 384 such that the heads of the stationary member fasteners 358 may be countersunk within the stationary member shafts 384. Each stationary member shaft 384 may be generally cylindrical, conical or any other suitable shape. Four stationary member fastener shafts 384 may extend from the stationary member 258. However, in other embodiments the stationary member 258 may include more or less than four stationary member fastener shafts 384.

Each stationary member fastener 358 may include a head and a shaft extending from the head. A portion of the fastener shaft may be threaded for engagement with threads formed on a showerhead fastener column 354. Each stationary member fastener 358 may be received through aligned fastener apertures defined in the showerhead fastener column 354 and shaft 384, and engaged with threads formed on the showerhead fastener column 354 to join the stationary member 258 to the handheld showerhead housing 102. Four stationary member fasteners 358 are used to join the stationary member 258 to the handheld showerhead housing 102. However, in some embodiments more or less than four stationary member fasteners 358 may be used. Moreover, in other embodiments, the stationary member 258 may be joined to the handheld showerhead housing 102 by another known connection method or combination of methods, including, but not limited to, by welding, press-fitting, clamping, adhering, and so on. In such embodiments, the stationary member fasteners 358, showerhead fastener columns 354, and/or stationary member fastener shafts 384 may be omitted.

The stationary member 258 may include a mode indicator wall 386 that extends from the downstream side of the stationary member body 360. The mode indicator wall 386 may be a generally arcuate or any other suitable shape. At least a portion of the mode indicator wall 386 may be received within a mode indicator groove 388 defined on an upstream side of the flow director member 250. The mode indicator wall 386 may be selectively moved within the mode indicator between the end walls defining the mode indicator groove 388. The mode indicator groove end walls may engage the mode indicator wall 386, thus limiting further movement of the mode indictor wall 386 relative to the mode indicator groove 388 in the direction of the engagement. Such engagement between the mode indicator wall 386 and the mode indicator groove end walls limits the rotation of the showerhead engine 104 relative the both the stationary member 258 and the handheld showerhead housing 102. In other words, the combination of the mode indicator wall 386 and mode indicator groove 388 limits the relative rotation of the showerhead engine 104 to the handheld showerhead housing 102 to a range that is a function of a length of the mode indicator groove 388.

The mode indicator wall 386 may define a mode indicator hole for receiving a mode indicator. The mode indicator may include a mode plunger 390 and a mode biasing member 392. The mode biasing member 392 may bias the mode plunger 390 against the flow director member 250. The mode biasing member 392 may take the form of coil spring or other suitable member to bias the mode plunger 390 against the flow director member 250. The mode plunger 390 may include a mode plunger shaft and a mode plunger head formed at one end portion of the mode plunger shaft. The mode plunger head may be partially spherical and sized for receipt in mode indicator holes 394 defined in the flow director member 250.

The mode indicator holes 394 may be positioned within the mode indicator groove 388. The mode indicator holes 394 may further be positioned on the flow director member 250 to generally align with the mode plunger 390 as the showerhead engine 104 rotates relative to the stationary member 258. The mode indicator holes 394 may be further configured to receive the mode plunger 390 when the mode seal aperture 378 generally aligns with an upper fluid aperture. Such a configuration causes the mode plunger head to be at least partially received within one of the mode indicator holes 394 when a showerhead mode is selected by aligning the mode seal aperture 378 with one of the upper fluid apertures. Receipt of at least a portion of the mode plunger 390 within a mode indicator hole 394 upon selection of a showerhead mode may thus provide a tactile and/or audio indication to a user of selection of a showerhead operating mode.

Although the mode indicator is shown as taking the form of a mode plunger 390 and mode plunger spring 392, the mode indicator may take other forms, such as, for example, a ball spring and ball. Further, mode indicator holes 394 may be formed on the stationary member 258 and the flow director member 250 may include a suitable mode indicator structure for receiving the mode indicator. Yet further, the indicator system may be omitted, if desired. Still yet further, other systems for providing visual, audio, and/or other signals to a user that a mode is selected, including mechanical systems, electronic systems, or some combination thereof, may be used in place of, or in combination with, the indicator system shown in the figures.

The stationary member 258 may also include a stationary member rotation wall 396 that extends from the downstream side of the stationary member body 360. The stationary member rotation wall 396 may be positioned within the central portion of the stationary member body 360. The stationary member rotation wall 396 may define a generally circular stationary member rotation aperture for receiving a flow director rotation shaft 398 that extends from an upstream side of the flow director member 250. The flow director rotation shaft 398 may be generally cylindrical and may be sized for receipt within the stationary member rotation aperture. The flow director rotation shaft 398 and the stationary member rotation wall 396 cooperate to provide a rotation point for the showerhead engine 104 to rotate around relative to the stationary member.

The flow director or back member 250 may include a generally circular or other suitably shaped flow director body 400. The upper fluid apertures 264, 272, 280, 288, mode indicator groove 388, and mode indicator holes 394, which are each described in more detail above, may be defined in the flow director body 400. The first, second, third and fourth downstream flow director walls 298, 300, 306, 310, which are described in more detail above, may extend from the downstream side of the flow director body 400. The flow director rotation shaft 398, which is described in more detail above, may extend from the upstream side of the flow director body 400.

One or more flow director connection tabs 402 may extend from the upstream side of the flow director body 400 to allow the flow director member 250 to be snap fit to the stationary member 258. The flow director connection tabs 402 maintain the connection between the flow director member 250 and the stationary member 258 while allowing the flow director member 250, and thus the showerhead engine 104, to rotate relative to the stationary member 258. The flow director connection tabs 402 may be positioned around a periphery of the flow director body 400.

The flow director connection tabs 402 may be generally L-shaped with a long leg extending generally perpendicular from the flow director body 400 and a short leg extending generally radially inward and parallel to the flow director body 400 from a free end of the long leg. The long legs of the flow director connection tabs 402 may be sufficiently flexible to allow the allow the flow director connection tabs 402 to move radially outward so that the stationary member 258 can be moved between the short legs of the flow director connection tabs 402 and the flow director body 400 as the stationary member 258 is snap fitted to the flow director member 250. Although the flow director member 250 is shown and described as snap fitted to the stationary member 258, the flow director member 250 may be joined to the stationary member 258 by any known connection method, or combination of methods, that allows the flow director member 250 to be rotated relative to the stationary member 258. Further, the flow director member 250 and the stationary member 258 may be modified as needed to accommodate these other types of connection methods.

The flow channel or intermediate member 252 may include a generally circular or other suitably shaped flow channel body 404. The lower fluid apertures 268, 276, 284, 292, which are each described in more detail above, may be defined in the flow channel body 404. The first, second, third and fourth upstream flow channel walls 302, 304, 308, 312, which are described in more detail above, may extend from the upstream side of the flow channel body 404. The flow channel walls 314, 318, 322, which are described in more detail above, may extend from the downstream side of the flow channel body 404.

One or more face member connection tabs 406 may extend from the perimeter edge of the flow channel body 404 to allow the face member 112 to be snap fit to the flow channel member 252. The face member connection tabs 406 maintain the connection between the face member 112 and the flow channel 252. Each face member connection tab 406 may be generally rectangular and may slope radially away at an upward angle relative to the flow channel body 404. Each face member connection tab 406 may be sized for receipt within a face member connection slot 408 defined in the face member 112. The face member connection tabs 406 may be spaced relatively uniformly around the perimeter edge of the flow channel body 404, or may be spaced apart at non-uniform or random distances.

A turbine shaft 410 wall may extend from the downstream side of the flow channel body 404. The turbine shaft wall 410 may define a flow channel turbine aperture receiving a portion of a turbine shaft or axle 412, thus providing a support and bearing surface for the turbine shaft 412. The turbine shaft wall 410 and flow channel turbine aperture each may be generally cylindrical or any other suitable shape.

The showerhead engine 104 may include four nozzle members 254. In other embodiments, more or less than four nozzle members 254 may be included in the showerhead engine 104. Each nozzle member 254 may include a nozzle body 414 that is shaped to complement the shape of the lower fluid chamber that it is positioned within. Fluid outlets 108a, b, which take the form of nozzles as described in more detail above, may extend from the downstream side of each nozzle body 414. Three of the nozzle members 254 may include nozzles that deliver the fan spray, and one of the nozzle members 254 may include nozzles that deliver the full body spray. Nozzle member apertures 416 may be defined in each nozzle body 414. Each nozzle member aperture 416 may be aligned with a fluid passage defined by a nozzle associated with the nozzle member 254.

The turbine or front member 256 may include a generally circular or other suitably shaped turbine member body 418. The turbine fan and full body openings 326, 328, which are described in more detail above, may be defined in the turbine member body 418. The upstream turbine walls 316, 320, 324, which are described in more detail above, may extend from the upstream side of the turbine member body 418. The nozzles for the for the mist and pulsating groups 110c, d, which are described in more detail above, may extend from the downstream side of the turbine member body 418.

A turbine axle wall may extend from the downstream side of the turbine member body 418. The turbine axle wall may define a turbine axle aperture for receiving an end portion of the turbine axle. A turbine axle opening may extend from the upstream side of the turbine member body 418 through the turbine member body 418 to provide access to the turbine axle aperture from the upstream side of the turbine body. The turbine axle aperture may provide 1 support and bearing surface for the turbine axle.

The lower pulsating fluid chamber 286 defined by one of the aligned downstream flow channel and upstream turbine walls 322, 324 may receive a turbine. The turbine may take the form of a turbine plate 420 (or shutter) that is formed separate from the turbine blades 422 and rotationally joined to the turbine blades 422 using an eccentric cam as described in U.S. Patent Application Publication No. 2008/0156897 (hereinafter the "'897 Publication"), or may take the form of any other turbine conventionally used in a showerhead to create a pulsating spray. The turbine plate 420 and the upstream turbine wall 324 may each include gear teeth as further described in the '897 Publication to rotate the turbine plate 420 at a lower speed relative to the turbine blades 422. As described in more detail in the '897 Publication, rotating the turbine plate 420 at a lower speed relative to the turbine blades 422 may create a massaging pulsating spray. In other embodiments, the turbine plate 420 may be integrally formed or otherwise joined to the turbine blades 422 and the gear teeth omitted such that the turbine blades 422 and turbine plate 420 rotate at the same rate. The turbine may further include the turbine shaft or axle 412. The turbine axle 412 may be received through apertures formed in the turbine blade 422 and the turbine plate 420. The turbine plate 420 and the turbine blade 422 may rotate within the lower turbine fluid chamber 286 around the turbine axle 412.

The face member 112 may include a generally circular or other suitably shaped face member body 424 with edges of the body curved upward and slightly radially inward. The face fan, full body, mist and pulsating openings 330, 332, 334, 336, which are described in more detail above, may be defined in the face member body 424. One or more user engagement features 426, such as grooves, may be defined along the outer edge portion of the face member body 424. The user engagement features 426 may be spaced apart either uniformly or non-uniformly. The user engagement features 426 may be used by a user to selectively rotate the showerhead engine 104 relative to the handheld showerhead housing 102.

The face member 112 may further include a user engagement tab 428 or protrusion that extends downwardly from a curved edge portion of the face member body 424. The user engagement tab 428 may be generally triangular shaped or any other suitable shape. The user engagement tab 428 may be sized to allow a user to grasp the tab 428. The user engagement tab 428 may be grasped by a user to selectively rotate the showerhead engine 104 relative to the handheld showerhead housing 102.

The face member 112 may include a face member wall 430 that extends from the upstream side of the face member body 424. The face member connection slots 408 may be defined in the face member wall 430. The face member connection slot 408 may be generally rectangular or any other desired shape. As discussed above, the face member connection slots 408 may be engaged with the face member connection tabs 406 formed on the flow channel member 252 to snap fit the face member 112 to the flow channel member 252.

In operation, to select a spray mode, a user may rotate the showerhead engine 104 relative to the handheld showerhead housing 102. Rotation of the showerhead engine 104 alters the flow path of the fluid by aligning an upper fluid aperture in the flow director member 250 with the fluid passage in the handle portion 220. The upper fluid aperture chosen directs fluid through a particular upper fluid chamber defined by the flow director member 250 and flow channel member 252. Fluid flows through the lower fluid apertures associated with the chosen upper fluid chamber to the lower fluid chamber or chambers associated with the lower fluid apertures. Fluid flows out of the handheld showerhead 100 from the selected lower fluid chamber through the fluid outlets associated with the selected lower fluid chamber. In other word, the operation mode selected directs fluid from the handle portion 220 through the showerhead engine 104 to a particular fluid outlet group 110a-d, which determines the spray pattern exiting the showerhead.

In addition to the spray mode, the user may select the flow rate. To select a fluid flow rate, a user rotates the flow control ring 152 around the flow control housing 150. Rotation of the flow control ring 152 increases or decreases the size of the flow control fluid chamber 174 that joins the upper fluid chamber 158 of the flow control housing 150 with the lower fluid chamber 156 of the flow control housing 150 thereby increasing or decreasing the fluid flow rate through the flow control device 106 between a minimum and maximum flow rate. The minimum flow rate may place the handheld showerhead 100 into a pause operation mode, thus effectively allowing for any spray mode to be selectively paused by the user. While a specific flow control device 106 is disclosed, other mechanisms of adjusting the flow rate are contemplated, including but not limited to, slides, knobs, inserts, and/or combinations thereof.

A method of making the handheld showerhead 100 will now be described with respect to the foregoing embodiments. The components of the showerhead, including, but not limited to, the showerhead engine 104, the stationary member 258, handheld showerhead housing 102, and the flow control device 106, may be made from rigid, durable non-corrosive materials. The showerhead or portions thereof may be composed of plastic or other polymers, composites, non-corrosive metals, and/or combinations thereof. Components may be molded, extruded, laser cut, or otherwise formed into the desired shape. While specific materials and means of producing same are described, variations therefrom would not depart from the overall scope of the showerheads disclosed herein with respect to the individual embodiments.

The handheld showerhead 100 may be assembled in various steps in any desirable combination. The showerhead engine may be assembled by fastening the stationary member 258 to the handheld showerhead housing 102. Prior to fastening the stationary member 258 to the handheld showerhead housing 102, the stationary member wall O-ring 366 may be joined the stationary member 258. The flow director (or back) member 250 may be snap fit to the stationary member 258 so as to form a rotatable connection. The flow channel (or intermediate) member 252 may be hot plate welded, ultrasonically welded, adhesively attached, or joined by other common or commercially available mechanisms to the flow director member 250.

The nozzle members 254 may be positioned between the flow channel member 252 and the turbine (or front) member 256 with the fluid outlets 108a, b of the nozzle members 254 aligned with apertures 326, 328 in the turbine member 256 and placed through these apertures 326, 328. The turbine may be positioned within the lower pulsating fluid chamber 286 between the flow channel member 252 and the turbine member 256. The turbine member 256 may be hot plate welded, ultrasonically welded, adhesively attached, or joined by other common or commercially available mechanisms to the flow channel member 252. The face plate apertures 330, 332, 334, 336 may be aligned with the fluid outlets 108a-d of the turbine and nozzle members 256, 254 and snap fit onto the flow channel member 252, thus completing assembly of the showerhead engine 104 to the handheld showerhead housing 102.

The flow control device 106 may be assembled by joining the flow ring seal 188, the upper seal element 204, and the lower seal element 206 the flow control housing 150 and the flow control ring 152. The flow control ring 152 may be moved onto the flow control housing 150. The flow control fastener 154 may be threadedly or otherwise joined to the flow control housing 150. The flow restrictor 164 may be inserted in the lower flow control fluid chamber 156 in the flow control housing 150, the filter screen 166 placed onto of the flow restrictor 164, and the flow restrictor fastener 168 received within the lower flow control fluid chamber 156 and engaged with the flow control housing 150. The assembled flow control device 106 may be the threadedly or otherwise joined to the handheld showerhead housing 102.

Figure 28:
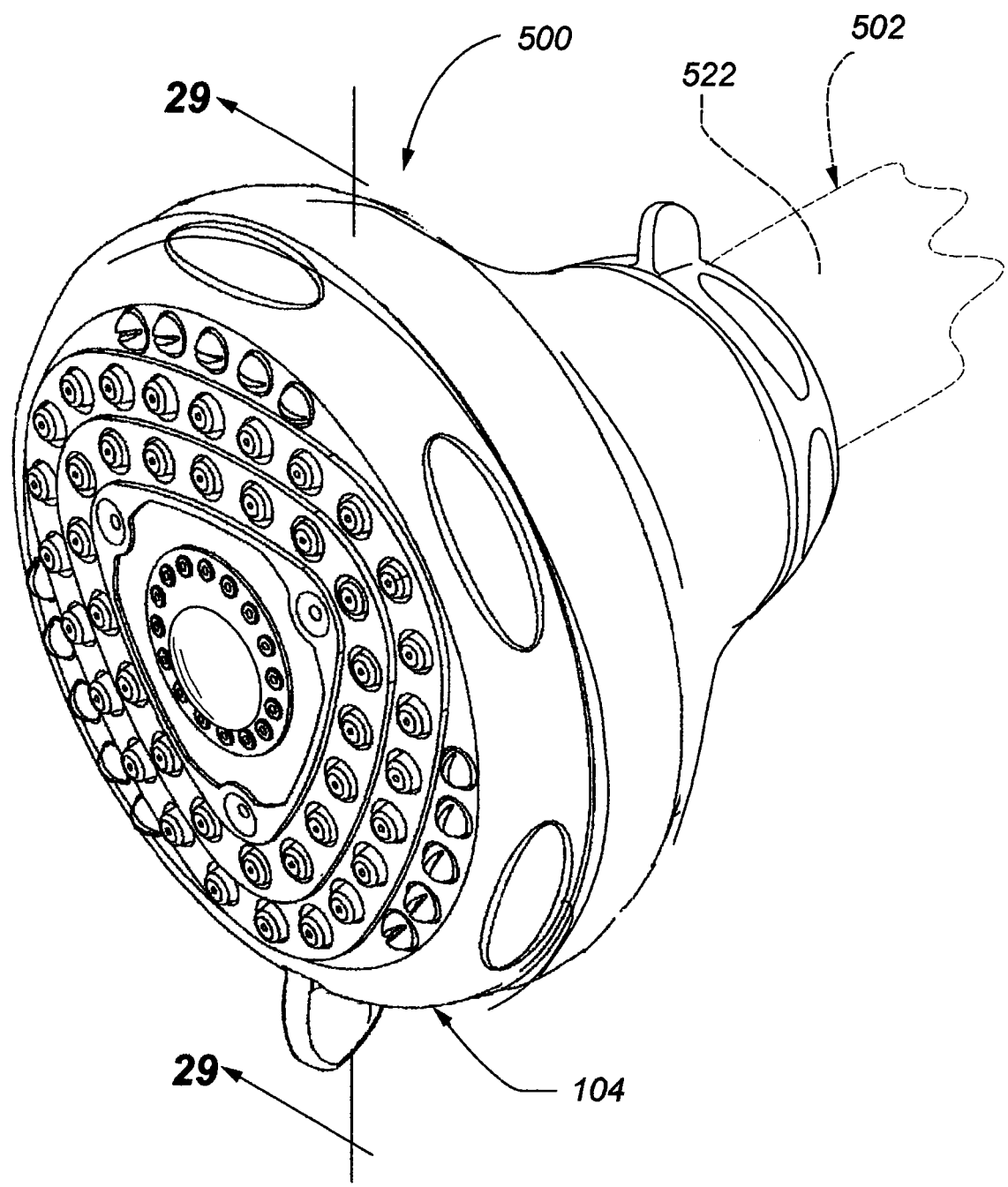
FIG. 28 is a perspective view of an embodiment of a wall mounted showerhead joined to a fluid supply line.
Figure 29:
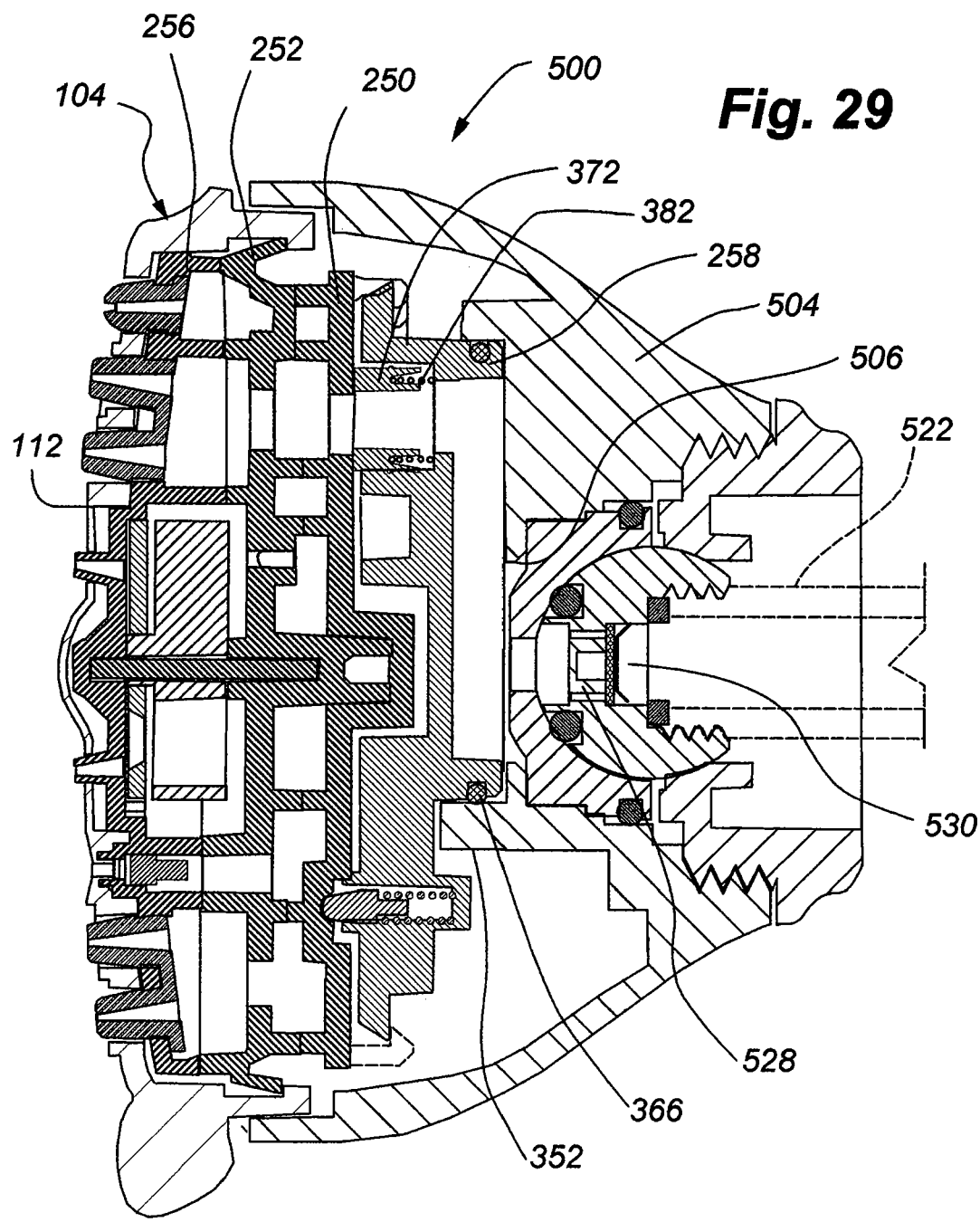
FIG. 29 is a cross-section view of the wall mounted showerhead of FIG. 28, viewed along line 29-29 in FIG. 28.
Figure 30:
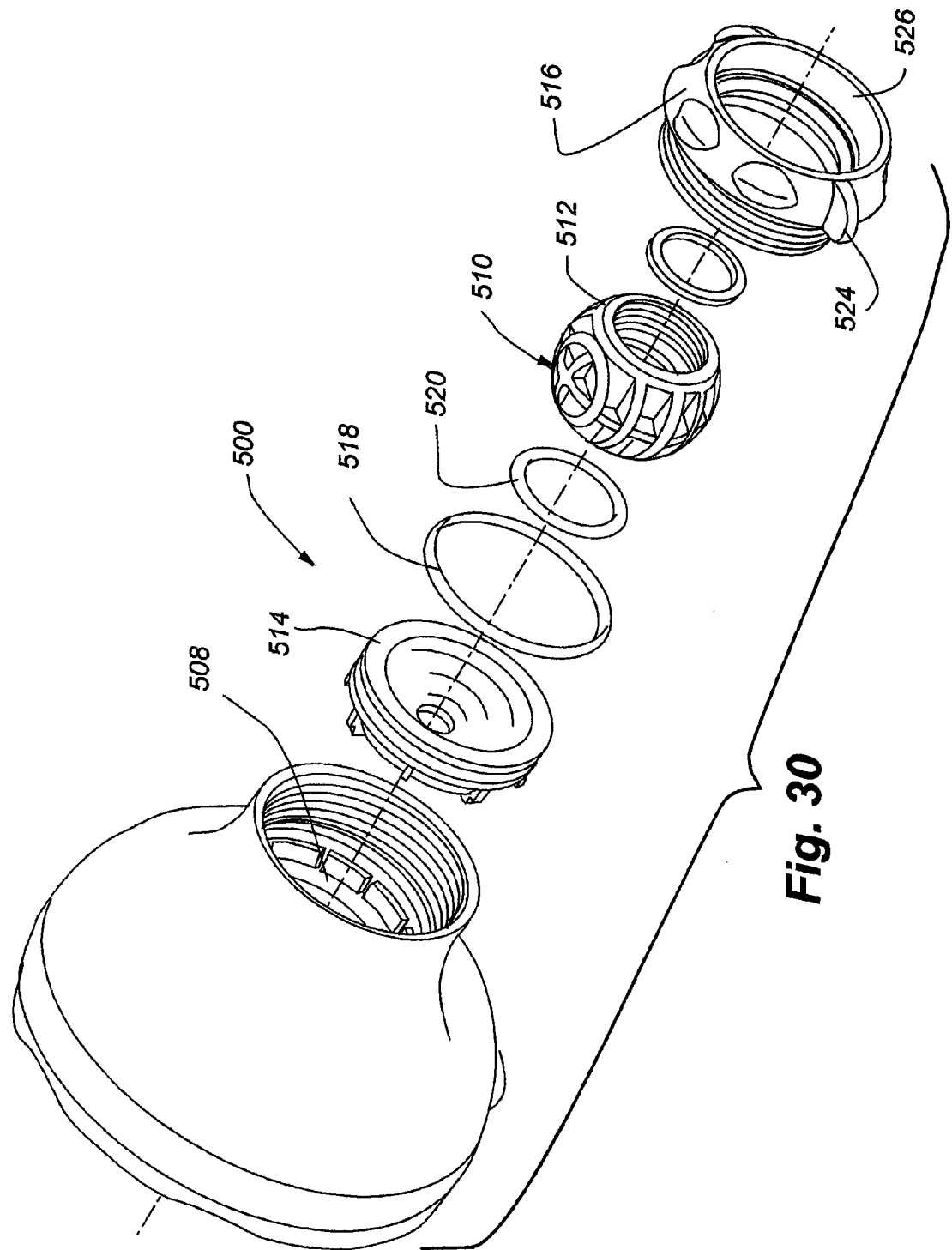
FIG. 30 is an exploded perspective view of a connection member assembly for the wall mounted showerhead of FIG. 28.
Figure 31:
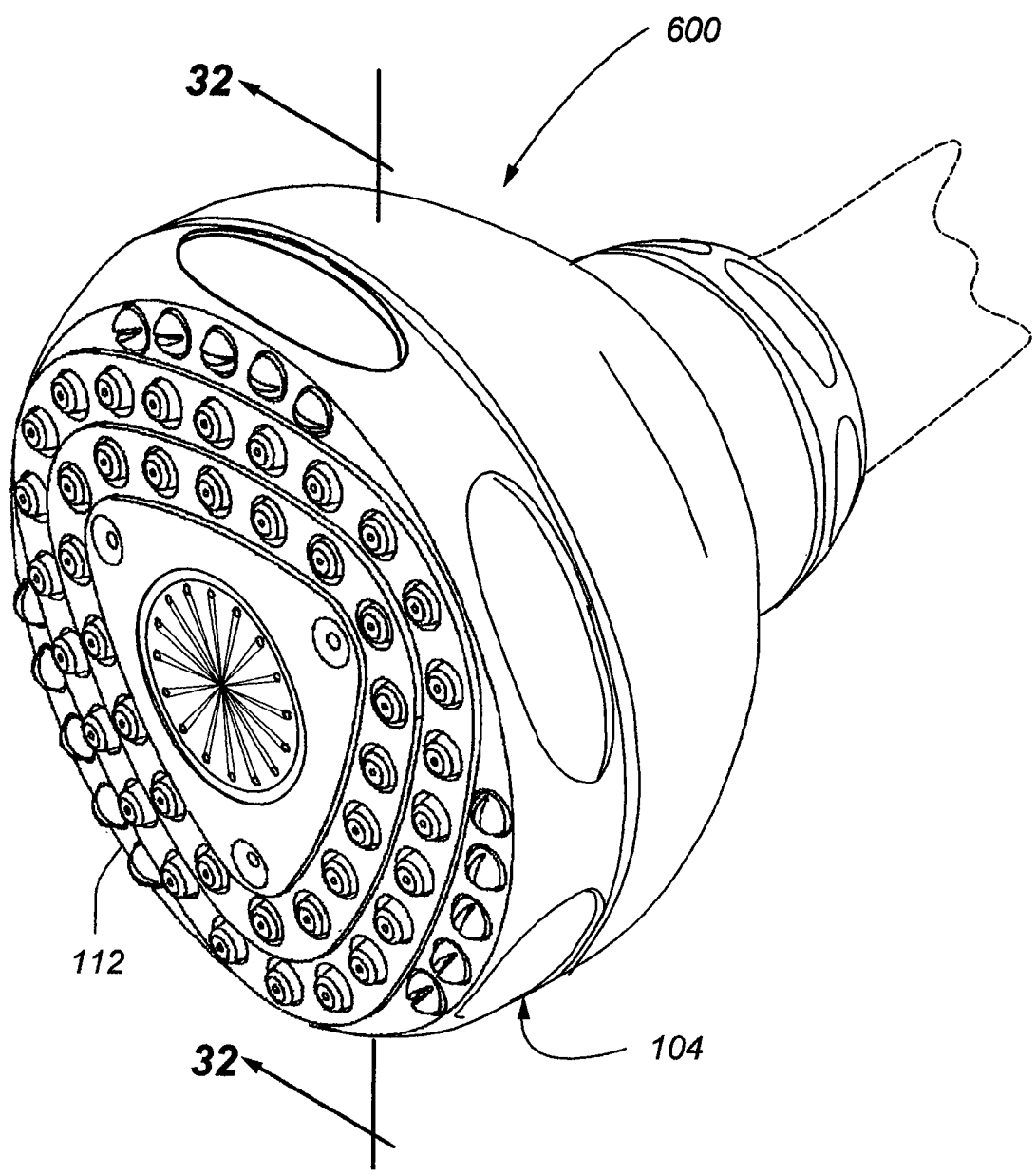
FIG. 31 is a perspective view of a second embodiment of a wall mounted showerhead joined to a fluid supply line.

FIGS. 28-30 depict an embodiment of a wall mounted showerhead 500. The wall mounted showerhead 500 may be mounted directly to the wall via commercially known mechanisms. For instance, a pipe assembly 502 may be provided. The pipe assembly 502 may be attached at an upstream end to the water supply line and may be affixed to the wall at a height suitable for a stationary shower. The wall mounted showerhead 500 may be joined to a downstream end of the pipe assembly 502 as described in more detail below.

The wall mounted showerhead 500 may be substantially similar to the handheld showerhead with like reference numbers used for common or similar components of the handheld showerhead and the wall mount showerhead. More particularly, the showerhead engine 104 may be the same as the showerhead engine for the handheld showerhead 100 and may operate in the same manner. With reference to FIG. 29, the showerhead engine 104 of the wall mounted showerhead 500 may include a flow director or back member 250, a flow channel or intermediate member 252, a turbine or front member 256, a face member 112, a mode seal 372, a mode seal biasing member 382, a mode indicator, and a turbine. Each of these components may be the same as the like components for the handheld showerhead 100 and may be assembled in a like manner. Like the handheld showerhead 100, the wall mounted showerhead 500 may further include a stationary member 258, stationary member wall O-ring 366, and stationary member fasteners (not shown). Each of these components may be the same as the like components for the handheld showerhead 100 and may be assembled in a like manner.

Unlike the handheld showerhead 100, the showerhead engine and stationary member of the wall mounted showerhead are joined to a showerhead housing 504 that may take the form of a base cone rather than a showerhead portion 222 and a handle portion 220. The base cone may be generally a partial sphere or any other suitable shape. Like the showerhead portion 222 of the handheld showerhead housing 102, the base cone may include a fluid inlet 506 for receiving fluid from a fluid source in fluid communication with the wall mounted showerhead 500. The fluid inlet 506 may be circular or any other suitable shape.

Also like the showerhead portion 222 of the handheld showerhead 100, the base cone may include one or more showerhead fastener columns and a showerhead portion wall 352. The showerhead fastener columns may be the same as, or substantially similar to, the showerhead fastener columns 354 for the handheld showerhead housing 102. The showerhead portion wall 352 may be the same as, or substantially similar to, the showerhead portion wall of the handheld showerhead 100. The stationary member 258 and the showerhead engine 104 of the wall mounted showerhead 500 may be assembled to the base cone in the same manner as described above for assembling the showerhead engine 104 to the handheld showerhead housing 102 the handheld showerhead 100.

The base cone may define a connection assembly cavity 508 for receiving a connection assembly 510. The connection assembly 510 may be similar to the pivot assemblies described in the '219 Application, or may be any other commercially available or otherwise known wall mounted connection assembly.

With reference to FIG. 30, a hidden pivot assembly may include a pivot ball 512, a ball seal 514, a pivot fastener 516, and one or more pivot seal members 518, 520. The pivot ball 512 may include internal threads for engagement with threads on the fluid supply pipe to join the wall mounted showerhead 500 to the fluid supply pipe 522. The pivot fastener 516 may include external threads for engagement with internal threads formed on the base cone to join the pivot fastener 516 to the base cone. The pivot fastener 516 may include one or more user engagement flanges 524, which extend from a pivot fastener body 526, for a user to grasp when joining or disconnecting the pivot fastener 516 and the base cone. The pivot fastener 516 retains the pivot ball 512 within the connection assembly cavity 508 of the base cone. A flow regulator 528, such as the 1.5 GPM flow regulator described above in connection with the handheld showerhead 100 may be positioned within a fluid passage 530 defined by the pivot ball 512. Other features and characteristics of the hidden pivot assembly are described in more detail in the '219 Application.

In some embodiments, an arm (not shown) may further be attached between the wall mounted showerhead 500 and the fluid supply pipe 522. An embodiment of an arm for the wall mounted showerhead 500 is described in U.S. provisional application No. 60/916,092 (the "'092 Application"), entitled "Molded Arm for Showerheads and Method of Making Same" and filed May 4, 2007. However, the arm described in the '092 Application is not required to be used with the wall mounted showerhead 500. Accordingly, the arm may be any other commercially available or otherwise known arm for use with showerheads.

FIGS. 31-35 depict a second embodiment of a wall mounted showerhead with like reference numbers used for common or similar components of the handheld showerhead 100 and the first embodiment of the wall mount showerhead 500. The second embodiment of the wall mounted showerhead 600 is the same as the first embodiment of the wall mounted showerhead 500 except for the changes as described below. More particularly, the showerhead engine 104 has been modified by omitting the turbine member 256. Further, the face member 112 and the nozzle member 254 are modified to accommodate for the omission of the turbine member 256.

Figure 32:
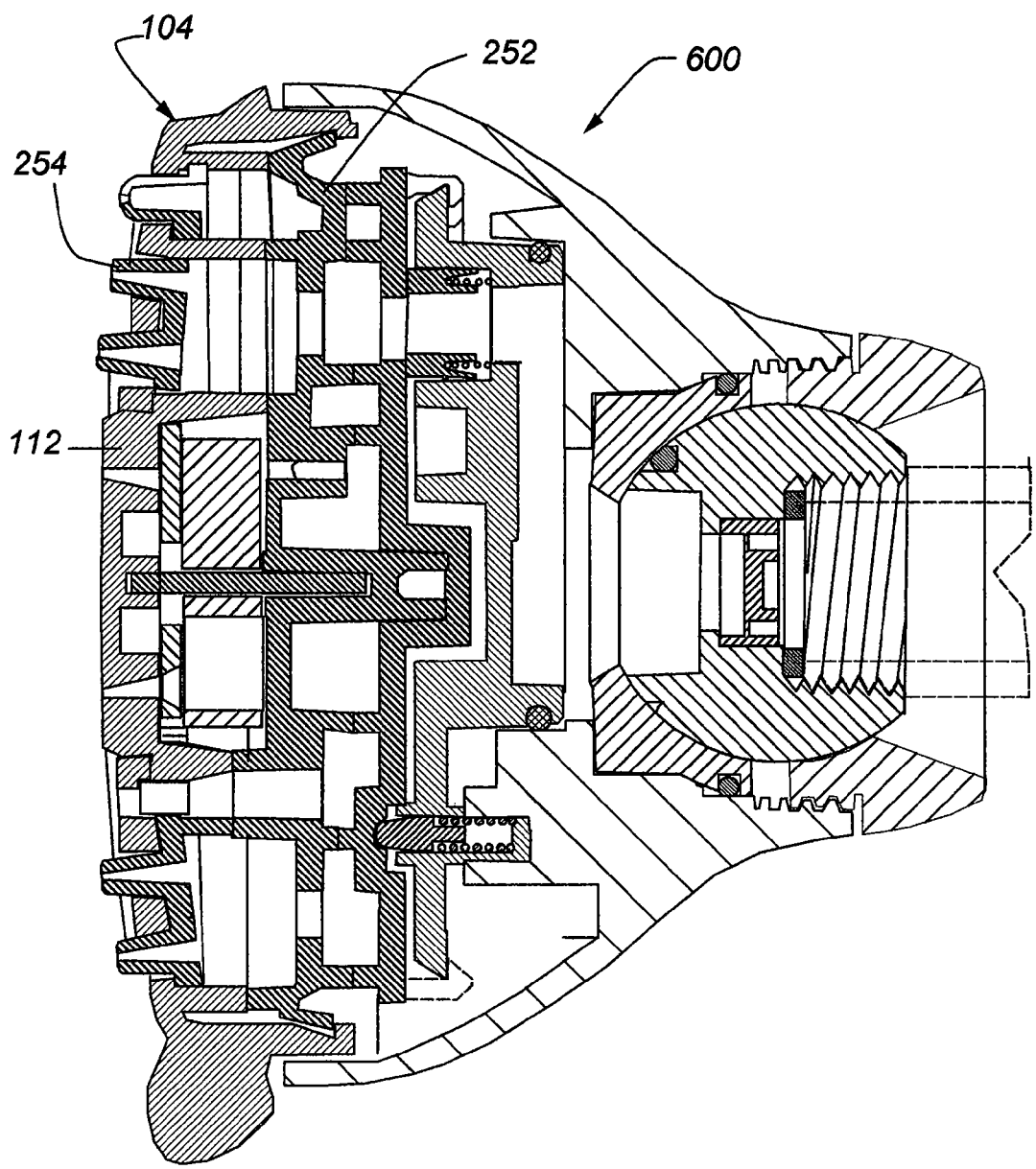
FIG. 32 is a cross-section view of the wall mounted showerhead of FIG. 31, viewed along line 32-32 in FIG. 31.
Figures 33, 34, 35:
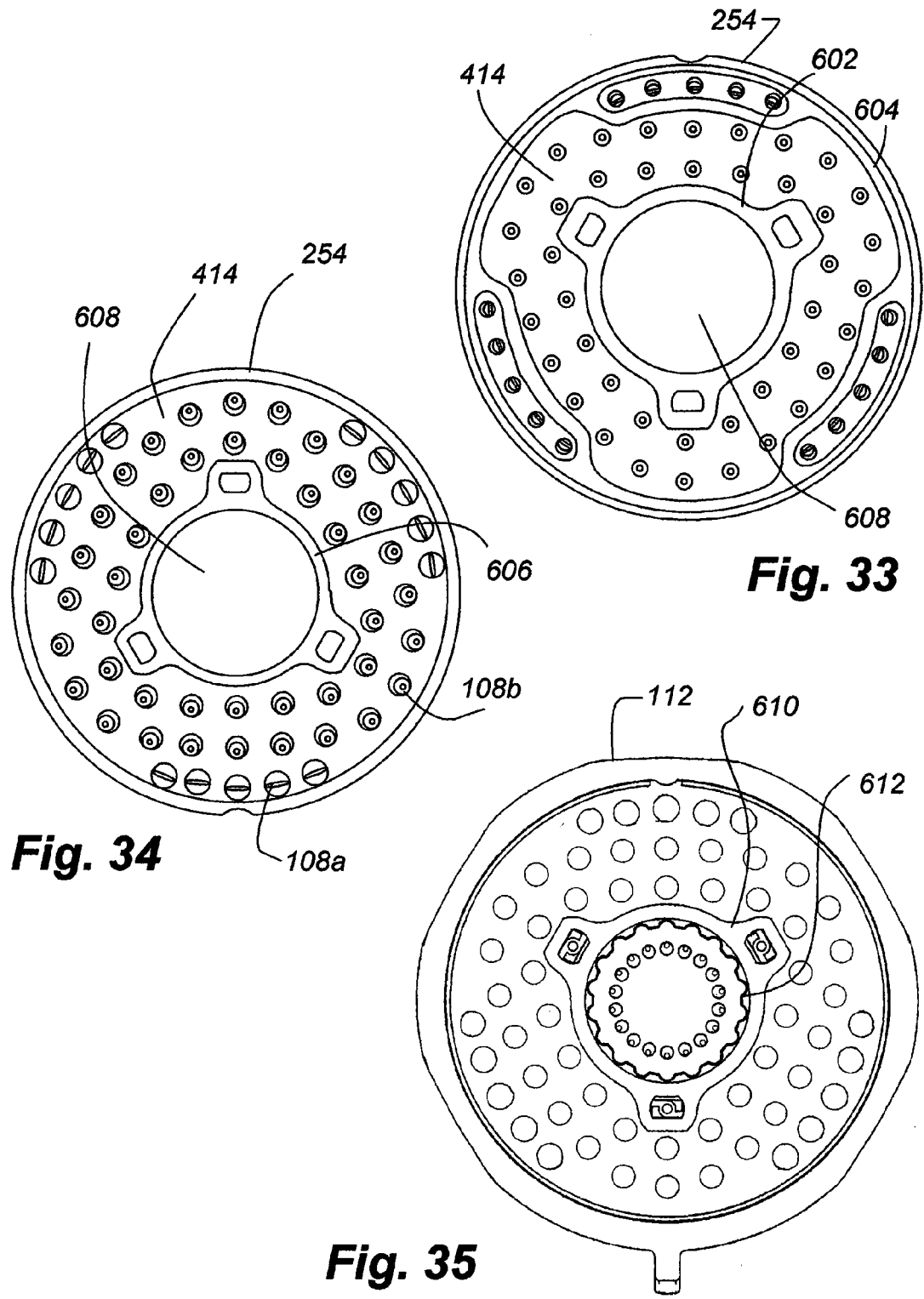
FIG. 33 is a plan view of an upstream side of a nozzle member for the wall mounted showerhead of FIG. 31.
FIG. 34 is a plan view of a downstream side of the nozzle member of FIG. 33.
FIG. 35 is a plan view of a upstream side of a face member for the wall mounted showerhead of FIG. 31.

Specifically, with reference to FIGS. 32-34, the nozzle member 254 is modified to include a nozzle member body 414 with the full body and fan fluid outlets 108*a, b* extending from the downstream side of the nozzle member body 414. Further, upstream nozzle walls 602, 604, substantially similar to the upstream turbine walls described for the handheld showerhead 100, extend from the upstream side of the nozzle member body 414, and a centrally located downstream nozzle wall 606 extends from the downstream side of the nozzle member body 414. The upstream nozzle walls 602, 604 in combination with the downstream flow channel walls, which are the same as described for the flow channel member 252 of the handheld showerhead 100, combine to define the lower full body, fan, and mode fluid chambers. The nozzle member body 414 also defines a turbine aperture 608 for receiving at least a portion of the turbine therethrough.

With reference to FIG. 35, the face member 112 is modified to include a face member central wall 610 that extends from an upstream side of the face member 112. The face member central wall 610 receives a portion of the turbine. Further, the face member central wall 610 may include gear teeth to engage with gear teeth 612 on the turbine plate or cover as described above for the handheld showerhead 100. Yet further, the face member central wall 610 combines with upstream and downstream central nozzle walls 602, 606 for the nozzle member 254 and a downstream central flow channel wall to define the pulsating fluid chamber. The openings in the face member 112 for the pulsating fluid outlets may also be smaller than those in the first embodiment of the wall mounted showerhead 500 since the pulsating spray flows directly through these openings rather than through the turbine nozzles used in the handheld showerhead 100 and first embodiment of the wall mounted showerhead 500.

The remaining components for the showerhead engine 104 and the showerhead 600 remain the same as in the previously described embodiments for the handheld showerhead 100 and first embodiment of the wall mounted showerhead 500. Further, the showerhead engine 104 operates in the same manner as previously described for handheld showerhead 100 and the first embodiment of the wall mounted showerhead 500.

The assembly of the showerhead engine 104 is slightly modified from the assembly of the showerhead engine described in connection with the handheld showerhead. More particularly, the nozzle member 254 is hot plate welded, ultrasonically welded, adhesively attached, or joined by other common or commercially available mechanisms to the flow channel member 252. The turbine is then inserted into the turbine aperture 608 defined by the nozzle member 254, and the face member 112 is snap fit to the flow channel member 252 as described above for the handheld showerhead 100. The assembly of the other components of the second embodiment of the wall mounted showerhead 600 proceeds in the same, or substantially the same, manner as described for the handheld showerhead 100.

The showerhead engine 104 for the second embodiment of the wall mounted showerhead 600 may be used in place of the showerhead engine 104 described above for the handheld showerhead 100, if desired.

The showerhead engines for the showerheads described herein direct the path of water in such a way so as to reduce pressure drop through the showerhead engine and/or increase fluid exit velocity, thus permitting a reduced flow through a 1.5 GPM regulator while maintaining a feel similar to the feel for showerheads optimized for a 2.5 GPM flow rate. Showerheads according to the foregoing embodiments may provide an equivalent shower experience as compared to the shower experience obtained with a conventional showerhead while utilizing substantially less water. Such showerheads as described herein may provide a satisfying shower experience at a flow rate of 1.5 GPM or less, which correlates to use of at least approximately 40% less water and energy compared to conventional showerheads with a maximum flow of 2.5 GPM, thus saving considerable amounts of water and reducing the energy required to heat this water.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, counterclockwise, x-axis, y-axis, and z-axis) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

What is claimed is:

1. A showerhead comprising
   a showerhead engine including at least two spray modes; and
   a flow control device operatively associated with the showerhead engine, wherein
   the flow control device comprises a flow control ring and a flow control housing;
   the flow control housing including first and second fluid chambers and a flow notch in fluid communication with the first and second fluid chambers;
   the flow control ring is received by an outer surface of the flow control housing;
   the flow control ring including sidewalls defining a recess in an inner surface of the flow control ring;
   the flow control housing and the recess defining a third fluid chamber in selective fluid communication with the first and second fluid chambers;
   selective movement of the flow control ring relative to the flow control housing enables and ends fluid communication between the third fluid chamber and at least one of the first and second fluid chambers;
   the flow control ring is movable relative to the flow control housing from a first position in which a stop defined in an inner surface of the flow control ring or the outer surface of the flow control housing abuts against a first end of a groove defined in the other of the inner surface of the flow control ring or the outer surface of the flow control housing, to a second position in which the stop abuts against a second end of the groove; and
   in the first position, the recess of the flow control ring engages with an engagement surface of the flow control housing and aligns the recess relative to the flow control housing such that fluid flows through the fluid chambers and;
   in the second position, a seal member arranged in the flow control ring engages with the engagement surface of the flow control housing such that the flow control ring permits the flow of fluid between the first and second fluid chambers by way of the flow notch and prevents fluid flow though the third chamber, thereby substantially pausing fluid flow for any of the at least two spray modes.

2. The showerhead of claim 1, further comprising a flow restrictor with a maximum flow rating of approximately 1.5 gallons per minute or less operatively associated with the showerhead engine and limiting a maximum fluid flow rate of a fluid delivered from the showerhead engine to approximately 1.5 gallons per minute.

3. The showerhead of claim 2, further comprising a fluid passage in fluid communication with the showerhead engine, the flow control device, and the flow restrictor, the showerhead engine positioned at a downstream stream end of the fluid passage, and the flow control device and the flow restrictor positioned at an upstream end of the fluid passage.

4. The showerhead of claim 3, wherein the flow control device is positioned downstream of the flow restrictor.

5. The showerhead of claim 1, wherein at least a portion of the seal member is positioned within a seal recess defined in the flow control ring.

6. The showerhead of claim 5, wherein the engagement surface of the flow control housing encompasses the first and the second fluid chambers and, in the second position, the seal member is compressed against the engagement surface of the flow control housing encompassing the first and second fluid chambers.

7. The showerhead of claim 6, wherein the seal member extends above the seal recess.

8. The showerhead of claim 1, wherein the engagement surface of the flow control housing encompasses the first and the second fluid chambers such that the third fluid chamber is formed by the recess and the sidewalls of the flow control ring engaging with the engagement surface.

9. The showerhead of claim 1, wherein the groove extends along a partial circumference of the inner surface of the flow control ring or the external surface of the housing such that the flow control ring moves relative to the flow control housing by the partial circumference from the first position to the second position.

10. The showerhead of claim 1, wherein the showerhead further comprises a handheld showerhead housing including an upstream and a downstream end portion, and the flow control device is positioned proximate the upstream end portion of the handheld showerhead housing and the showerhead engine is positioned proximate the downstream end portion of the handheld showerhead housing.

11. The showerhead of claim 1, wherein the flow control housing receives the flow control ring and a flow control fastener engages with the flow control housing and holds the flow control ring on the flow control housing.

12. A showerhead comprising
a showerhead engine including at least two spray modes; and
a flow control device operatively associated with the showerhead engine, wherein
the flow control device comprises a flow control ring and a flow control housing;
the flow control ring is received by an outer surface of the flow control housing;
the flow control ring is movable relative to the flow control housing from a first position in which a stop defined in an inner surface of the flow control ring or the outer surface of the flow control housing abuts against a first end of a groove defined in the other of the inner surface of the flow control ring or the outer surface of the flow control housing, to a second position in which the stop abuts against a second end of the groove; and
in the first position, sidewalls defining a recess in the inner surface of the flow control ring engage with an engagement surface of the flow control housing and align the recess relative to the flow control housing such that fluid flows through the recess and the flow control housing and,
in the second position, a seal member arranged in the flow control ring engages with the engagement surface of the flow control housing to prevent fluid flow though the recess and to substantially pause fluid flow except that fluid flows through the flow control housing by way of a notch defined in an exterior of the flow control housing recessed below the engagement surface, thereby preventing a complete stop of fluid flow through the flow control housing for any of the at least two spray modes.

13. The showerhead of claim 12, wherein the notch is relatively smaller than the recess defined in the control ring such that fluid flows at a maximum rate in the first position and at a minimum rate in the second position.

* * * * *